US012596733B1

(12) United States Patent
Cirelli

(10) Patent No.: US 12,596,733 B1
(45) Date of Patent: Apr. 7, 2026

(54) AUTO-EXTRACT SYSTEM WITH KEYWORD, RANKING, AND PROMPT GENERATION

(71) Applicant: American International Group, Inc., New York, NY (US)

(72) Inventor: Christopher Allen Cirelli, Roswell, GA (US)

(73) Assignee: AMERICAN INTERNATIONAL GROUP, INC., New York, NY (US)

( * ) Notice: Subject to any disclaimer, the term of this patent is extended or adjusted under 35 U.S.C. 154(b) by 0 days.

(21) Appl. No.: 19/376,796

(22) Filed: Oct. 31, 2025

Related U.S. Application Data

(60) Provisional application No. 63/819,534, filed on Jun. 6, 2025.

(51) Int. Cl.
G06F 16/3332 (2025.01)
G06F 11/07 (2006.01)
G06F 16/34 (2025.01)

(52) U.S. Cl.
CPC ........ G06F 16/3334 (2019.01); G06F 11/079 (2013.01); G06F 16/345 (2019.01)

(58) Field of Classification Search
CPC ... G06F 16/3334; G06F 11/079; G06F 16/345
See application file for complete search history.

(56) References Cited

U.S. PATENT DOCUMENTS

| | | | | |
|---|---|---|---|---|
| 12,511,320 | B1 * | 12/2025 | Zhang | ................. G06F 16/3344 |
| 2023/0071799 | A1 * | 3/2023 | Ramnani | ................ G06N 20/00 |
| 2024/0411994 | A1 * | 12/2024 | Siracusano | ........... G06F 40/205 |

* cited by examiner

*Primary Examiner* — Apu M Mofiz
*Assistant Examiner* — Oscar Wehovz
(74) *Attorney, Agent, or Firm* — Foley & Lardner LLP

(57) ABSTRACT

A system for generating extraction prompts and/or keywords for retrieval augmented data extraction. The system is configured to obtain a plurality of training chunks, where a plurality of first chunks of the plurality of training chunks have the data entity for which the keywords and extraction prompt is being generated. The system generates a first input for one or more language models comprising the data entity for extraction, the plurality of first chunks, and a first request to determine one or more keywords from related to the data entity from the plurality of first chunks. The system also generates a second input for the one or more language models comprising the data entity for extraction, the plurality of first chunks, and a second request to generate instructions to extract the data entity from the plurality of first chunks. The system refines the keywords and the instructions for the extraction prompt.

20 Claims, 11 Drawing Sheets

100 ⌁

100

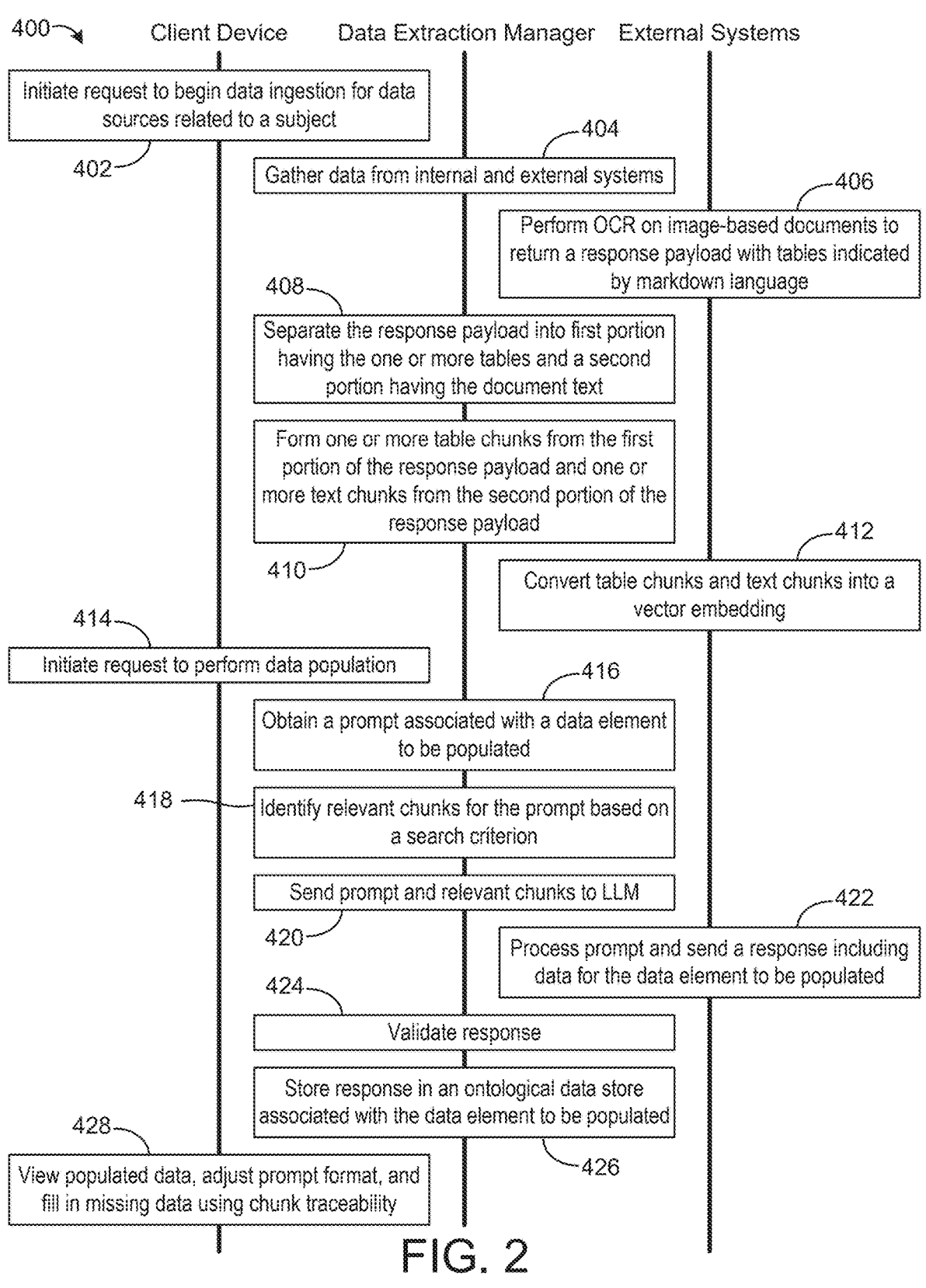

400

Client Device     Data Extraction Manager     External Systems

Initiate request to begin data ingestion for data sources related to a subject

402

404

Gather data from internal and external systems

406

Perform OCR on image-based documents to return a response payload with tables indicated by markdown language

408

Separate the response payload into first portion having the one or more tables and a second portion having the document text Form one or more table chunks from the first portion of the response payload and one or more text chunks from the second portion of the response payload

410

412

Convert table chunks and text chunks into a vector embedding

414

Initiate request to perform data population

416

Obtain a prompt associated with a data element to be populated

418

Identify relevant chunks for the prompt based on a search criterion

Send prompt and relevant chunks to LLM

420

422

Process prompt and send a response including data for the data element to be populated

424

Validate response

Store response in an ontological data store associated with the data element to be populated

426

428

View populated data, adjust prompt format, and fill in missing data using chunk traceability

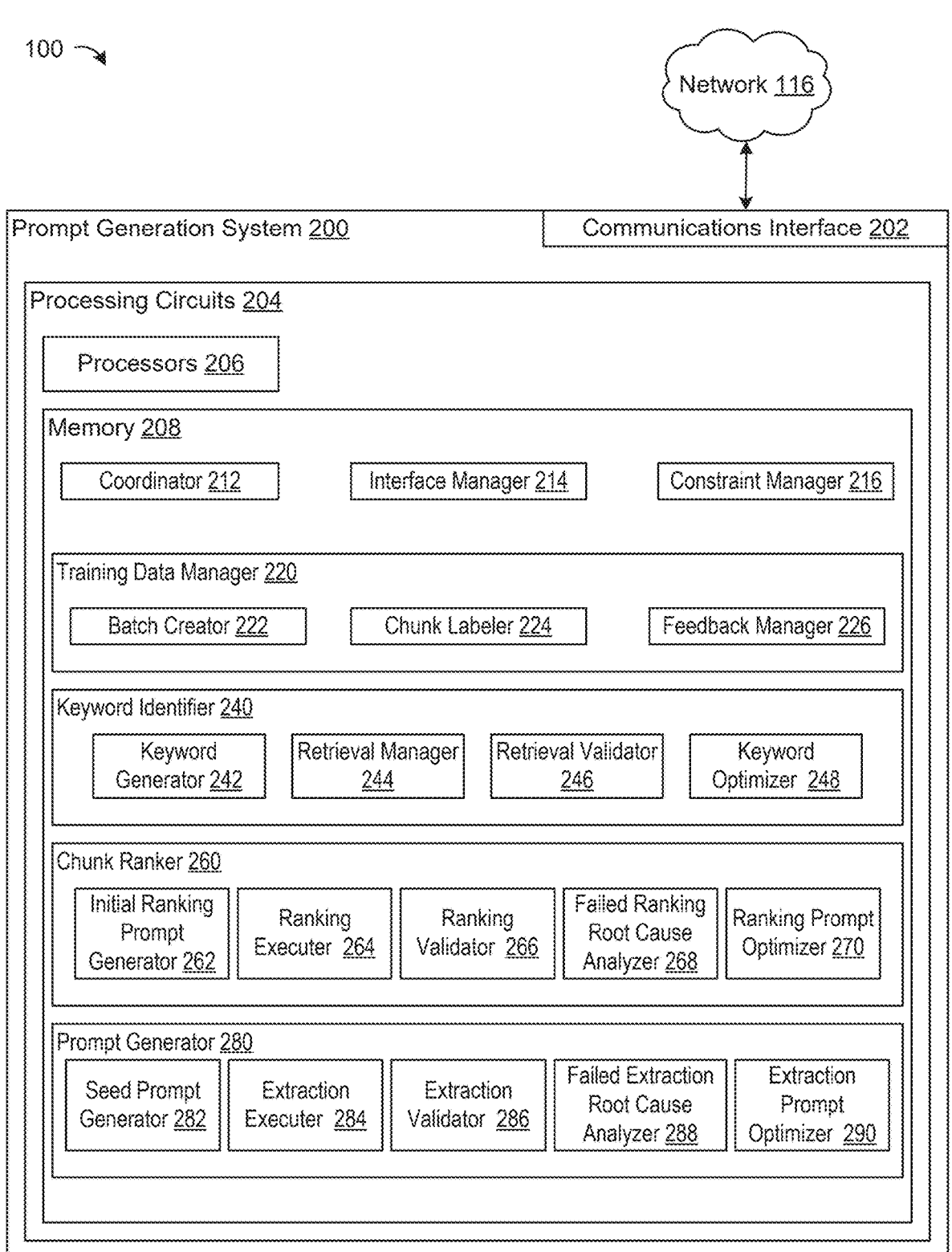

Network 116

Prompt Generation System 200 | Communications Interface 202

Processing Circuits 204

Processors 206

Memory 208

Coordinator 212 | Interface Manager 214 | Constraint Manager 216

Training Data Manager 220

Batch Creator 222 | Chunk Labeler 224 | Feedback Manager 226

Keyword Identifier 240

Keyword Generator 242 | Retrieval Manager 244 | Retrieval Validator 246 | Keyword Optimizer 248

Chunk Ranker 260

Initial Ranking Prompt Generator 262 | Ranking Executer 264 | Ranking Validator 266 | Failed Ranking Root Cause Analyzer 268 | Ranking Prompt Optimizer 270

Prompt Generator 280

Seed Prompt Generator 282 | Extraction Executer 284 | Extraction Validator 286 | Failed Extraction Root Cause Analyzer 288 | Extraction Prompt Optimizer 290

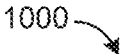
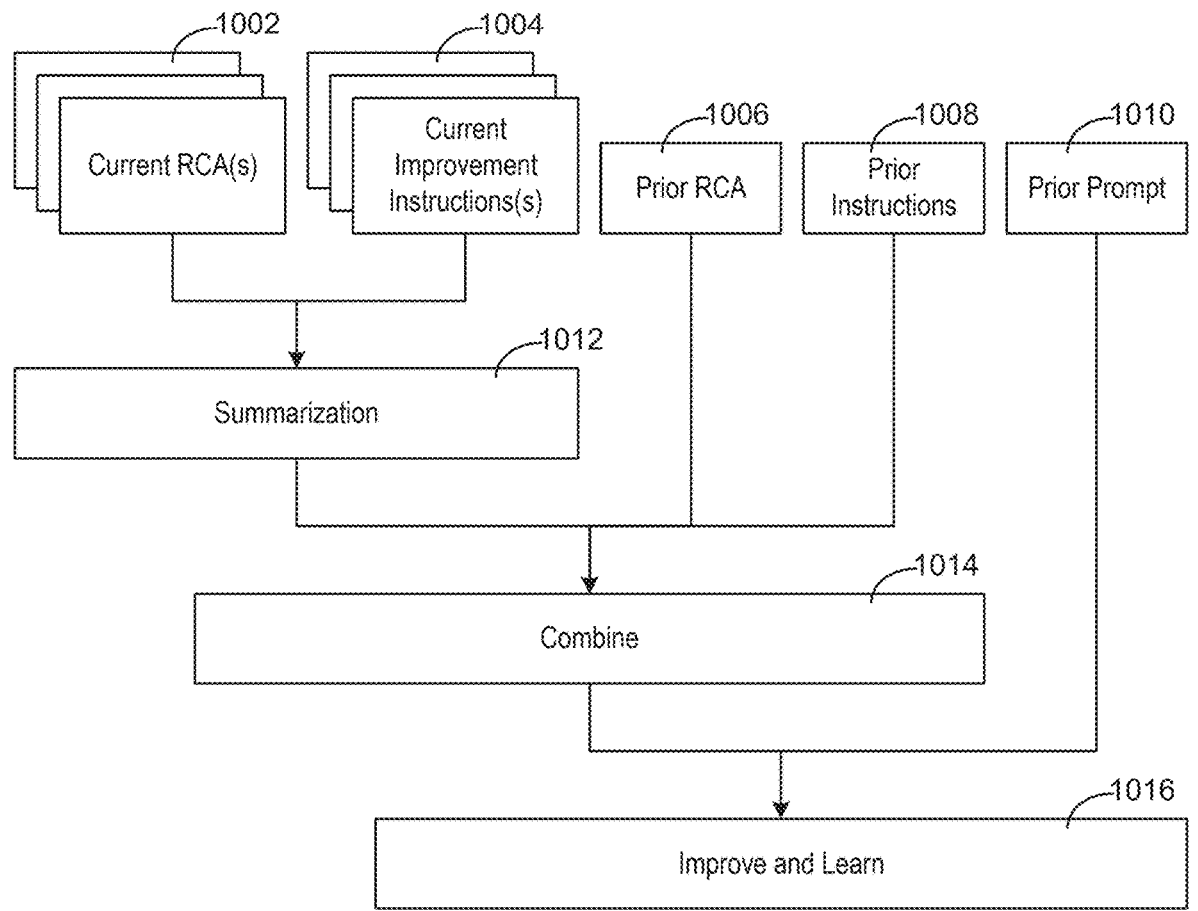
FIG. 5

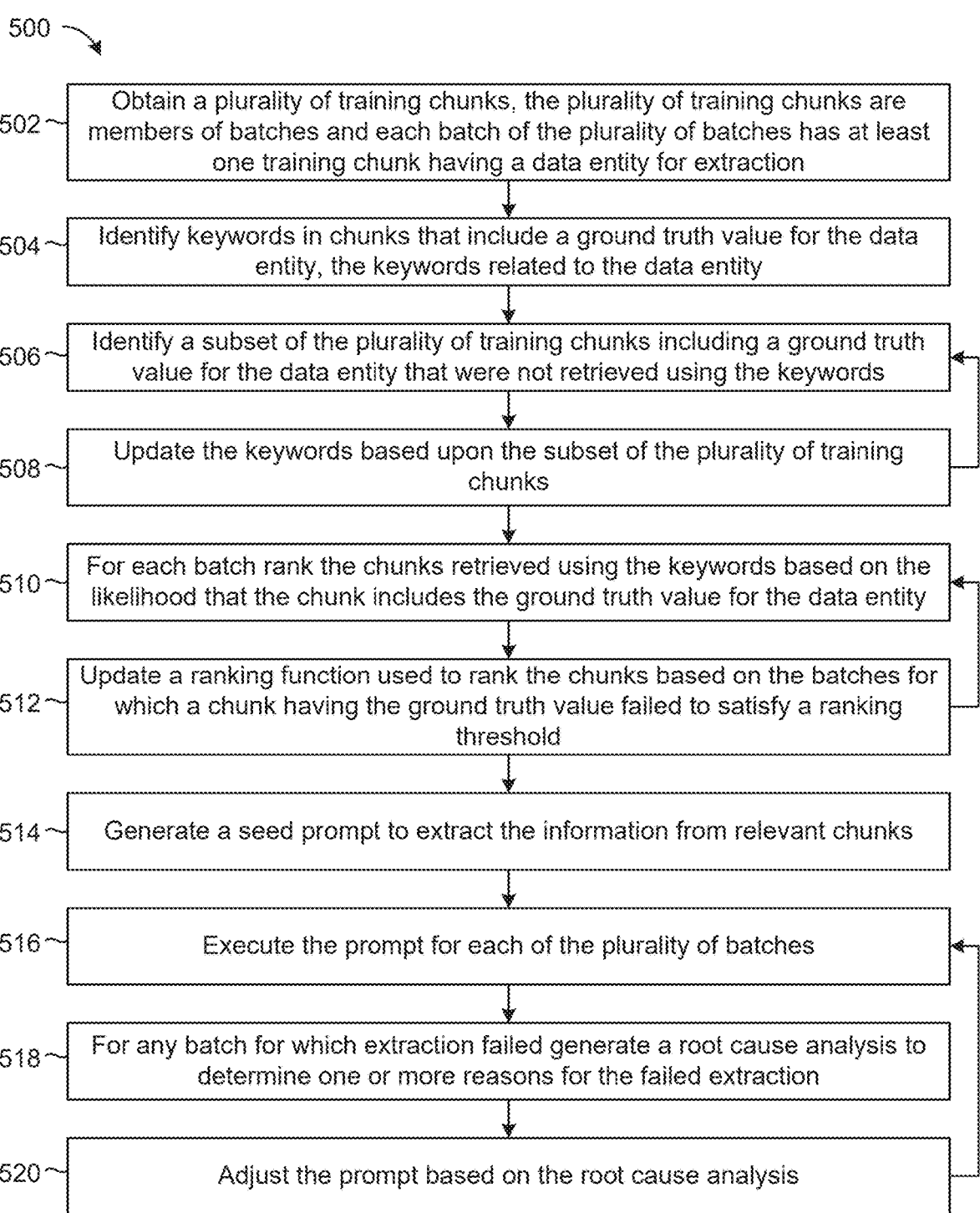

500

502 ~ Obtain a plurality of training chunks, the plurality of training chunks are members of batches and each batch of the plurality of batches has at least one training chunk having a data entity for extraction 504 ~ Identify keywords in chunks that include a ground truth value for the data entity, the keywords related to the data entity 506 ~ Identify a subset of the plurality of training chunks including a ground truth value for the data entity that were not retrieved using the keywords 508 ~ Update the keywords based upon the subset of the plurality of training chunks 510 ~ For each batch rank the chunks retrieved using the keywords based on the likelihood that the chunk includes the ground truth value for the data entity 512 ~ Update a ranking function used to rank the chunks based on the batches for which a chunk having the ground truth value failed to satisfy a ranking threshold 514 ~ Generate a seed prompt to extract the information from relevant chunks 516 ~ Execute the prompt for each of the plurality of batches 518 ~ For any batch for which extraction failed generate a root cause analysis to determine one or more reasons for the failed extraction 520 ~ Adjust the prompt based on the root cause analysis

FIG. 6A

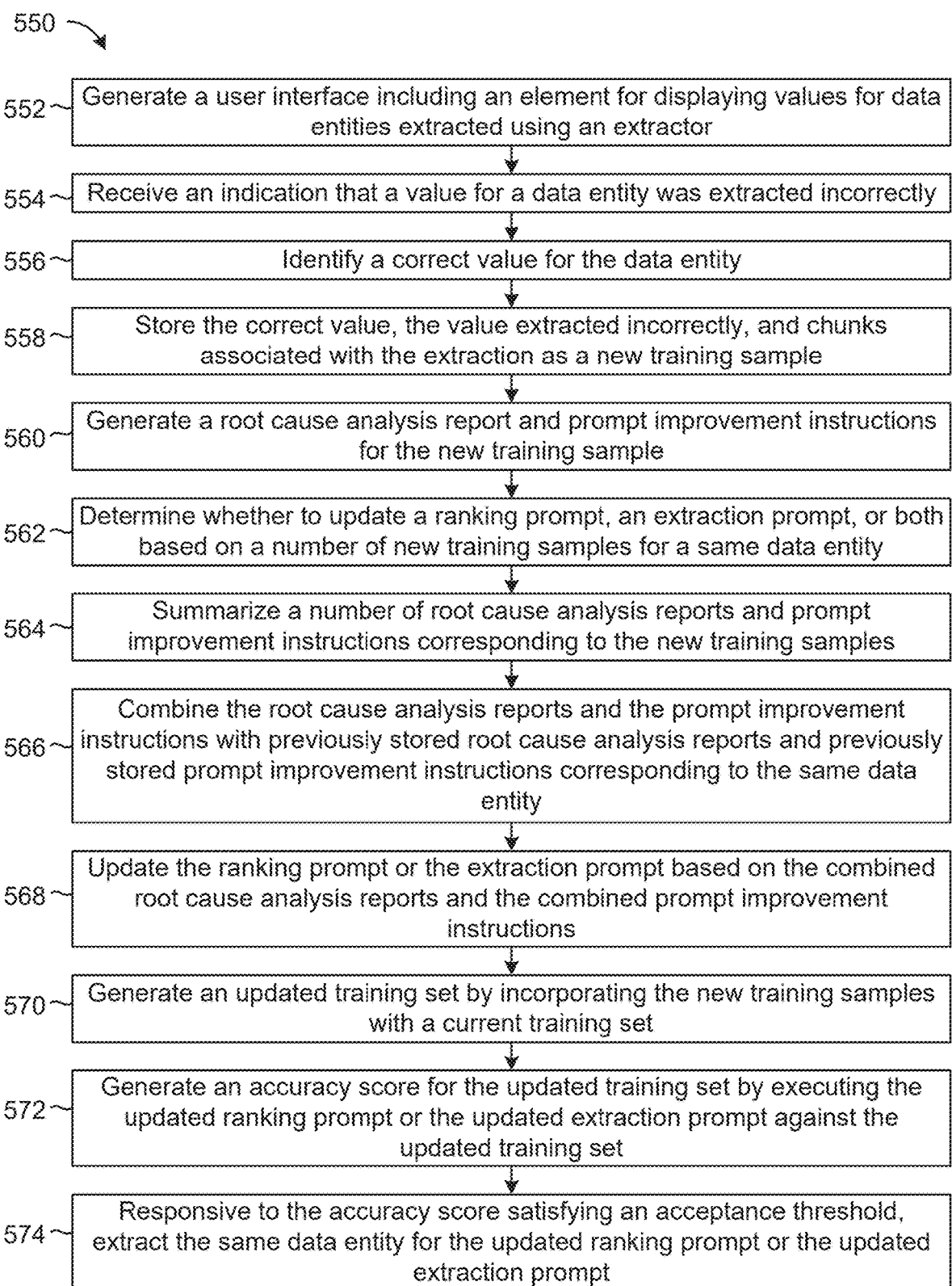

550

552 — Generate a user interface including an element for displaying values for data entities extracted using an extractor 554 — Receive an indication that a value for a data entity was extracted incorrectly 556 — Identify a correct value for the data entity 558 — Store the correct value, the value extracted incorrectly, and chunks associated with the extraction as a new training sample 560 — Generate a root cause analysis report and prompt improvement instructions for the new training sample 562 — Determine whether to update a ranking prompt, an extraction prompt, or both based on a number of new training samples for a same data entity 564 — Summarize a number of root cause analysis reports and prompt improvement instructions corresponding to the new training samples 566 — Combine the root cause analysis reports and the prompt improvement instructions with previously stored root cause analysis reports and previously stored prompt improvement instructions corresponding to the same data entity 568 — Update the ranking prompt or the extraction prompt based on the combined root cause analysis reports and the combined prompt improvement instructions 570 — Generate an updated training set by incorporating the new training samples with a current training set 572 — Generate an accuracy score for the updated training set by executing the updated ranking prompt or the updated extraction prompt against the updated training set 574 — Responsive to the accuracy score satisfying an acceptance threshold, extract the same data entity for the updated ranking prompt or the updated extraction prompt

FIG. 6B

AUTO-EXTRACT SYSTEM WITH KEYWORD, RANKING, AND PROMPT GENERATION

CROSS-REFERENCE TO RELATED PATENT APPLICATION

This application claims priority to and the benefit of U.S. Provisional Patent Application No. 63/819,534 filed on Jun. 6, 2025, which is herein incorporated by reference in its entirety.

FIELD

This disclosure generally relates to using language models to extract information.

BACKGROUND

Retrieval augmented generation (RAG) is a technique by which a prompt for information is augmented with relevant content to provide additional context to a language model. RAG systems use embedding models to create an embedding vector that can serve as a key in an index of content that may be used to augment the prompt. A RAG system may search the index based on the prompt to retrieve relevant content. Relevant information may be stored in documents, tables, questionnaires, or similar forms, including multiple-choice questions, fill-in-the-blank questions, Likert scales, etc. RAG systems can be used to extract information from a large corpus of documents.

A prompt is input for a language model and/or RAG system. The prompt can serve multiple purposes. The prompt may be used as input to the language model, for example, to provide instructions to perform a task. In addition, the prompt may be used to determine relevant content to provide to the language model with the prompt. The format and wording of the prompt is important to the successful operation of any system using language models.

SUMMARY

An embodiment of the present disclosure relates to a system for generating an extractor for a target data entity, the system includes one or more processing circuits configured to prompt one or more language models to extract the target data entity from each batch of a plurality of batches of chunks using extraction instructions in an extraction prompt, each batch of the plurality of batches including chunks generated from content of a submission of a plurality of submissions and one or more chunks having a ground truth value for the target data entity in the submission. The one or more processing circuits are also configured to divide the plurality of batches into a first set of batches for which the ground truth value was extracted and a second set of batches failing to extract the ground truth value. The one or more processing circuits are also configured to prompt the one or more language models with a first metaprompt using each failing batch in the second set of batches, the first metaprompt including the failing batch, and a request to (i) identify root cause causing the failing batch to fail extraction and (ii) identify additional extraction instructions to improve the extraction for the failing batch. The one or more processing circuits are also configured to prompt the one or more language models with one or more second metaprompts including the extraction instructions, the root cause for each failing batch in the second set of batches, the additional extraction instructions for each failing batch, and a request to integrate the additional extraction instructions into the extraction instructions. The one or more processing circuits are also configured to repeat dividing the plurality of batches into the first set of batches for which the ground truth value was extracted and the second set of batches failing to extract the ground truth value using the integrated extraction instructions, prompting the one or more language models with the first metaprompt, and prompting the one or more language models with the one or more second metaprompts until at least one of the first set of batches satisfy an extraction accuracy criterion or a maximum iterations criterion is satisfied. The one or more processing circuits are also configured to provide the integrated extraction instructions in the extraction prompt to extract a value for the target data entity from another submission.

In some embodiments, the one or more processing circuits are also configured to prompt the one or more language models with a first keyword metaprompt including the one or more chunks having the ground truth value for the target data entity from each submission and a request to identify keywords correlated to the target data entity. The one or more processing circuits are also configured to divide the one or more chunks having the ground truth value into identified chunks and unidentified chunks, wherein the identified chunks are identified by performing a keyword search across a plurality of chunks for each submission of the plurality of submissions using the keywords. The one or more processing circuits are also configured to prompt the one or more language models with a second keyword metaprompt including the unidentified chunks, the keywords, and a request to identify additional keywords correlated to the ground truth values in the unidentified chunks. The one or more processing circuits are also configured to append the additional keywords to the keywords and repeat the second keyword metaprompt using the appended keywords and append the additional keywords until at least one (i) the identified chunks satisfy of a coverage criterion or (ii) a second maximum iterations criterion is satisfied, wherein the appended keywords are used to determine one or more relevant chunks from which the value for the target data entity is extracted.

In some embodiments, the plurality of batches of chunks is a plurality of first batches of chunks and the one or more processing circuits are configured to prompt the one or more language models with a request to rank a plurality of second batches of chunks according to ranking instructions of a ranking prompt. The one or more processing circuits are also configured divide the plurality of second batches of chunks into a first set of second batches passing ranking and a second set of second batches failing the ranking, wherein the first set of second batches passing the ranking are identified by (i) executing the ranking prompt upon each second batch of the plurality of second batches and (ii) responsive to the one or more chunks having the ground truth value in the second batch satisfying an order criterion, adding second batch to the first set of second batches passing the ranking. The one or more processing circuits are also configured prompt the one or more language models with a ranking analysis metaprompt using each failed batch in the second set of second batches failing the ranking, the ranking analysis metaprompt including the failed batch, the ranking instructions from the ranking prompt, and a request to (i) identify a root cause that caused the failed batch to fail the ranking and (ii) identify additional ranking instructions to improve the ranking for the failed batch. The one or more processing circuits are also configured prompt the one or more language models with one or more ranking optimization metaprompts including the ranking instructions, the root cause for each failed batch, the additional ranking instructions for each failed batch, and a request to integrate the additional ranking instructions into the ranking instructions. The one or more processing circuits are also configured repeat dividing the plurality of second batches of chunks into the first set of second batches passing the ranking and the second set of second batches failing the ranking, prompting the one or more language models with the ranking analysis metaprompt, and prompting the one or more language models with the one or more ranking optimization metaprompts until at least one of the first set of second batches satisfy a rank accuracy criterion or a second maximum iterations criterion is satisfied, wherein the first set of second batches passing the ranking are identified using the ranking prompt after the additional ranking instructions have been integrated and the integrated ranking instructions are used to determine one or more relevant chunks from which the value for the target data entity is extracted.

This summary is illustrative only and should not be considered limiting.

BRIEF DESCRIPTION OF THE DRAWINGS

The features and advantages of the present disclosure will become more apparent from the detailed description set forth below when taken in conjunction with the drawings, wherein like numerals represent like elements.

FIG. 2 is swim lane diagram illustrating steps within a method for data extraction and population including the components that perform the steps, according to some embodiments.

FIG. 3 is a schematic block diagram of the prompt generation system of FIG. 1 configured to generate extractors to extract data entities, according to some embodiments.

FIG. 5 is a data flow diagram indicating memory usage while updating ranking prompts, according to some embodiments.

FIG. 6A is a flow of operations for generating prompts for data extraction, according to some embodiments.

FIG. 6B is a flow of operations for updating prompts for data extraction based on corrections to automatically extracted values for the data entities, according to some embodiments.

DETAILED DESCRIPTION

Figure 1:
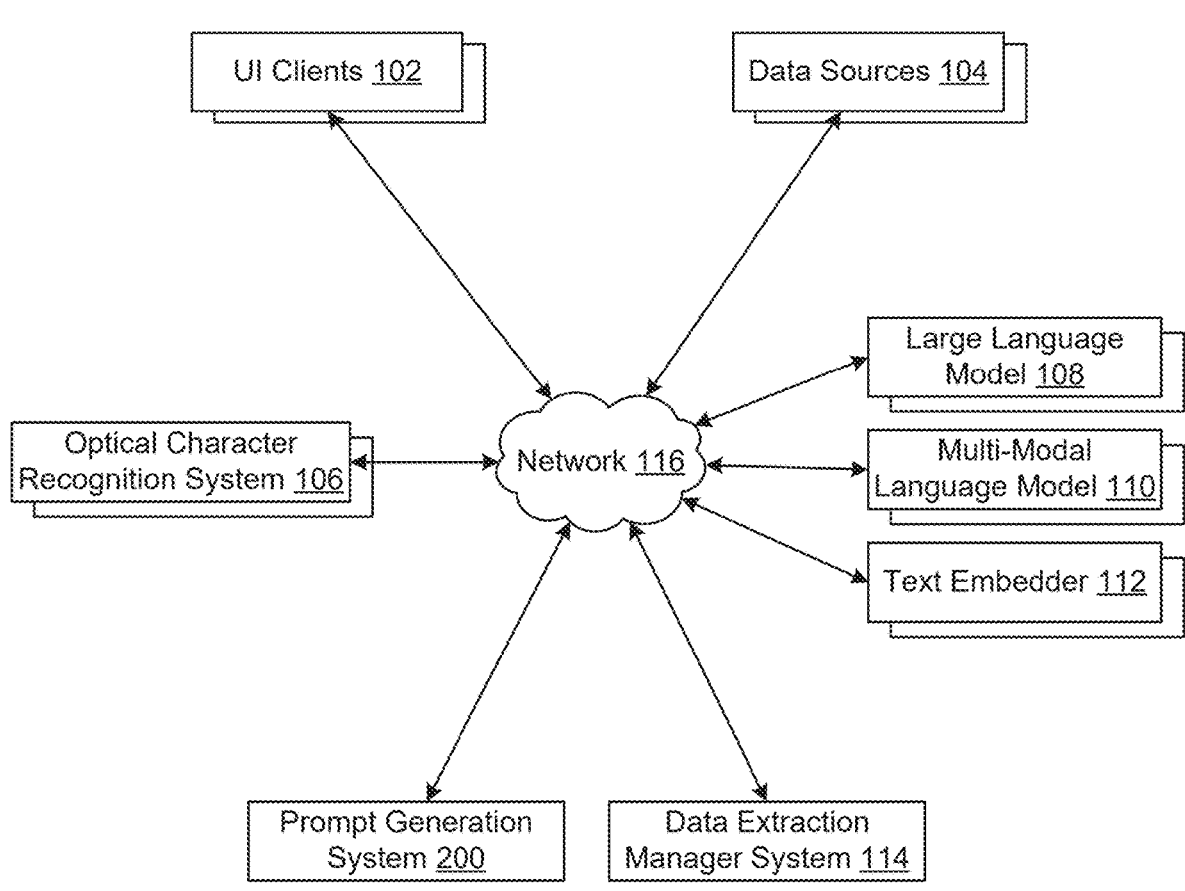
FIG. 1 is a schematic block diagram of a system for data extraction and population using large language models, according to some embodiments.

Different types of businesses often carefully curate and extract data from a large volume of documents. For example, a large set of insurance documents or accounting documents (in the form of images, PDFs, spreadsheets, or any other file type) may be sent to an insurance broker, underwriter, a tax preparer, or another person, who then has the task of identifying and extracting relevant information from the documents. To provide more efficiency, businesses have tried to automate this workflow by incorporating template-based forms with rigid formatting rules, enabling rule-based extraction programs to obtain the data from the documents. For example, businesses may perform optical character recognition and use the expected positioning of text on a document to both identify the document type and to further extract and annotate data from that document.

Template-based methodologies often include trained humans to create each template. A human with detailed knowledge of the document variability must review every document to specifically create sets of rules detailing exactly how to extract data from each of the documents. Template-based approaches also may require trained humans to maintain each template. However, templates often degrade in performance as documents change. While some variability can be explicitly declared in the template, any unaccounted-for changes usually require humans to modify a template to account for the differences or to create a new template.

Language models can be used in a retrieval augmented generation (RAG) architecture to extract information. In a RAG-based architecture used for extraction, an extractor (e.g., retrieval parameters such as keywords, a ranking prompt, and/or an extraction prompt) may be provided to the system. Relevant chunks (e.g., portions of a document, table, spreadsheet, etc.) that have previously been ingested by the system are identified based on the possibility that they may include the information that is to be extracted. The relevant chunks may be provided with a prompt (e.g., an extraction prompt) requesting the language model to extract the information (e.g., find a value for a data entity). A chunk may refer to any portion of a document or other content from which a value for a data entity can be extracted. For example, a chunk may refer to a number of sentences, a number of words, a paragraph, a page, multiple pages, and/or the whole document. An extractor may refer to any combination of elements or parameters by a system to perform extraction of a value for a data entity. For example, an extractor may refer to a combination of keywords used to retrieve chunks, a ranking prompt used to rank the relevance of retrieved chunks, and an extraction prompt used to extract the information from the retrieved chunks with the highest relevance.

While language models applied to the extraction of data entities can provide added efficiency compared to a template-based approach, systems employing language models may still suffer from certain obstacles. One such obstacle is a need for a human to develop, engineer, and maintain the extractors and retrieval functionality used to cause a language model to accurately extract the information. Prompt engineering for data extraction can be akin to writing code for a template-based approach. Generating the extractors and the retrieval functionality requires significant development time, testing, and support similar to that of a code repository. Further, a language model's response to a prompt is less understandable, making it difficult for developers and prompt engineers to adjust prompts to improve extraction accuracy. These obstacles cause the overall process of developing prompts and retrieval functionality to be time consuming for developers, can lead to significant trial-and-error, resulting in significant computational expenditure and energy use, and ultimately can lead to extractors that are still of sub-optimal functionality (e.g., use a large number of tokens, have poor accuracy, etc.).

The systems and methods described herein overcome the limitations of the previously described extraction systems by automatically generating and optimizing retrieval functionality and prompts to extract data entities from a large corpus of ingested data. The systems and methods may also optimize the retrieval functionality and extraction prompts after they have been generated. To generate the retrieval functionality and the extraction prompt, a set of training data may be generated (e.g., generating the set of training data may include identifying the existing chunks from a number of different submission batches that have the known ground truth value for the entity being extracted). Training data may include a set of training chunks known to include the ground truth values of the data entities. If source chunks in the training data are not associated with the with the data entities they include (e.g., not labeled has having the ground truth values), the source chunks can be identified and associated with the data entities (e.g., labeled) by prompting a language model to find the training chunk having the known value for a data entity.

Advantageously, the systems and methods described herein may need no human intervention and generate highly accurate retrieval and data extraction functionality for data entities. In some embodiments, the retrieval is based on keywords. A number of training chunks (e.g., 3, 5, etc.) having the ground truth value for the data entity may be provided to a language model with a prompt including a request to generate keywords associated with the data entity. To facilitate automation, the training chunks may be provided based on a selection algorithm (e.g., randomly selected). Keywords found by the language model can be used to perform retrieval for a batch of chunks (e.g., related by a common characteristic such as a customer, business, etc.). Chunks having the ground truth value for the entity but not retrieved using the current set of keywords can be used to generate additional keywords for the retrieval functionality of the current data entity. Keywords may be optimized to further increase accuracy by generating statistics related to the effectiveness of keywords leading to higher retrieval accuracy and increased contextual relevance for better data extraction accuracy.

In some embodiments, the systems and methods generate an additional prompt requesting a language model to rank the chunks retrieved using the keywords. The ranking may be based upon the probability (e.g., possibility, chance, etc.) that the chunk includes the ground truth value of the data entity. By ranking the chunks, the systems and methods can ensure (i) high performance (e.g., accuracy) even with a limited number of chunks, and (ii) that the chunk provided first is most likely to include the data entity. Advantageously, the extraction system may be accurate even if the language model has a limited context window within which extraction can be performed. Accuracy may be improved and/or less complex language models may be used, leading to increases in computational efficiency and reduced energy usage.

Finally, extraction prompts for the data entity may be generated at a level of detail and accuracy that is unlikely to be generated by a prompt engineer. First, a seed prompt is generated. For example, the seed prompt may be generated by providing a number of chunks (e.g., 3, 5, etc.) having the data entity and a prompt (e.g. an input) requesting the language model to generate instructions that could be used to prompt a language model (e.g., itself or a different language model) to extract the data entity. Once the instructions are generated, they can be used to perform extraction across all batches of training chunks, and the batches that fail extraction can be used to generate additional instructions. Recursively refining the extraction prompts can lead to detailed extraction prompts yielding high accuracy without the need for trial and error, ultimately reducing the number of computations required to generate the retrieval functionality and the extraction prompts.

In some embodiments, the systems and methods described herein are configured for online learning. For example, the system may monitor for updates (e.g., human generated updates and/or updates from other external systems) to a value for the extracted data field or other indications of an incorrect extraction. In some embodiments, the request associated with the incorrect extraction is used to adjust the keywords, ranking prompt, and/or extraction prompt. For example, the request (e.g., both the correct or incorrect chunks) may be added to the training data. Additionally, the system may request root cause analysis to automatically add to the keywords, ranking prompt, and/or extraction prompt in response to the indication of an incorrect extraction.

Data Extraction/Population System

FIG. 1 shows a data extraction and population system 100 configured to leverage a language models (LM), for example, one or more large language models (LLMs) 108, one or more multi-modal language models (MMLMs) 110, etc. to extract data from documents and populate data elements (e.g., of a data model, ontological data store, etc.) according to some embodiments. The data extraction and population system 100 is shown to include one or more UI clients 102, one or more data sources 104, an OCR system 106, one or more LLMs 108, one or more MMLMs 110, one or more text embedders 112, a data extraction manager system 114, and a prompt generation system 200 communicably connected via a network 116. FIG. 1 shows a non-limiting example of a possible configuration of the data extraction and population system 100. It is contemplated that the various components of the data extraction and population system 100 may be distributed across discrete systems and/or hardware in different ways. For example, a large language model of the one or more LLMs 108 and a text embedder of the one or more text embedders 112 may be configured within the same hardware or same node in a computer cluster or the data extraction manager system 114 may be distributed across multiple elements of computer hardware.

In some embodiments, the general operation of the data extraction and population system 100 is to extract data (e.g., values, records, etc.) from documents for one or more data entities and populate various data elements (e.g., in a database, etc.) with the extracted data for the entity. The data extraction manager system 114 may gather documents from the one or more data sources 104 and generate a searchable index of documents or portions thereof from the one or more data sources 104 using the text embedder 112. The index generation may be based on the semantic meaning of the documents from the one or more data sources 104, allowing comparison between the entries of the index and a prompt for data (e.g., the prompt also embedded by the text embedder 112). To populate the data elements, the data extraction manager system 114 may obtain one or more prompts for the data, identify relevant portions of the documents by searching the index, and provide both the prompt and the relevant portions of the documents to an LM (e.g., the one or more LLMs 108 and/or the one or more MMLMs 110). The LM may then process the prompt with the provided portions of the document to extract (e.g., identify, parse, summarize, combine, generate, etc.) the data requested by the prompt so that the data extraction manager system 114 can store the data (e.g., in an object, a data model, ontological model, an ontological data store, etc.).

In some embodiments, a prompt refers to any sequence of one or more tokens, symbols, characters, words, phrases, sentences, or structured data, provided as input to a language model or other artificial intelligence model. The prompt may elicit a response, completion, or other output from the model. For example, a prompt may include, but is not limited to, queries, search parameters, reference, content, instructions, questions, context, examples, formatting guidelines, or metadata, and may be generated manually by a user (e.g., through a user interface) or programmatically by an automated system (e.g., the prompt generation system 200). The prompt may specify intent, context, constraints, desired output style, etc. of the response to be generated. Prompting may refer to an action of generating a prompt and/or communicating the prompt to the model (e.g., the language model). For example, prompting may include transmitting the prompt over a network, for example, to and endpoint of an API for the model. In some embodiments, a meta-prompt refers to a prompt used to act upon another prompt. For example, the meta prompt may request information about the other prompt or adjust the language of the other prompt.

In some embodiments, the index is created (e.g., documents from the one or more data sources 104 are ingested) using the OCR system 106 and the text embedder 112. These documents, however, may have significant information included within the context of the text. For example, information may be included in the text layout, the relationship between the text and figures, markings, or other visual data, tabular data, etc. After retrieval, the data extraction and population system 100 may be configured to prompt a MMLM of the one or more MMLMs 110 with the document or portion thereof that was determined to include relevant text. In some embodiments, the data extraction and population system 100 stores an indication (e.g., flag, etc.) with the text used to generate the index that indicates if the text is to be processed by an LLM of the one or more LLMs 108 or by an MMLM. Indicating certain text to be processed by the one or more MMLMs 110 or the one or more LLMs 108 provides additional efficiency for the hybrid RAG approach by using the more computationally expensive MMLM only when required.

In some embodiments, the data extraction and population system 100 gathers large amounts of data from the one or more data sources 104. The one or more data sources 104 may be internal (e.g., on the company intranet) or external (e.g., stored on another company's web server). The one or more data sources 104 may include dedicated databases for particular types of data or webpages from which documents may be compiled, scraped, etc. The one or more data sources 104 may include documents (e.g., files, records, reports, articles, forms, data, etc.). The documents in the database may contain text, tables, columns, rows, charts, graphics, images, and/or other content. The documents may include PDF files or other image-based files for which the text of the document is not readily available for searching, copying, etc. Such image-based files may be processed by the OCR system 106 prior to processing by other components of the data extraction and population system 100. The documents may include a variety of content such as, for example, in the insurance industry, applications, broker correspondence, financials, summary of claims, historical claims filed under business insurance policies ("Loss Run"), questionnaires, forms, applications, and historical claim losses.

The one or more data sources 104 may include image-based documents. Image-based documents may include text, tables, columns, rows, charts, graphics, images, and/or other content. The content of an image-based document may include location information. The location information may relate to a layout indicating the visual appearance of the document and the respective content. For example, image-based documents may include document images (e.g., photographs of documents, scans of documents, bitmap images, portable network graphics, screenshots, etc.), digital documents that include visual content (e.g., PDFs, word-processing documents, webpages, tables, spreadsheets, etc.), and/or digital documents that are entirely or mostly text but include layouts that convey information (e.g., multi-column formatted documents, technical manuals, resumes, profiles, legal documents, contracts, computer, agendas, transcripts, poems, multiple choice questionnaires, etc.). In some embodiments, the documents are processed a portion at a time (e.g., a paragraph, a column, a page, etc.)

In some embodiments, the one or more data sources 104 may include documents that have been filled in (e.g., completed, etc.) by a person digitally or by hand. For example, the one or more data sources 104 may include surveys, applications, forms, questionnaires, registrations, and other types of documents. The documents may include a request for information and a location for a response. The documents may include a request for information along with a list of predefined and/or selectable answers. The document may include one or more multiple choice questions. For example, the document may include questions with selectable answers on the Likert scale, true/false questions, selectable numerical ranges. In some embodiments, the document includes a predefined space (e.g., location, area, etc.) within which the respondent is to enter a response.

A respondent may be sent the document (with requests for information) from the one or more data sources 104. The document may be sent via a postal service, electronic mail, a website, a facsimile machine, etc. The respondent may supply answers to the requests for information in the document electronically and/or in writing. Responses may be provided by entering a response in the predefined space (e.g., digitally or handwritten). In some embodiments, requests with selectable answers (e.g., multiple choice questions) may include responses for which the respondent has marked (e.g., digitally or by hand) the response to the request. For example, the respondent may add a mark proximate the selected response, encircle the selected response, fill in a bubble (e.g., any closed shape such as oval, square, etc.) near the selected response, etc.

In some embodiments, the one or more data sources 104 are configured to receive, from the respondents, completed (e.g., the response has been provided) documents. For example, the one or more data sources 104 may include an automated email system that, when an email is received, the email is automatically processed by the data extraction manager system 114. Additionally or alternatively, one or more data sources 104 may include an API to which the respondent can upload a scan, an image, and/or a file of completed documents. In some embodiments, the one or more data sources 104 may notify (e.g., inform, communicate, update, etc.) the data extraction manager system 114 that a new document has been received. For example, the data extraction manager system 114 may subscribe to notifications from the one or more data sources 104. Additionally or alternatively, the data extraction manager system 114 may periodically poll the one or more data sources 104 to determine if new documents have been received.

The OCR system 106 may be configured to convert the contents of the document to plain text. The OCR system 106 may include, for example, any commercially available OCR system. Additionally or alternatively, the OCR system 106 may be a component of the data extraction manager system 114 (e.g., using available OCR software). The system may use this type of private OCR system 106 for increased security. The text extraction tool may convert an image-based document (e.g., PDF file, PostScript, tagged image file format (TIFF), etc.) plain text that can be processed by a computer (e.g., the American Standard code for Information Interchange (ASCII)). In some embodiments, the plain text is stored in a plain text file format for later processing. For example, the plain text may be stored in plain text file formats such as TXT or markup languages such as hypertext markup language (HTML), JavaScript Object Notation (JSON), extensible markup language (XML), tau epsilon chi (TeX), etc. (e.g., into a text format (e.g., JSON). JSON is a text format that is completely language independent, but uses conventions that are familiar to programmers. JSON may also be better than OCR because JSON retains positional relationships in the text (positional encoding).

The documents processed by the OCR system 106 may include non-text-based information (e.g., charts, graphs, trend lines, flow charts, or other graphical elements) and/or special text structures (e.g., tables, rows, columns, etc.). This information may be recognized by the OCR system 106 as different from the text of the body of the document and may indicate the presence of special structures (e.g., non-text-based information and/or special text structures) in the output.

The OCR system 106 may return output in the JSON text format. The output may include an object for any special structures in the document with a key-value pair for the location of the special structure within the original document. The key-value pair for the location may include, for example, the X-Y position of each of the four corners for each of the tables in the document or the X-Y position of each cell in the tables, or the key-value pair for the location may include the two X limits of the table and the two Y limits of the table. Each PDF analyzed by a text extraction tool may have the same orientation and coordinates. The X-Y positions may describe a table, row structure, column structure, and/or cell structure.

In some embodiments, the OCR system 106 returns an output with tables inline with the text using a markdown language. The system may use the same markdown symbols to indicate different locations or different markdown symbols to indicate different locations. For example, the first appearance of the markdown symbol indicates the start (or top) of a table and a second appearance of the same markdown symbol indicates the end (or bottom) of the table. The markdown symbols may also indicate a first (e.g., left) side of the table and a second (e.g., right) side of the table. Markdown symbols (e.g., within text) may provide characteristics of the table. The markdown system may provide information to the system, so the system may render the table. For example, the vertical bar or pipe character, '|', may be used to mark the start of a new column within a row of the table, and the vertical bar followed by a newline character (e.g., '|/n') may be used to represent a new row. The markdown language may also use hyphen characters, '—', to separate a header row from a content row within a table. When analyzing the position of each cell, the system may consider each cell as having a single row of text, regardless of the number of lines of text in each cell. For more information about markdown symbols, see www-.markdownguide.org/extended-syntax/.

In some embodiments, the OCR system 106 returns an output in a first format, and the data extraction manager system 114 may convert the text into a second format (e.g., a common format) prior to processing by other components of the data extraction and population system 100. For example, the data extraction manager system 114 may convert the JSON output (e.g., with location data) to markdown language that includes markdown symbols. The JSON web language may be translated to markdown text indicating one or more boundaries of the table. Modularity is provided by converting to a common text format (e.g., the markdown language) allowing the data extraction and population system 100 to substitute other various OCR systems 106 if there is a cost advantage, computational advantage, or an improvement by one provider of OCR technology.

In some embodiments, the OCR system 106 is configured to recognize a layout of a document being processed (e.g., ingested, etc.). For example, the document may have more than one column and/or switch between different layout types (e.g., one column to two columns). Recognizing the layout of the document may allow the OCR system 106 to recognize characters and convert them to text in reading order. The OCR system 106 may maintain the semantic content included in word ordering by recognizing the layouts and adjusting appropriately. The OCR system 106 may be configured to recognize figures. The OCR system 106 may not extract any text from figures. For example, text from within a figure may not share semantic meaning with nearby text. Retrieval could be compromised because the text from the figure may be incorrectly included in determining a vector embedding for the text. Additionally or alternatively, the text from figures may be included. In some embodiments, the data extraction manager system 114 can select if text from figures should or should not be included in the output from the OCR system 106. For example, the data extraction manager system 114 may determine if text from figures is to be included in the output from the OCR system 106 based on document type and/or downstream processing selections (e.g., if the document will be processed by an MMLM).

In some embodiments, the OCR system 106 is able to distinguish the difference between handwriting (e.g., handwritten characters) and typeset (e.g., printed characters). The OCR system 106 may output the handwritten characters and the typeset (e.g., from a computer or scan from a printed document) in format that allows the data extraction manager system 114 to have knowledge of what information was typeset and what information was handwritten. For example, the OCR system 106 may include multiple outputs, use markup, and/or generate an output using any other suitable method for providing information to the data extraction manager system 114 related to which text was typeset and which text was converted from handwritten characters.

The OCR system 106 may be configured to recognize whether the document would benefit from being processed by the one or more MMLMs 110. For example, the OCR system 106 may detect figures, tables, annotations, and/or other content that may benefit from image-based (e.g., visual, etc.) processing. The OCR system 106 may communicate the existence of such content to the data extraction manager system 114 so that the data extraction manager system 114 can determine whether the document is to be processed by the one or more MMLMs 110 (e.g., based on a criterion) or the OCR system 106 may indicate to the data extraction manager system 114 that the document would benefit from processing by the one or more MMLMs 110 directly. In some embodiments, the OCR system 106 or data therefrom is used to determine if the one or more MMLMs 110 are to be used during ingestion (e.g., index generation, vector embedding) and/or if the one or more MMLMs 110 are to perform data extraction (e.g., after an appropriate document or portion thereof is retrieved).

In some embodiments, the data extraction manager system 114 is configured to perform some or all of the features of the OCR system 106. The data extraction manager system 114 may be configured to recognize the layout of the document, to recognize figures, and/or to recognize handwritten characters as described previously. The data extraction manager system 114 may communicate the layout, the location of the figures or handwritten characters, etc. to the OCR system 106 to facilitate more efficient character recognition (e.g., text generation, conversion, text extraction, etc.). For example, the OCR system 106 may be configured to translate only certain areas of a document or page, thus allowing the data extraction manager system 114 to provide certain layout information to the OCR system 106.

The data extraction manager system 114 may be configured to coordinate the operations of the data extraction and population system 100. For example, the data extraction manager system 114 may initiate (e.g., at the request of a user of the one or more UI clients 102) document gathering from the one or more data sources 104. The data extraction manager system 114 may communicate (e.g., send, deliver, transmit, etc.) the PDFs or other image-based documents to the OCR system 106 for conversion to plain text. The data extraction manager system 114 may separate the document text from the tabular information before chunking (e.g., splitting text into word lengths that are suitable for retrieval augmentation of, for example, 500 words, 1000 words, 1000 characters, etc.). The data extraction manager system 114 may communicate the chunks (both tabular chunks and text chunks) to the text embedder 112 to build an index for semantic search.

Upon receiving a request from a user of the one or more UI clients 102, the data extraction manager system 114 may obtain (e.g., from memory, from the prompt generation system 200, generate independently, etc.) several prompts for data extraction (e.g., identification, summarization, generation, etc.) for processing by LMs (e.g., one or more LLMs 108 and/or one or more MMLM 110). In some embodiments, the data extraction manager system 114 is configured to embed each prompt (e.g., using the text embedder 112 or similar embedding model) and compare the prompt vector embedding to that of the index to identify and retrieve potentially related or relevant chunks (e.g., portions of the documents). The prompts, along with the identified relevant chunks, may be communicated to the LMs by the data extraction manager system 114. In some embodiments, the data extraction manager system 114 is also configured to store the results of a prompt from the LMs. Thereby, the data extraction manager system 114 manages the population of the particular data elements by retrieving both structured and unstructured data, text, tables, and other content from various sources across the local intranet or the internet and extracting values for the data elements from the content.

The data extraction manager system 114 may also generate user interfaces for the data extraction and population system 100. For example, the data extraction manager system 114 may communicate instructions (e.g., JavaScript, Cascading Style Sheets, etc.) to generate a user interface to the one or more UI clients 102. The user interface may provide interactive capability with the systems of the data extraction and population system 100. For example, the user interface may provide the ability to initiate data population, configure the data to populate or extract, view results, trace errors, view source material, and/or other interactions that may be appropriate for a particular use case. Additional details related to the operation of the data extraction manager system 114 can be found in U.S. patent application Ser. No. 18/831,434 filed on Jan. 24, 2025, the entire contents of which is herein incorporated by reference.

In some embodiments, the data extraction manager system 114 is configured to generate instructions for a UI that enables editing of the extracted value. For example, the UI generated may include a table (e.g., listing, name-value pairs, etc.) having each of the data fields extracted and an indication of the extracted value. In some embodiments, the LM provides a confidence level for the extraction that is also displayed within the table. A user may review the extracted values in the table and may accept the values (e.g., by clicking on a selection box or similar UI element). The user may also edit the extracted value. Editing the value may trigger the data extraction manager system 114 to prompt the LM to identify the user-provided value within the content, thereby validating the user provided values. In some embodiments, the data extraction manager system 114 may cause the UI to display a portion of the content having the user-provided value. If the LM is unable to identify the user-provided value, the UI may display the content and request that the user highlight the entered value. In some embodiments, the user-provided value is not accepted if the value is not found by the LM, indicated by the user, or otherwise validated.

Interactions with the UI may be used as feedback for the prompt generation system 200 (e.g., to train new keywords and/or prompts to extract the data). For example, the data extraction manager system 114 may provide the prompt generation system 200 with data including the data entity to be extracted, the extractor (e.g., keywords, ranking prompt, extraction prompt, etc.) used to extract the data entity, the content (e.g., chunks) from which extraction was performed, the originally extracted value, and/or the user-provided value. The information provided to the prompt generation system 200 may be used as feedback to improve the extractor for the incorrectly identified data type.

The text embedder 112 may be configured to generate a vector embedding for a chunk of text. The vector embedding may refer to a vector representation of the semantic content of the chunk of text. Vectorization gives text numerical values that can be searched, with computational efficiency, for similarity (e.g., using a distance metric); thereby, text with similar semantic content can be identified for retrieval. Similar words would have similar numerical values. For example, hot and cold may have vectors pointing in different directions. The system may not find the word "cat", but with vectors, the system will determine that lion is similar to cat or big+cat. The text embedder 112 may be trained to understand the meaning of the words (female+king=queen).

After the vectors are created, the text embedder 112 may communicate the vector embeddings of the text chunks to the data extraction manager system 114 for storage in an object (e.g., a vector store). In some embodiments, the text embedder 112 may be included as a component of the data extraction manager system 114.

The LLM 108 may be any type of artificial intelligence (AI) configuration. For example, the LLM 108 may include generative pre-trained transformers (GPT), bidirectional encoder representations from transformers (BERT), text-to-text transfer transformers (T5), recurrent neural networks (RNN), or any other AI architecture suitable for a large language model. The LLM 108 may be configured to output a text response from a textual prompt. For example, the LLM 108 may convert text of a prompt into tokens representing a unit of information (e.g., a character, word, prefix, punctuation, etc.) and use the input sequence tokens to predict each output word (or token) consecutively. The prompt communicated to the LLM 108 may include chunks from the documents gathered from the one or more data sources 104 so that the LLM 108 is able to use that information to generate its response. For example, the LLM 108 may be provided a prompt including a request to determine the range of the market capitalization of a company over the last 6 months and one or more table chunks or text chunks that include information that may be relevant for the request.

The LLM 108 may be a publicly available LLM such as Claude. The LLM 108 may be pre-trained on massive corpora of text data, allowing it to learn the statistical properties of language and predict output text based on the prompt. In some embodiments, the LLM 108 may be fine-tuned, for example, to extract specific data from tabular and/or textual input. Fine-tuning a LLM may refer to the process of taking a pre-trained model and further training it on a specific dataset to adapt it to a particular task or domain. Fine-tuning may allow the LLM 108 to leverage its existing knowledge while improving its performance on the new, specialized data. For example, by focusing on the correlations found in the particular task or domain.

The one or more MMLMs 110 may be designed to process and/or integrate information from various modalities of input (e.g., text, images, audio, video, etc.). In some embodiments, the input layer of the one or more MMLMs 110 includes a channel for each available modality. For example, there may be an audio channel and an image channel. The image channel may also support text represented visually in the document (e.g., on a page, etc.). The one or more MMLMs 110 may encode the different modalities into a common format that can be processed by one or more hidden layers within the one or more MMLMs 110. For example, the one or more MMLMs 110 may include convolutional layers for imaged-based data and/or transformer layers or other attention mechanisms to process textual data. The one or more MMLMs 110 may also include layers that combine (e.g., fuse, integrate, etc.) information across different input modes to generate an output. The output may include similar modalities as the input data. For example, the output may include text, images, audio, video, and/or other relevant formats based on the task and/or the prompt to the one or more MMLMs 110.

The one or more MMLMs 110 may be configured to use the image-based input modality to better understand context of any text on the page. For example, image-based input to the one or more MMLMs 110 may allow the one or more MMLMs 110 to understand the flow (e.g., reading order) of the text within a document. The image-based input may also allow the one or more MMLMs 110 to recognize relationships between figures and/or tables and text within a document. The image based one or more MMLMs 110 may be configured to segment various areas of the document or a page within the document based on relationships between the text, figures, and/or other visual cues. For example, the one or more MMLMs 110 may distinguish handwritten characters from typeset. In some embodiments, the one or more MMLMs 110 are configured to accept input in a specific format or of a specific file type. The data extraction manager system 114 may convert a document from the OCR system 106 to the accepted file type prior to sending the document to the one or more MMLMs 110. For example, a PDF may be converted to a portable network graphic (PNG) prior to communication to the one or more MMLMs 110. Additionally or alternatively, the one or more MMLMs 110 may include pre-processing that converts several different file types to the file type required by the one or more MMLMs 110.

In some embodiments, the documents processed by the data extraction and population system 100 include forms, applications, surveys, etc. for which the document or portion thereof (e.g., page, section, etc.) includes a request for information. The document or portion thereof may also include one or more predefined responses. For example, the document or portion thereof may include multiple-choice, multiple-select, and/or ranking type questions. The one or more MMLMs 110 may be configured to recognize the selections of predefined responses from the respondent to the request for information. For example, the one or more MMLMs 110 may recognize circles around text, check marks, filled in boxes or bubbles, as a selection of the related text. In some embodiments, the MMLM is configured (e.g., trained, fine-tuned, etc.) to determine the portion of the text that represents the request for information (e.g., the question, survey directions, etc.) and determine the text that represents the predefined responses. The one or more MMLMs 110 may be configured or prompted to process (e.g., consider) this information separately when generating a response.

In some embodiments, the one or more MMLMs 110 are used during document ingestion. The data extraction manager system 114 and/or the OCR system 106 may be configured to recognize that the document includes images, figures, layouts, tables, and/or other content that may benefit from processing. For example, the data extraction manager system 114 may consider a trade-off between the added cost and computations of using the one or more MMLMs 110 against the potential for improved retrieval (and therefore extraction) accuracy if the one or more MMLMs 110 are used. In some embodiments, the data extraction manager system 114 may request the one or more MMLMs 110 to create a vector embedding of the document or portion thereof (e.g., page, paragraph, section, etc.). Additionally or alternatively, the data extraction manager system 114 may request the one or more MMLMs 110 to generate a summary (e.g., a text-based summary) of the document or portion thereof. After a summary of the document or portion thereof is generated the one or more LLMs 108 may be used to create a vector embedding for the index.

The one or more UI clients 102 may provide users, administrators, and/or developers of the data extraction and population system 100 access to its features. In some embodiments, the one or more UI clients 102 are used to generate a user interface that allows for interaction with the components of the data extraction and population system 100. For example, the one or more UI clients 102 may be used to initiate data population, configure the data to populate or extract, view results, trace errors, view source material, and/or other interactions that may be appropriate for a particular use case. The one or more UI clients 102 provide various inputs (e.g., selecting user interface objects, entering text into fields, etc.) and various outputs (e.g., display, print, email, or transmission to another system) to/from the data extraction and population system 100. The one or more UI clients 102 may be configured to generate UI views (e.g., screens, windows, etc.) that based on instructions received from other components of the data extraction and population system 100 (e.g., from the data extraction manager system 114 and/or the prompt generation system 200).

The prompt generation system 200 may be configured to generate extractors (e.g., having retrieval parameters such as keywords, a ranking prompt, and/or an extraction prompt) to extract data entities (e.g., particular information) for use by the data extraction manager system 114. The extractors generated may include retrieval functionality. For example, the prompt generation system 200 may generate a number of keywords that can be used by the data extraction manager system 114 to retrieve relevant chunks that may include the data entity to be extracted. In some embodiments, the prompt generation system 200 also generates an intermediate prompt that is used by the data extraction manager system 114 to sort the chunks retrieved using the keywords (e.g., the ranking prompt). For example, the chunks may be sorted based on the probability (e.g., possibility, chance, a score, etc.) that the chunk includes the data entity for extraction. As described herein, an extractor generated by the prompt generation system 200 may include multiple prompts and/or keywords. For example, the extractor generated may include retrieval keywords, a ranking prompt, and/or an extraction prompt. Advantageously, the prompt generation system 200 provides high quality extractors for the data extraction manager system 114 that would otherwise be generated with human interaction. Further, the methods performed by the prompt generation system 200 generate extractors that have been optimized to perform more accurately and/or more efficiently that human-generated prompts.

The network 116 can include routers, switches, antennas, computers, and any other hardware required to communicate information between the components of the data extraction and population system 100 (e.g., from the data extraction manager system 114 to the one or more LLMs 108 or the one or more MMLMs 110). A portion of the network 116 can be wireless and/or a portion of the network 116 can be wired. The network 116 can include one or more networks with routers to facilitate data transfer between the different networks.

In one use case where the data extraction and population system 100 is particularly useful is to extract data for the underwriting process of insurance policies. For example, directors and officers liability insurance and/or environmental insurance require extracting large amounts of information for which there is no central repository. The information may be collected about the company, the directors and officers, and/or any business locations. Manually searching for this information is error prone and requires a large time investment for the underwriters. Moreover, much of the data that is to be extracted for insurance underwriting may be found in financial tables of image-based documents (e.g., PDFs) making the systems and methods of separating tabular information and text information described herein particularly useful in such use cases.

Continuing with the example of insurance underwriting, the user of the data extraction and population system 100 may be an insurance underwriter. They may have a specially curated set of data elements that they require to perform the underwriting process of different types of insurance policies. A type of insurance policy may be considered a task for which the data extraction and population system 100 is configured to populate the data elements of an ontological data store related to that type of insurance policy. The insurance policy may be associated with one subject (e.g., companies, people, buildings, etc.) for which the insurance policy is to be underwritten. After data is populated, the underwriter may review the information and or generate a report. For regulatory purposes, the data used to generate the report may require citation to the source of the information. Systems and methods described herein may allow for such traceability and generation of the appropriate citation.

With reference to FIG. 2, the data extraction and population system 100 performs the operations shown in a swimlane diagram 400 to extract a data entity (e.g., information) from one or more documents or chunks generated therefrom according to some embodiments. The swimlane diagram 400 illustrating certain operations within a method for data extraction and population and indicating the components or systems that perform the steps, according to some embodiments. The first swimlane is labeled "client device" and may refer steps that are performed by a user of the data extraction and population system 100, for example, using the one or more UI clients 102. The second swimlane is labeled "data extraction manager" and may refer to steps that are performed by the data extraction manager system 114. The third swimlane is labeled 'external systems" and may represent steps that are performed by the OCR system 106, the LM, or the text embedder 112. In general, the flow of the swimlane diagram 400 is from top to bottom. However, some steps can be performed in different orders and/or in parallel.

The client device may initiate request to begin data ingestion for data sources related to a subject (e.g., topic, company, person, place, etc.) in step 402. A user may, from the one or more UI clients 102, select a task, one or more data elements to be populated, and/or a subject about which to populate the data. The user interface may activate one of the APIs of a user interface controller, causing the data extraction manager system 114 to begin processing the request. The data extraction manager system 114 may gather data from internal and external systems (e.g., the one or more data sources 104) in a step 404. The external systems (e.g., in this case the OCR system 106) may perform OCR on image-based documents to return a response payload with tables indicated by markdown language in operation 406. For example, some of the gathered documents may be image-based (e.g., a PDF) that require conversion to plain text, while other documents may be already text based (e.g., from a website, etc.). The OCR system 106 ensures that text and tables are in a machine-readable format prior to further processing.

The data extraction manager system 114 may separate the response payload into a first portion having the one or more tables and a second portion having the document text in the step 408. In some embodiments, the step 408 is performed based upon a markdown language used by the OCR system 106. The markdown provided by the OCR system 106 may use symbols to represent a tabular structure (e.g., the vertical bar or pipe character, '|' may indicate the start of a table row and a new column within that row). The step 408 may include searching for certain patterns in the plain text (e.g., with markdown symbols) to determine where a table begins. In some embodiments, a text-based search or regular expressions can be used with wildcards in order to identify a table in plain text. For example, regular expression '\|.*?\|\n\n' may be used to find text (e.g., data, etc.) that is part of a table. After finding a row from a table, the portion of the table may be moved into another entry of the data store. After this process, the plain text (e.g., the first portion of the response payload) may have the tabular information removed, and the second portion of the response payload may have only the tabular information.

One or more table chunks from the first portion of the response payload and one or more text chunks from the second portion of the response payload are formed in step 410. Step 410 may include generating the table chunks that include the whole table, or a number of rows or columns of the table. Text chunks may include a number of characters, words, or tokens (e.g., 2000 characters, 500 words, 1000 tokens, etc.). In some embodiments, the token length is optimized based on a trade-off between the amount of information that is communicated to the LLM 108 (e.g., related to the cost, number of computations, or energy usage) and the accuracy of the result.

In some embodiments, the table chunks and text chunks are converted into a vector embedding in step 412. For example, the data extraction manager system 114 may use the text embedder 112 to generate a vector embedding of the table chunks and/or text chunks. Embedding the chunks may convert the text into a vector or array of numbers that represent the semantic meaning of the text. The table chunks and the text chunks may be converted into vector embeddings and stored in the index for semantic search during retrieval augmentation. Alternatively, only the text chunks are converted into vector embeddings, and the table chunks may be searched by text-based keyword search of the header column and/or the first row. After step 412 is performed, the ingestion process (e.g., the gathering and preparation of documents for the RAG system of the data extraction and population system 100) may be complete and the data extraction and population system 100 ready to respond to requests for data population.

In step 414 of the swimlane diagram 400, the user, by way of the one or more UI clients 102, may initiate request to perform data population. For example, the user may choose one or more data elements to populate, develop an ontology or data model, or otherwise indicate what data is to be extracted from the documents prepared in the ingestion process before initiating the request. In some embodiments, the request to begin data ingestion of step 402 and the request to perform data population of step 414 are included together, and the other components of the data extraction and population system 100 perform all steps to extract the data without user interaction.

The steps 416-426 of the swimlane diagram 400 describe how one or more data elements are extracted using a single prompt. In some embodiments, the steps 416-426 are repeated for a number of prompts to extract a number of data elements requested by the user. The steps 416-426 may be performed sequentially, in parallel, or in a combination of both sequential processing and parallel processing.

In step 416 a prompt associated with a data element to be populated may be obtained. For example, the prompt may have been previously generated by the prompt generation system 200 and stored within the data extraction manager system 114. In some embodiments, step 416 includes obtaining an extractor, including retrieval keywords, a ranking prompt, and an extraction prompt. The swimlane diagram 400 may continue with identifying relevant chunks for the prompt based on a search criterion in step 418. Identifying relevant chunks may be based on the retrieval keywords, the ranking prompt, and/or the extraction prompt. The step 418 may include generating scores indicative of the relevance for the various chunks indexed in step 412. For example, the scores may be based on a semantic search and/or a keyword search. Separating the tabular information from the text information, among other advantages, allows the table chunks and text chunks to be searched differently. For example, certain prompts may only search for table chunks by keyword, while other prompts may search based on a weighted score of both a semantic search process and a keyword search process.

In some embodiments, chunks matching one or more of the retrieval keywords are further processed by the ranking prompt, for example, to request an LM generate a score or otherwise rank the relevance of each of the chunks matching the keywords. In some embodiments, the score is based on a semantic search. For example, the extraction prompt may be embedded (e.g., converted to an embedding vector) and compared to the embedding vectors for the chunks. Chunks having an embedding vector similar to the embedding vector of the extraction prompt may receive a high score. For example, the score may be based on a distance (e.g., Euclidean, 1-norm, etc.) between the embedding vectors. Step 418 may include identifying all chunks for which the generated score exceeds a threshold (e.g., less than a threshold for a distance metric or greater than a threshold for a similarity score) or choosing a number of the highest scoring chunks. The identified chunks or portions of documents associated with the chunks may be augmented with the prompt in step 420 and sent (e.g., communicated), to the LM (e.g., of the one or more LLMs 108 and/or the one or more MMLMs).

In some embodiments, step 422 includes processing the prompt and communicating a response including data for the data element to be populated. For example, the LM may send the response to the data extraction manager system 114. The response may be validated in step 424. Accuracy of the responses obtained from the LM may be checked by the data extraction manager system 114. Each prompt template may store information about the expected response (e.g., type, length, acceptable range if numeric, etc.) which may used to determine if the response is appropriate for the type of data requested by the response. For example, in step 424, if a result is expected to be numeric, it is possible to check the semantic meaning of the response and determine if it is a number. Errors, for example, no response and/or data flagged in step 426 may be subjected to additional processing. For example, the identifier of the chunks identified in step 418 or the document and page of the source information for the chunk may be stored with the prompt so the user can trace the reason for the response and validate the data or note the reason for the error and populate the data manually.

After validation in step 424, the data of the response (e.g., a value, record, etc.) may be stored in a data store associated with the data element to be populated. For example, the data may be stored as a key value pair where the data element is the key, and the value is the response from the LM generated in step 422. Stored data may be delivered to a user interface and may be viewed by the user in step 428. In the event of an error, the user may adjust prompt format, and/or fill in missing data using chunk traceability in step 428.

Prompt Generation System

FIG. 3 shows a block diagram of the prompt generation system 200, according to some embodiments. In some embodiments, the prompt generation system 200 is configured to generate extractors (e.g., prompts, instructions, keywords, parameters, etc.) for the data extraction manager system 114. Prompt generation (e.g., and generation of instructions/parameters) may be performed on a data entity by data entity basis. For example, the methods described herein may be performed for one data entity before performing the methods for a second data entity, thereby resulting in a data entity. In some embodiments, prompt generation (e.g., extractor generation) for a data entity is independent of generation for other data entities. Prompt generation may be performed in parallel for different data entities (e.g., on different processors, processing circuits, computers, etc.).

The prompt generation system 200 may generate the prompts, instructions, keywords, and/or parameters (e.g., extractors) using a number of training chunks. The training chunks may be divided into a number of batches. The batches may be configured based on a common characteristic. For example, the batches may be based on the business for which extraction is being performed, the type of document from which extraction is being performed, or any other characteristic that may be used to filter the chunks prior to performing extraction within the data extraction manager system 114. The batches may be used to be representative of the chunks that the retrieval and/or extraction functions may encounter when executing the extractor or prompt in the data extraction manager system 114. In some embodiments, the training chunks include chunks for which annotating the entities included in a chunk has been manually performed. For example, for a given data entity each training chunk having (e.g., including) the data entity (e.g., the value for the data entity) may be labeled. Additionally or alternatively, the chunks may not be previously labeled as having the data entity, the prompt generation system 200 can generate the labels if the ground truth value (e.g., a validated value) for the data entity is known. For example, the prompt generation system 200 can generate labels if the ground truth was manually identified (e.g., labeled) or identified by another system; however, which of the chunks that include the ground truth values was not previously labeled.

The prompt generation system 200 of FIG. 2 is shown as a single entity (e.g., hardware). However, it is contemplated that the components and/or instruction sets included in the prompt generation system 200 could be distributed over any number of computer hardware devices and in any manner of architecture (e.g., local network, cloud-based, etc.).

The prompt generation system 200 is shown to include a communications interface 202, and one or more processing circuits 204 having one or more processors 206 and memory 208.

The communications interface 202 may be configured to facilitate communication between the prompt generation system 200 and other components of the data extraction and population system 100. For example, the communications interface 202 may transmit information onto the network 116 and/or receive information from the network 116.

The one or more processors 206 may be general purpose or specific purpose processors, an application specific integrated circuit (ASIC), one or more field programmable gate arrays (FPGAs), a group of processing components, or other suitable processing components. The one or more processors 206 may be configured to execute computer code and/or instructions stored in the memory 208 or received from other computer readable media (e.g., CDROM, network storage, a remote server, etc.). The one or more processors 206 may be configured in various computer architectures, such as graphics processing units (GPUs), distributed computing architectures, cloud server architectures, client-server architectures, or various combinations thereof. A first set of the one or more processors 206 can be implemented by a first device, such as an edge device, and a second set of one or more processors 206 can be implemented by a second device, such as a server or other device that is communicatively coupled with the first device and may have greater processor and/or memory resources.

The memory 208 may include one or more devices (e.g., memory units, memory devices, storage devices, etc.) for storing data and/or computer code for completing and/or facilitating the various processes described in the present disclosure. The memory 208 may include random access memory (RAM), read-only memory (ROM), hard drive storage, temporary storage, non-volatile memory, flash memory, optical memory, or any other suitable memory for storing software objects and/or computer instructions. The memory 208 may include database components, object code components, script components, or any other type of information structure for supporting the various activities and information structures described in the present disclosure. The memory 208 may be communicably connected to the processors and can include computer code for executing (e.g., by the processors) one or more processes described herein. For example, many of the components of the prompt generation system 200 illustrated in FIG. 3 may be implemented as instruction sets stored by the memory 208 and executed by the one or more processors 206.

In FIG. 3, the prompt generation system 200 is shown to include a coordinator 212, an interface manager 214, a constraint manager 216, a training data manager 220, a keyword identifier 240, a chunk ranker 260, and a prompt generator 280. The coordinator 212 may be configured to control the timing and flow of data through the other circuitry of the prompt generation system 200. For example, the coordinator 212 may cause the instruction sets or circuits to execute in a specific order to perform the function of prompt generation system 200. In some embodiments, the coordinator 212 may route the information and/or outputs of other instruction sets that are dependent on the information or use the information as an input.

The interface manager 214 may be configured to allow interaction with the prompt generation system 200. The interface manager 214 may provide instructions to the one or more UI clients 102 (e.g. JavaScript, Cascading Style Sheets) that instruct the one or more UI clients 102 how to generate the user interface within a client application (e.g., an internet browser, a proprietary application, etc.). In some embodiments, the interface manager 214 can provide APIs that cause various functionality of the prompt generation system 200 to be triggered. For example, the prompt generation system 200 may cause the one or more UI clients 102 to generate a user interface that includes checkboxes (e.g., to initiate extractor generation, rerun a portion of extractor generation, etc.) and a button to send the request to begin processing. The interface manager 214 may also provide instructions to display the results of the extractor generation system 200. For example, the interface manager 214 may display the accuracy of chunk retrieval based on a set of keywords, various statistics and/or metrics related to the keywords, data extraction accuracy for a particular data element, etc.

In some embodiments, the interface manager 214 is configured to generate instructions for a UI that indicates feedback from users of the data extraction manager system 114. For example, the data extraction manager system 114 may track changes to values extracted for certain data entities. Changes to extracted values for data entities may be indicative of an extraction error. The prompt generation system 200 may receive the feedback related to the changed value including the data entity, the extracted value (e.g., identified by the data extraction manager system 114), and the value to which the data entity was changed. Other indications of incorrect extraction results may also be received by the prompt generation system 200 as feedback. The UI generated by the interface manager 214 may display the feedback, root cause analysis information (e.g., details, data, etc.) related to a reason for the failed extraction, and suggested adjustments to the keywords, the ranking prompt, and the extraction prompt to improve the extraction (e.g., prevent the failure). In some embodiments, the interface manager 214 generates a UI element that allows a user (e.g., developer, prompt engineer, etc.) to accept the suggested changes to the keywords, the ranking prompt, or the extraction prompt based on feedback related to a failure and/or feedback related to several failures that may be aggregated in the UI.

In some embodiments, instructions communicated to the one or more UI clients 102 from the interface manager 214 include the ability to view errors that have occurred during the processing. For example, if final extraction accuracy is less than a threshold amount, a warning indicator may be displayed on the UI along with information related to the failed batches and/or a root cause analysis for the failure. For example, the root cause analysis may be generated by a language model of the one or more LLMs 108.

The constraint manager 216 provides constraints to the generation of the keywords and/or prompts during generation. For example, the constraint manager 216 may include one or more rules that cannot be violated. The rules may include legal restrictions, prevent biases, provide formatting requirements, etc. The constraints provided by the constraint manager 216 may depend on the data entity being extracted. In some embodiments, the constraint manager 216 provides the constraints to the language model performing a portion of the extractor generation in the form of text. The text of the constraint may be provided as part of a prompt or meta-prompt to the language model.

The constraint manager 216 may also provide descriptions of terms. For example, the constraint manager 216 may define a data entity to be extracted, provide a method or formula for calculating the data entity from other information, provide an output unit system, etc. Non-limiting examples of the text that the constraint manager 216 may provide include "If you cannot find [data entity] you should reply with a double dash '——'," "[data entity] should be returned as an integer value," or "remove punctuation from any numerical values." The The training data manager 220 may be configured to generate and/or store the training data for the prompt generation system 200. In some embodiments, the training chunks are the same for all data entities for which keywords, prompts, and/or parameters are to be generated. Alternatively, the training chunks may be different (e.g., and separately stored) for each of the data entities. The training data manager 220 is shown to include a batch creator 222, a chunk labeler 224, and a feedback manager 226.

In some embodiments, the training data is divided into a number of batches based on a common characteristic. For example, the batches may be based on the business for which extraction is being performed, the type of document from which extraction is being performed, or any other characteristic that may be used to filter the chunks prior to performing extraction within the data extraction manager system 114. The batches used may be representative of the chunks that the retrieval and/or extraction functions may encounter when executing in the data extraction manager system 114. When performing extractor generation, the training data may include the training chunks and, for each batch, labels indicating the chunk (or chunks) in which the value for the data entity can be found. For example, a batch may be a data structure stored within the prompt generation system 200. The data structure may include identifiers for the chunks included within the batch and the chunk(s) which include the data entity for which extractor generation is being performed.

In some embodiments, the training chunks may be stored based on the one or more characteristics used to generate batches. Alternatively, all training chunks may be stored in the same database, data table, etc. The batch creator 222 may be configured to generate batches based upon the common characteristic. For example, the batch creator 222 may perform a database query with the appropriate filters to generate each batch. In some embodiments, the batch creator 222 may first determine the unique values of the characteristic stored in the database to determine the number of batches that will be created and to determine the filter parameters to use during generation of the batches. The batch creator 222 may be configured to run on demand, for example, to generate the batches at the time the extractors are generated. Alternatively, the batch creator 222 may generate batches prior to execution and store the batch for later use.

In some scenarios, the chunk that includes the data entity may not be known (e.g., it may not have been previously identified and/or stored in the prompt generation system 200). The chunk labeler 224 may be configured to determine (e.g., label, identify, mark, etc.) the chunk that includes the value of the data entity for which extractor generation is being performed. The chunk labeler 224 may be provided with a known ground truth value for the data entity within each batch. For example, the ground truth value may have been previously extracted and/or validated by a developer or other subject matter expert. For each batch, the chunk labeler 224 may generate a prompt (also referred to as a meta-prompt to distinguish the prompts generated/used by the prompt generation system 200 to generate the output prompts for the data extraction manager system 114 from the ranking and/or extraction prompts that are generated). The meta-prompt may include the chunks of the batch, the ground truth value of the data entity for the batch, and a request to identify the chunk that includes the value of the data entity. By prompting the one or more LLMs 108 with the meta-prompt the chunk labeler 224 may identify the chunk of the batch that includes the data entity (e.g., the ground truth value of the data entity). The chunk labeler 224 can perform similar prompting for each batch to develop the training data for each data entity.

The training data manager 220 may also include a feedback manager 226 configured to receive an indication of an incorrect extraction and improve the extractor (e.g., the keywords, the ranking prompt, and the extraction prompt) to avoid similar errors in the future. The data extraction manager system 114 may provide data related to the incorrect extraction to the feedback manager 226. For example, the feedback manager 226 may receive the content from which data was to be extracted (e.g., chunks), the incorrect value that was initially extracted by the data extraction manager system 114, and/or the corrected (e.g., user-provided, etc.) value for the data entity. Based on the data received, the feedback manager 226 may trigger various portions of the prompt generation system 200 in order to adjust (e.g., improve, modify, etc.) the extractor. For example, the feedback manager 226 may cause the execution of one or more portions of the keyword identifier 240 to generate new keywords for the incorrectly extracted data entity, may cause the execution of one or more portions of the chunk ranker 260 to generate a new ranking prompt to ensure that the most relevant chunks are provided to the one or more LMs (e.g., the one or more LLMs 108 and/or the one or more MMLMs 110), and/or may cause the execution of one or more portions of the prompt generator 280 to generate new extraction prompts or augment the extraction prompts for the data entity.

In some embodiments, the feedback manager 226 may be configured to operate on a schedule. For example, the feedback manager 226 may store (e.g., save, collect, etc.) feedback on incorrect extractions for a period of time (e.g., a day, a week, a month, etc.) and at the end of the period adjust multiple extractors (e.g., for each of the data entities for which new feedback was stored). In some embodiments, the feedback manager 226 may be configured to operate on demand. For example, the feedback manager 226 may adjust an extractor after the feedback manager 226 has collected an amount of feedback from incorrect extractions for that extractor (e.g., five incorrect extractions, ten incorrect extractions, etc.) In some embodiments, the feedback manager 226 adjusts an extractor each time that it receives feedback related to an incorrect extraction. The feedback manager 226 may be configured to execute a full retraining of the extractors using the newly received training data (e.g., from the feedback) or to perform a root cause analysis related to the newly received training data.

The feedback manager 226 may also be configured to store (e.g., save, collect, etc.) data related to correct extractions. For example, the data extraction manager system 114 may provide content from which data was to be extracted (e.g., chunks) and the correct value that was initially extracted by the data extraction manager system 114 (e.g., the user may indicate using the UI of the data extraction manager system 114 that the extraction was correct). In some embodiments, the feedback manager 226 may use the information related to correct extractions during adjustment of the extractor. For example, the feedback manager 226 may provide stored, correct extractions during adjustment to prevent bias towards incorrect selections by ensuring that the adjusted extractors do not introduce issues for extraction tasks that were accurate previously.

The keyword identifier 240 may be configured to generate an optimized set of keywords that can be used during retrieval augmentation. For example, the keyword identifier 240 may generate keywords that are ultimately used by a search function within the data extraction manager system 114 during extraction of the data entity for a new batch of chunks (e.g., a new customer, new business, etc.). The keyword identifier 240 is shown to include a keyword generator 242, a keyword optimizer 248, a retrieval manager 244, and a retrieval validator 246.

The keyword generator 242 may be configured to generate a set of keywords for a data entity based on chunks known to include the data entity. In some embodiments, the keyword generator 242 uses the one or more LLMs 108 to generate keywords. The keyword generator 242 may generate a meta-prompt for the one or more LLMs 108 to generate the keywords. The meta-prompt may include a number of chunks (e.g. 3, 5, all of the chunks, etc.) across the training chunks (e.g., across any number of the batches) known to include the data entity (e.g., a value for the data entity) and a request to identify (e.g., generate, find, produce) one or more keywords that can be used to retrieve the chunks. The meta-prompt may also include constraints from the constraint manager 216. For example, constraints may include words that are not allowed to be used as keywords, such as common words that would provide little value during retrieval. The constraints may also include a limit to the number of words in a keyword. For example, the constraint manager 216 may limit keywords to two words or an n-gram of a different size. The keyword generator 242 may communicate the meta-prompt to the one or more LLMs 108 and use the response as the keywords.

In some embodiments, the keyword generator 242 uses search engine-based approaches to generate keywords for chunk retrieval. For example, the keyword generator 242 may identify keywords that occur at a higher-than-normal frequency within the chunks including the data entity. The keyword generator 242 may generate frequency metrics related to the keywords. For example, the keyword generator 242 may use term-frequency and inverse document frequency (TF-IDF) to identify the keywords for retrieval augmentation.

The keyword optimizer 248 may be configured to determine an optimal set of keywords. The keyword optimizer 248 may provide multiple functionalities to generate the optimal set of keywords. In some embodiments, the keyword optimizer 248 is configured to generate additional keywords from a set of unretrieved chunks having the ground truth value for the data entity but that failed to be retrieved using the current keyword list. For example, the keyword optimizer 248 may generate a meta-prompt and/or a series of prompts (e.g., in a chain-of-thoughts format) that include the set of unretrieved chunks and one or more requests. The keyword optimizer 248 may request the one or more LLMs 108 to determine why the set of unretrieved chunks was not retrieved. Additionally or alternatively, the keyword optimizer 248 may request the one or more LLMs 108 to generate additional keywords (e.g., not in the current keywords and/or complementary to the current keywords). The keyword optimizer 248 may combine (e.g., merge, etc.) the additional keywords with the current keywords. For example, merging may include augmenting the list of keywords or adding the additional keywords while removing one or more current keywords.

In some embodiments, the keyword optimizer 248 is configured to calculate a number of statistics or scores related to the performance of the keywords (e.g., individually and/or as a whole). The keyword optimizer 248 may use the statistics to prune the set of keywords. For example, eliminating some keywords that do not enhance performance while adding those additional keywords that do. Language models can fail to extract the correct information when too much context is provided in the form of retrieved chunks. While retrieving a large number of chunks may ensure that the desired data entity is provided to the language model, there is no guarantee that the language model will have a context window large enough to support the large number of chunks. Thus, the language model may fail to extract the data entity and perform a significant number of wasteful computations in its failure if too many chunks are provided. Advantageously, the keyword optimizer 248 may prune the keywords (and thereby reduce the number of chunks retrieved and provided to the language model) using the statistics.

In some embodiments, the keyword optimizer 248 calculates a coverage ratio. The coverage ratio may indicate the fraction of chunks retrieved having the data entity compared to the total number of chunks having the data entity. The coverage ratio may represent a probability that the keywords would retrieve a chunk having the data entity when used by the data extraction manager system 114 during retrieval augmentation. The coverage ratio may be calculated for a set of keywords and/or individual keywords. The keyword optimizer 248 may also calculate an effectiveness ratio. The effectiveness ratio may compare the total number of chunks retrieved to the total number of chunks having the data entity. The effectiveness ratio may indicate the amount of irrelevant context provided to the language model. For example, if "the" were used as a keyword, it would likely have a coverage ratio near 100% but also retrieve all the chunks, leading to inefficient extraction.

In some embodiments, the keyword optimizer 248 merges the keywords by selecting a set of keywords having the best effectiveness ratio (e.g., highly selective keywords that target the data entity efficiently) and provide a coverage ratio above a threshold (e.g., greater than 95%, 98%, 99%, etc.). In some embodiments, the keyword identifier 240 determines whether to continue generating keywords or to stop based on the statistics calculated by the keyword optimizer 248. For example, the keyword identifier 240 may be configured to continue generating keywords until the coverage ratio and/or effectiveness are above a predetermined threshold. The keyword identifier 240 may stop iterations after reaching the predetermined threshold. In some embodiments, the keyword identifier 240 is, additionally or alternatively, configured to stop after little or no improvement in the statistics occurs for a number of iterations (e.g., 2 iterations, 5 iterations, etc.).

The retrieval manager 244 may be configured to perform a retrieval process (e.g., function) using the one or more keywords. In some embodiments, the retrieval manager 244 performs the same retrieval process that will be performed by the data extraction manager system 114 during retrieval augmented extraction. Alternatively, the retrieval manager 244 may communicate with the data extraction manager system 114 to perform the retrieval process using the instructions and/or processing circuits of the data extraction manager system 114. The retrieval manager 244 may use a set of keywords as an input and output a number of chunks determined to be relevant based on the keywords.

The retrieval validator 246 may be configured to determine chunks having the data entity that were not retrieved. For example, the retrieval validator 246 may compare the chunks retrieved to the chunks from the training set known to include the data entity. The retrieval validator 246 may output the chunks that were not retrieved to the keyword optimizer 248 for processing. For example, to generate additional keywords to provide better coverage.

The keyword identifier 240 may be configured to perform, for semantic search, similar functionality as described herein for keywords and a keyword search. For example, instead of generating a number of keywords, the keyword identifier 240 may generate phrases and/or sentences from the chunks having the data entity. In some embodiments, these phases and/or sentences are used by the data extraction manager system 114 during a semantic search during retrieval augmented extraction. In some embodiments, semantic search of the data extraction manager system 114 may include a bag-of-words type search where order and context of the words may be ignored. In such embodiments, the keywords generated by the keyword identifier 240 may be used by either a semantic search, a keyword search, or both types of search strategies within the data extraction manager system 114.

The chunk ranker 260 may be configured to generate a prompt for ranking a group of chunks based on the probability (e.g., possibility, chance, or other score) that a chunk includes the data entity. The chunk ranker 260 may generate a ranking prompt or parameters for another ranking functionality that can be used by the data extraction manager system 114 during retrieval augmented extraction. Advantageously, by ranking the chunks, the number of chunks provided to the one or more LLMs 108 during extraction, may be reduced, thereby improving the accuracy of the data extraction manager system 114 may be improved (e.g., by providing shorter and more relevant context) while also reducing the computational expense (e.g., by providing fewer words/tokens and or shorter text to the one or more LLMs 108). The chunk ranker 260 is shown to include an initial ranking prompt generator 262, a ranking executor 264, a ranking validator 266, a failed ranking root cause analyzer 268, and a ranking prompt optimizer 270.

The chunk ranker 260 may perform a recursive procedure whereby a ranking prompt is generated, executed (e.g., run, communicated to a language model, etc.), the response to the prompt is received and evaluated, and the batches for which ranking performs poorly are used to adjust (e.g., optimize, modify, etc.) the prompt. The steps may be repeated until a stopping criterion is achieved. For example, the stopping criterion may be a fraction of the batches satisfying a ranking criterion (e.g., the chunk that has the ground truth value ranks in the top number of ranked chunks). Alternatively, the chunk ranker 260 may terminate after a specified number of iterations or after the prompt no longer changes or changes by an insignificant amount.

In some embodiments, the initial ranking prompt generator 262 generates an initial prompt to cause the one or more LLMs 108 to rank the group of chunks based on the probability that a chunk includes the data entity. The initial ranking prompt generator 262 may generate a meta-prompt requesting the one or more LLMs 108 to generate the initial ranking prompt using a one-shot or multi-shot prompting technique. The initial ranking prompt generator 262 may generate a meta-prompt having, for a number of batches (e.g., 1 batch, 3 batches, etc.), chunks from the batch, and an identification of the chunk that has the ground truth value for the data entity. The meta-prompt may also include a request to generate instructions (e.g., for another language model of the one or more LLMs 108) to rank chunks based on the probability that they contain the ground truth value for the data entity within the batch.

Additionally or alternatively, the initial ranking prompt generator 262 may generate an initial ranking prompt using a prompt template. The prompt template may incorporate metadata for the data entity. For example, the prompt template may incorporate a description of the data entity, a name of the data entity, etc. In some embodiments, the initial ranking prompt generator 262 may use the prompt template to generate an initial ranking prompt by filling in the template with information related to the metadata of the data entity. For example, the resulting prompt may be "Rank the following chunks based on the likelihood they include the total resource expenditure of company B." Where "total resource expenditure" is the name of the data entity and "company B" is the name of the company (e.g., the common characteristic for the batch) and have been used to complete the prompt template. The ranking prompt may include the chunks that are to be ranked. In some embodiments, the ranking prompt (e.g., the request of the prompt and the chunks) is provided as a series (e.g., set, sequence, etc.) of prompts.

The ranking executor 264 may perform a similar ranking functionality as the data extraction manager system 114 when performing extraction. For example, the ranking executor may prompt the one or more LLMs 108 with the prompt generated by the initial ranking prompt generator 262. In some embodiments, the prompt generator may perform a semantic comparison between (i) the prompt or other similar text used and (ii) the chunks for the same batch. For example, the ranking executor 264 may generate an embedding of the ranking prompt and the chunks and calculate a distance between the embeddings. The chunk having the embedding with the smallest distance to the embedding of the ranking prompt may be ranked the highest. The ranking executor 264 may perform a ranking of a number of chunks of a batch. The chunks, for example, may include all the chunks of the batch, a set of chunks of the batch (e.g., selected at random), and/or the chunks retrieved using keywords for the data entity generated by the keyword identifier 240. In some embodiments, the ranking executor 264 provides all the chunks to be ranked in a single prompt. Alternatively, the ranking executor 264 may provide each chunk individually with a request to estimate the probability (or other score). The ranking executor 264 may then rank the chunks based on the probability (or other score) received from the one or more LLMs 108.

The ranking executor 264 may also be used to execute ranking prompts (e.g., or semantic comparisons, other ranking functionality) generated by the ranking prompt optimizer 270. For example, after the ranking executor 264 ranks the chunks the ranking validator 266 may validate the ranking so that the ranking prompt optimizer 270 can be used to make adjustments (e.g., improvements to the ranking prompt for subsequent iterations.

After the ranking executor 264 ranks the chunks, the ranking validator 266 may validate the ranking. The ranking validator 266 may validate the ranking by determining whether the chunk of a batch having the data entity is included in a highly ranked chunk. For example, the ranking validator 266 may use a rank validation criterion that accepts the ranking if the chunk having the data entity is included in the top N ranked chunks (e.g., where N is any integer number such as 3 or 5) and fails the ranking of the batch if the rank validation criterion is not satisfied. Alternatively, the rank validation criterion may be based upon a threshold ratio of chunks rather than an integer number. For example, the ranking validator 266 may accept the ranking if the chunk having the data entity is in the top 5%, 10%, etc. of the retrieved chunks.

The batches identified as failed ranking by the ranking validator 266 may be communicated to the failed ranking root cause analyzer 268 to perform root cause analysis and determine why the chunks were improperly ranked. The failed ranking root cause analyzer 268 may be configured to generate a meta-prompt for the one or more LLMs 108 including a failed batch (or chunks thereof), the original ranking prompt, and a request to generate text indicating the reason why the chunk having the data entity did not satisfy the ranking criterion (e.g., was not highly ranked). Additionally or alternatively, the failed ranking root cause analyzer 268 may request the one or more LLMs 108 generate instructions to improve the ranking prompt (e.g., by adding instructions to the prompt, modifying the initial description of the data entity, etc.) The response from the one or more LLMs 108 (e.g., the text indicating the reason) to the meta-prompt for each of the failed responses may be provided to the ranking prompt optimizer 270 to generate an improved ranking prompt.

In some embodiments, the failed ranking root cause analyzer 268 generates an individual prompt for the one or more LLMs 108 for each batch that failed ranking. The failed ranking root cause analyzer 268 may store the response (e.g., the root cause analysis reports and/or instructions from the one or more LLMs 108) to each request from the one or more LLMs 108. The failed ranking root cause analyzer 268 may generate an additional prompt to request that the one or more LLMs 108 summarize the stored responses (e.g., the root cause analysis report and/or the improvement instructions). The summary of the failed responses may be provided to the ranking prompt optimizer 270 to generate an improved ranking prompt. Additionally, on subsequent iterations performed by the chunk ranker 260, the ranking prompt optimizer 270 may be provided new instructions and root cause analysis reports generated by the failed ranking root cause analyzer 268 and one or more summaries stored during previous iterations. Advantageously, providing additional previous combining previous summaries with new instructions adds stability (e.g., convergence, less overshoot, etc.) to the iterative procedure by causing overall adjustments to the prompt to be smaller on subsequent iterations.

In some embodiments, the ranking prompt optimizer 270 receives a root cause analysis for batches of training chunks that failed to satisfy the rank validation criterion for the current meta-prompt. The ranking prompt optimizer 270 may adjust the ranking prompt based on the root cause analysis for any number of the batches (e.g., the batches that failed to satisfy the rank validation). In some embodiments, the ranking prompt optimizer 270 generates a meta-prompt for the one or more LLMs 108 that includes the root cause analysis, the current ranking prompt, and a request to adjust the ranking prompt. In some embodiments, the request to adjust the ranking prompt may include language similar to a step-size or a learning rate (e.g., indicating an extent of an adjustment) that causes the ranking prompt optimizer 270 to make minor adjustments to the ranking prompt while avoiding large changes that would fail to converge. For example, the request to adjust the ranking prompt may include language similar to "make a small adjustment to the ranking prompt to improve the root causes identified" or "refine the ranking prompt incrementally to improve the root causes identified." In some embodiments, the meta-prompt may also include language related to a stopping criterion. For example, the meta-prompt may include language similar to "provide an indication if you believe no improvements are possible." The chunk ranker 260 may stop adjustments when the indication is received. Additionally or alternatively, the chunk ranker 260 may stop adjustments when fewer than a threshold amount of batches fail ranking (e.g., when the accuracy criterion is achieved).

Generating a ranking prompt using the chunk ranker 260 has been shown to cause the chunk having the data entity to be ranked in the top 2 chunks a large majority of the time, even when a large number of chunks are provided to the chunk ranker 260.

The prompt generator 280 may be configured to generate and adjust (e.g., refine, enhance, optimize, etc.) an extraction prompt to extract the data entity from a batch of the training chunks or a subset thereof. The extraction prompt generated may be used by the data extraction manager system 114 for extraction of the data entity for a new batch (e.g., new customer, etc.). The prompt generator 280 is shown to include a seed prompt generator 282, an extraction executor 284, an extraction validator 286, a failed extraction root cause analyzer 288, and an extraction prompt optimizer 290.

The prompt generator 280 may perform a recursive procedure whereby an extraction prompt is generated, executed (e.g., ran, communicated to a language model, etc.), the response to the prompt is received and evaluated, and the batches for which the extracted values for the data entity are incorrect are used to adjust the extraction prompt. The steps may be repeated until a stopping criterion is achieved. For example, the stopping criterion may be predefined fraction of the batches satisfying an accuracy criterion (e.g., a predefined fraction extracts the correct information). Alternatively, the prompt generator 280 may terminate after a specified number of iterations or after the extraction prompt no longer changes or changes by an insignificant amount.

The seed prompt generator 282 may be configured to generate an initial extraction prompt that can be used to start the prompt optimization process. Alternatively, the prompt generator 280 may be provided with an initial prompt, for example, by a developer or other subject matter expert by way of the user interface. However, advantageously, the seed prompt generator 282 allows the prompt to be generated without user interaction.

In some embodiments, the seed prompt generator 282 is provided a set of chunks (e.g., with 1 member, 3 members, 5 members, etc.) known to have a value for the data entity for which the prompt is being generated. Each chunk of the set of chunks is paired with the ground truth value for the data entity. The set of chunks may be selected at random from all batches. The seed prompt generator 282 may generate a meta-prompt including the pairs of a chunk and a corresponding ground truth value and request the one or more LLMs 108 to generate instructions (e.g., that may be used as an extraction prompt) for the data entity using the provided examples. The instructions generated via one or more LLMs 108 in response to the meta-prompt may be received by the seed prompt generator 282 and used as an initial prompt for further optimization.

The extraction executor 284 may be configured to perform extraction for each of the batches using the seed prompt (or in later iterations, the current version of the extraction prompt). In some embodiments, the extraction executor 284 performs the same extraction process that will be performed by the data extraction manager system 114 during retrieval augmented extraction. Alternatively, the extraction executor 284 may communicate with the data extraction manager system 114 to perform the extraction process using the instructions and/or processing circuits of the data extraction manager system 114. In some embodiments, the prompt generator 280 uses the extraction executor 284 to perform the retrieval and/or the ranking steps prior to performing extraction (e.g., to tune the generated extraction prompt to the previously generated retrieval and ranking processes). Additionally or alternatively, the prompt generator 280 may retrieve chunks at random to include with the chunk having the data entity to be extracted (e.g., to provide a larger number of training examples with which to optimize the extraction prompt).

After the value for the data entity has been extracted by using the extraction executor 284, the extraction validator 286 may validate the extraction. The extraction validator 286 may validate the extraction by comparing the extracted value for the data entity to the known ground truth value for that batch. The batches identified as failed extractions by the prompt generator 280 may be communicated to the failed extraction root cause analyzer 288 to perform root cause analysis and determine why the value for the data entity was improperly retrieved.

The failed extraction root cause analyzer 288 may be configured to generate a meta-prompt for the one or more LLMs 108 including a failed batch (or chunks thereof), the original extraction prompt, and/or a request to generate text indicating the reason why the value for the data entity was not extracted. In some embodiments, the failed extraction root cause analyzer 288 generates a prompt for the batches that fail extraction and requests reasons why the batches failed (e.g., as a list or a summary). Alternatively, the failed extraction root cause analyzer 288 may generate a similar prompt for each of the batches that fail. The failed extraction root cause analyzer 288 may store the response (e.g., the root cause analysis reports for the incorrect extraction and/or the instructions to improve the extraction request) to each request from the one or more LLMs 108. The summary of the failed responses may be provided to the extraction prompt optimizer 290 to generate an improved extraction prompt. Additionally, on subsequent iterations performed by the prompt generator 280, the extraction prompt optimizer 290 may be provided new instructions and root cause analysis reports generated by the failed extraction root cause analyzer 288 and one or more summaries stored during previous iterations. Advantageously, combining previous summaries with new instructions adds stability (e.g., convergence, less overshoot, etc.) to the iterative procedure by causing overall adjustments to the extraction prompt to be smaller on subsequent iterations.

In some embodiments, the extraction prompt optimizer 290 receives a root cause analysis for batches of training chunks for which the extraction prompt failed to appropriately extract the value for the data entity. The extraction prompt optimizer 290 may adjust the extraction prompt based on the root cause analysis for any number of the batches and/or chunks within the batches (e.g., the set of chunks provided with the extraction prompt for extraction). In some embodiments, the extraction prompt optimizer 290 generates a meta-prompt for the one or more LLMs 108 that includes the root cause analysis, the current extraction prompt, and a request to adjust the extraction prompt. In some embodiments, the request to adjust the extraction prompt may include language similar to a step-size or a learning rate that causes one or more LLMs 108 to make minor adjustments to the extraction prompt while avoiding large changes that would fail to converge. For example, the request to adjust the extraction prompt may include language similar to "make a small adjustment to the provided prompt to improve the root causes for batches that failed extraction identified" or "refine the provided extraction prompt incrementally to improve the root causes identified for batches that failed extraction." In some embodiments, the meta-prompt may also include language related to a stopping criterion. For example, the meta-prompt may include language similar to "provide an indication if you believe no improvements are possible." The prompt generator 280 may stop adjustments when the indication is received. Additionally or alternatively, the prompt generator 280 may stop adjustments when fewer than a threshold amount of batches fail extraction (e.g., when an extraction accuracy criterion is achieved).

Extraction of the values for the data entities has been tested using prompts generated by the prompt generator 280 have shown results of over 80% accuracy on a data set of 126 batches. These accuracies may represent an improvement over human-generated extraction prompts. The extraction prompts can also be generated in under a minute, demonstrating a large computational improvement compared to the number of tests that would be performed if a human-in-the-loop were making changes to the extraction prompt based on the extraction requests.

Figure 4A:
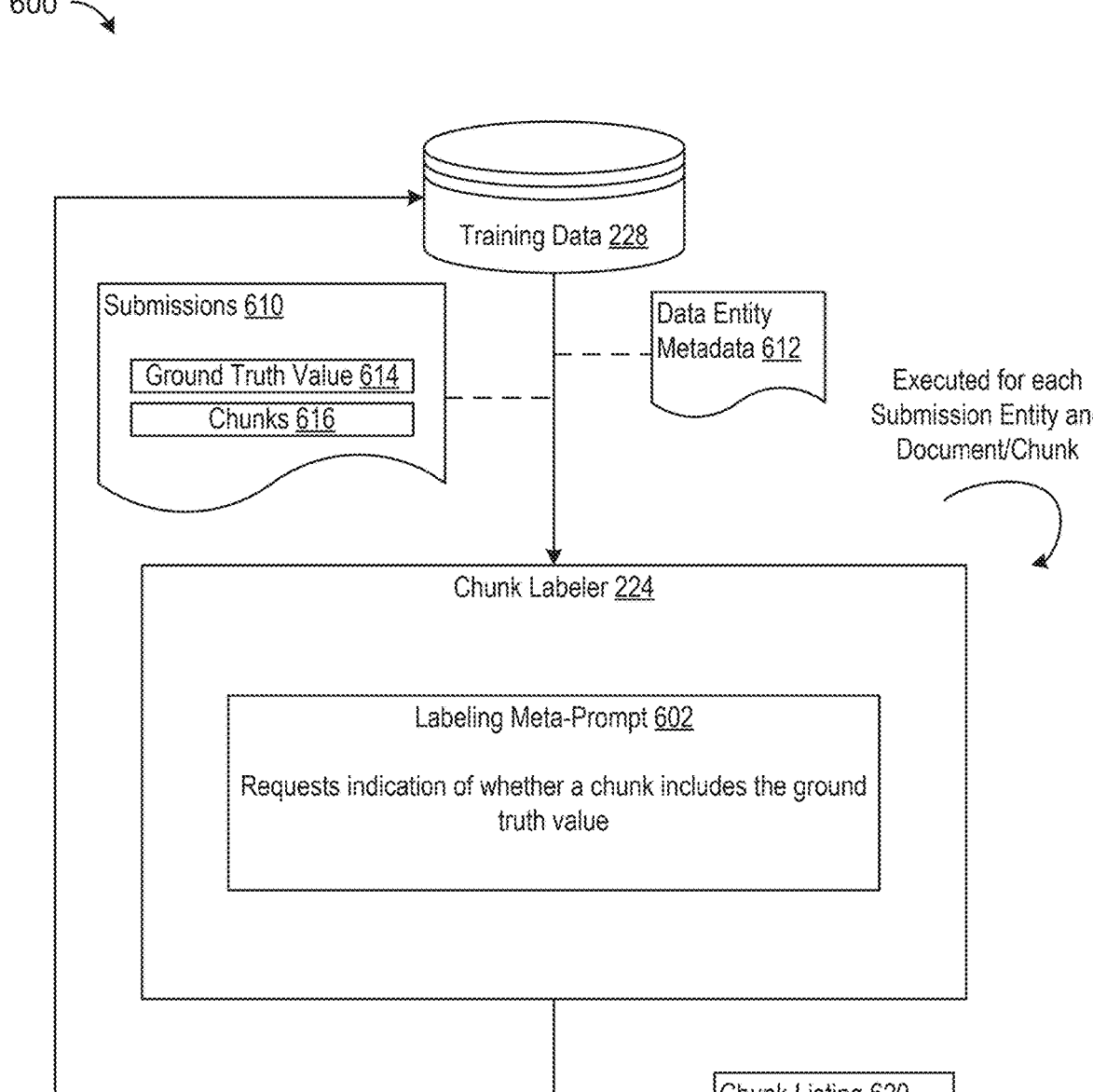
FIG. 4A is a data flow diagram for creating a training data set having chunks labeled according to whether they include the ground truth value for a data entity, according to some embodiments.
Figure 4B:
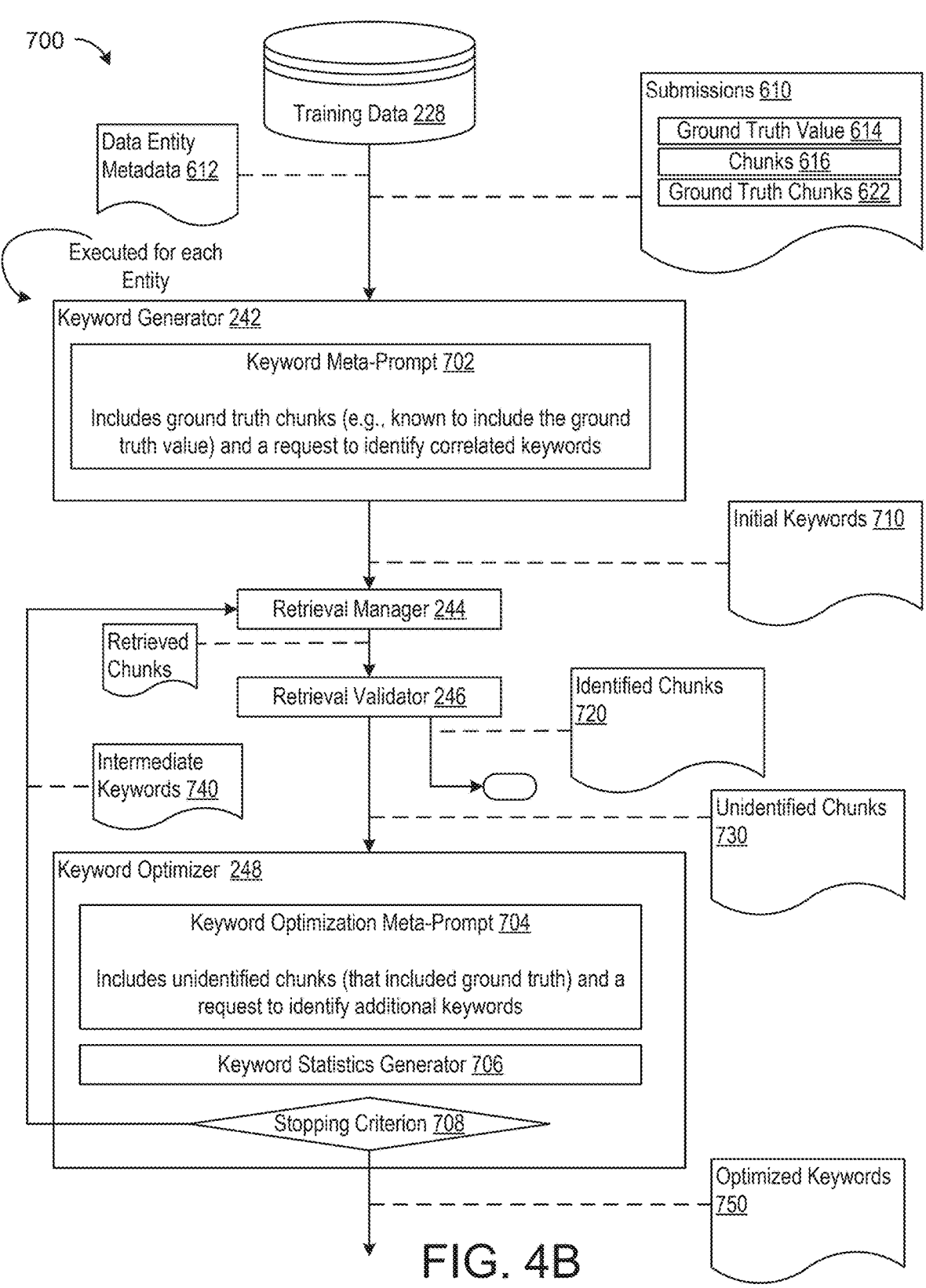
FIG. 4B is a data flow diagram for generating keywords for retrieval augmented extraction, according to some embodiments.
Figure 4C:
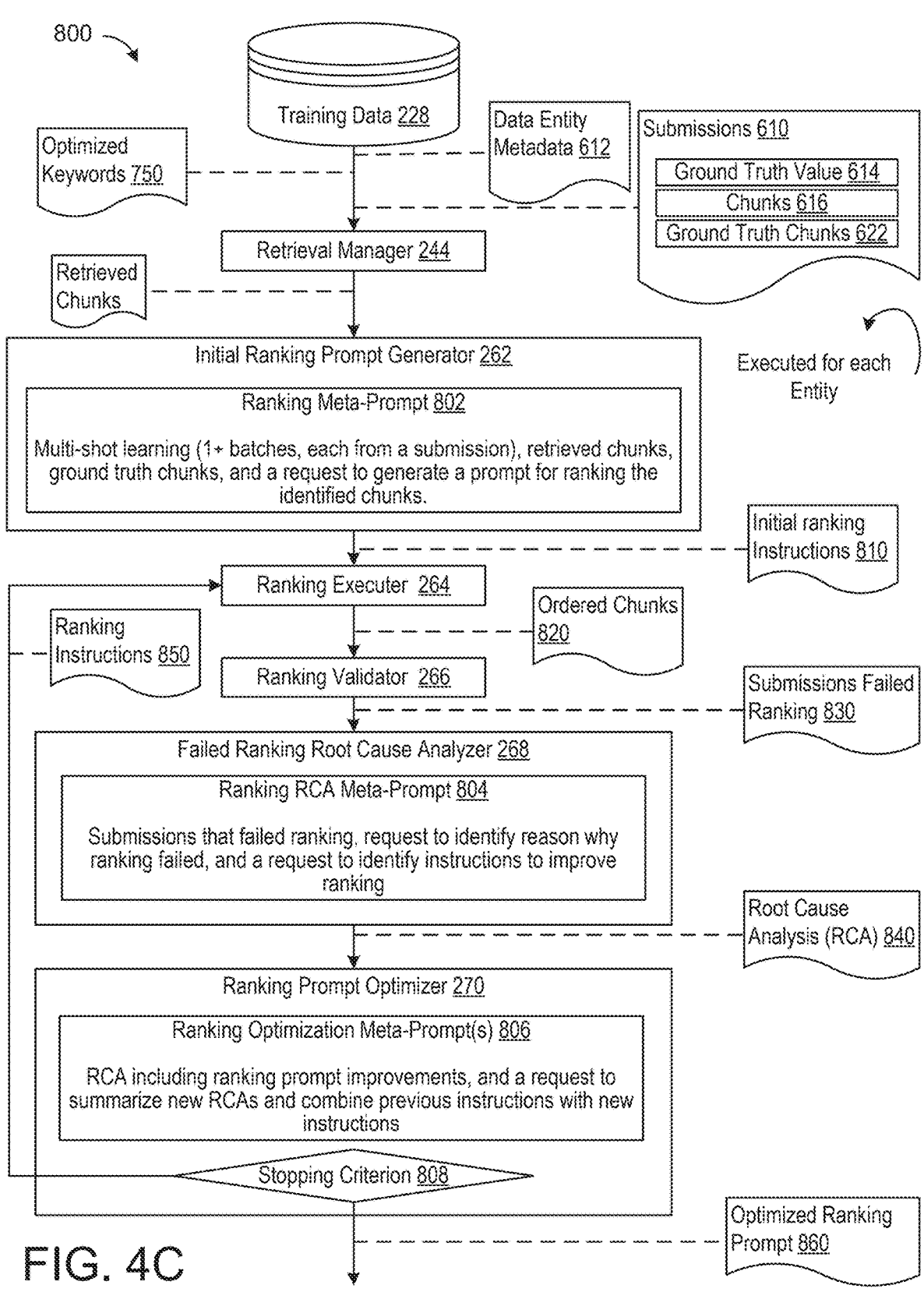
FIG. 4C is a data flow diagram for generating a ranking prompt to rank chunks retrieved by keywords, according to some embodiments.
Figure 4D:
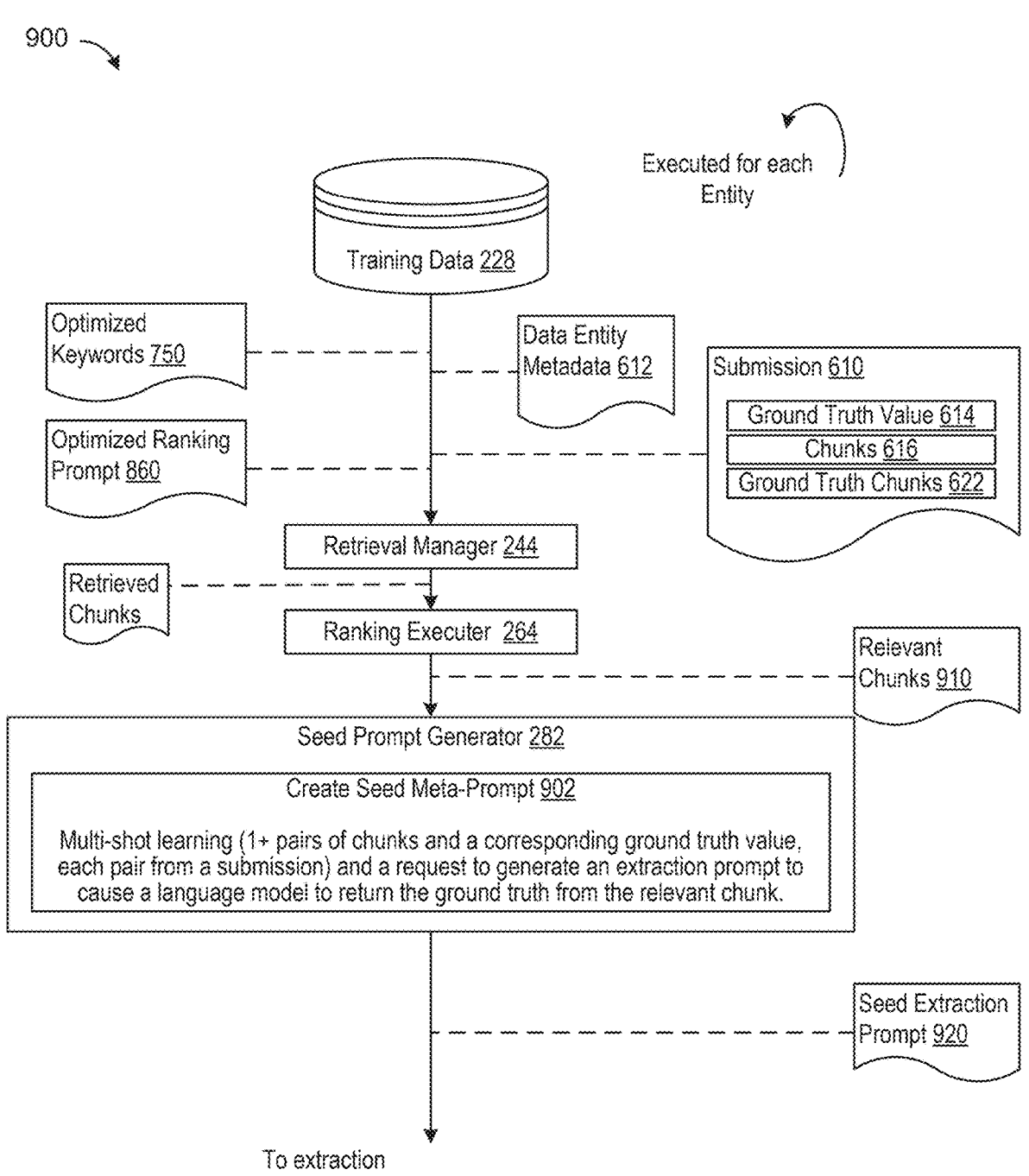
FIG. 4D is a data flow diagram for generating an initial extraction prompt for retrieval augmented extraction, according to some embodiments.
Figure 4E:
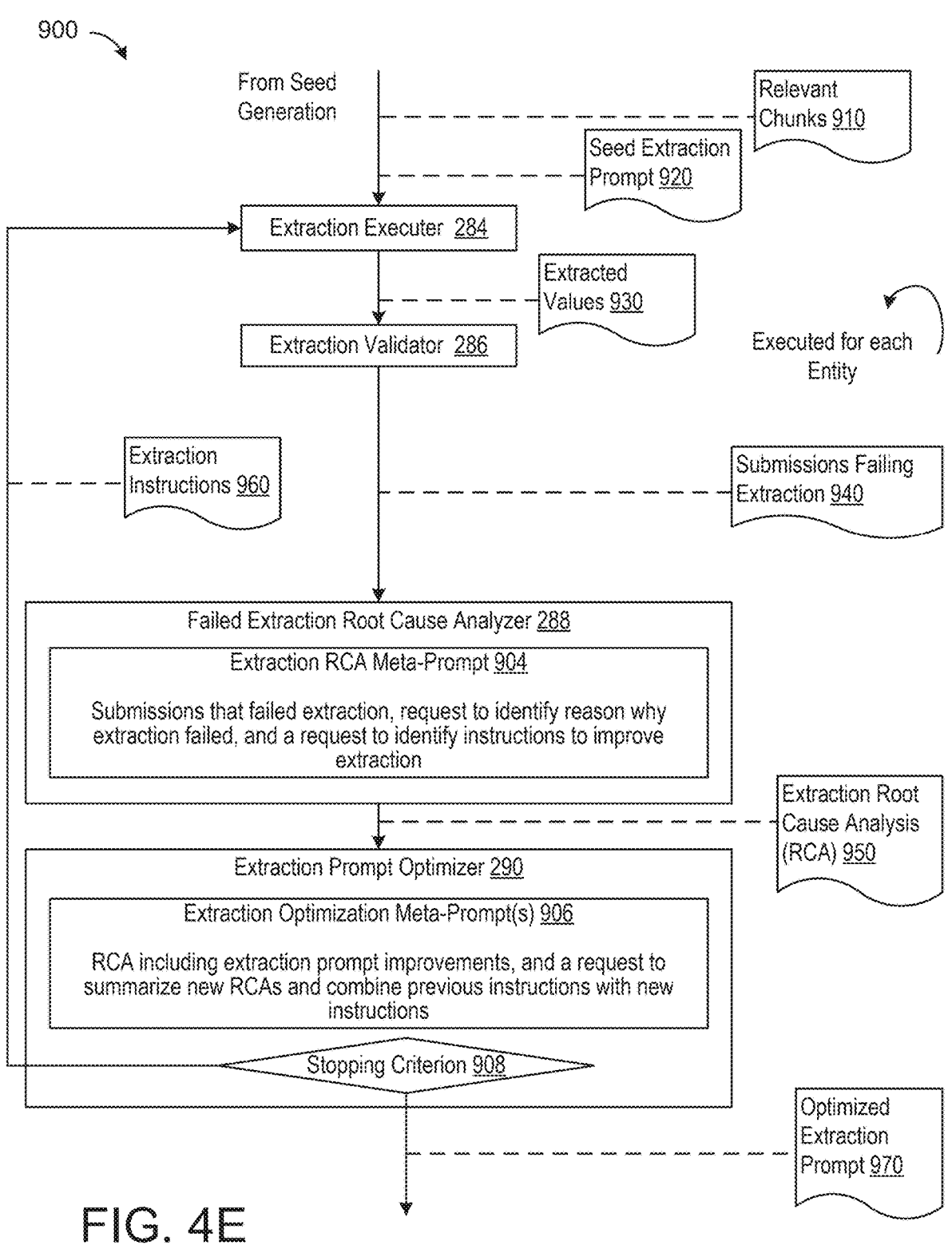
FIG. 4E is a data flow diagram for generating an extraction prompt for retrieval augmented extraction, according to some embodiments.

FIGS. 4A-E show data flow within the prompt generation system 200 according to some embodiments. For example, FIG. 4A illustrates a data flow for labeling chunks that include a ground truth value of a data entity as performed by the training data manager 220 according to some embodiments; FIG. 4B illustrates a data flow for generating keywords for content retrieval as performed by the keyword identifier 240 according to some embodiments; FIG. 4C illustrates a data flow for generating a ranking prompt to rank chunks of retrieved content as performed by the chunk ranker 260 according to some embodiments; FIGS. 4D and 4E illustrate a data flow for generating an extraction prompt to extract a value for the data entity from relevant chunks as performed by the prompt generator 280 according to some embodiments.

To facilitate understanding of FIGS. 4A-4E, and possible variations thereof, an exemplary embodiment of the data flow within the prompt generation system 200 is described. This embodiment is not intended to be limiting and no step or procedure is intended to be essential to the operation of the prompt generation system 200.

Referring to FIG. 4A, in the exemplary embodiment, training data 228 is used to generate an extractor, for example, an appropriate set of keywords to retrieve chunks likely to include a value for a data entity to be extracted; a ranking prompt executed by one or more language models (e.g., one or more LLMs 108 or one or more MMLMs 110) to determine, of the retrieved chunks, which are most likely to include the value for the data entity; and an extraction prompt executed by the one or more language models to extract a value for the data entity from the top-ranked chunks (e.g., chunks most likely to include the value). In the exemplary embodiment, training data includes a number of submissions of documents, each submission having at least one document including the ground truth value for the data entity that is to be extracted. The documents of a submission are broken into chunks (e.g., parts, portions, etc.) similar to how documents would be chunked for a new submission when extraction is to be performed by the data extraction manager system 114. In the exemplary embodiment, the data flows 600-900 are followed once for each data entity that is to be extracted. For example, by executing the instruction sets (e.g., components, circuits, etc.) of the prompt generation system 200 as shown in the data flows 600-900, keywords, a ranking prompt, and an extraction prompt are generated for a data entity.

The data flow 600 is used to determine which of the chunks include the ground truth value for a data entity (e.g., the data entity for which the keywords, ranking prompt, and extraction prompt are being generated) according to the exemplary embodiment. Data flow 600 can be used when the chunks were not previously labeled, for example, when the training data includes only the ground truth value for the data entity in each submission, but not the document, page number, or other location information that could be used to indicate a chunk as having the ground truth value when the chunks are generated from the documents. In the exemplary embodiment, metadata for the data entity 612 (e.g., name and description of the data entity), and the ground truth values 614 and chunks 616 for each submission 610 are provided to the chunk labeler 224. The chunk labeler 224 prompts the one or more language models with the ground truth value 614, the chunks 616, and a request for the language model to indicate (e.g., via true/false, yes/no output, etc.) whether a chunk includes the ground truth value 614. In the exemplary embodiment, the chunk labeler 224 prompts the one or more language models once for each submission using the associated ground truth value 614 and chunks 616 for that submission. For example, the chunk labeler 224 can generate the labeling meta-prompt 602 (e.g., from a template) and communicate the labeling meta-prompt 602 to the one or more language models. The chunk labeler 224 in turn receives a chunk listing 620 that indicates the one or more ground truth chunks 622 of each submission 610 that include the value for the data entity. Additionally, the labeling meta-prompt 602 can include a request for the one or more language models to provide an explanation as to how the ground truth value was found and how it adhered to business requirements.

A meta-prompt is a prompt for a language model that is used to instruct the language model to generate instructions for or otherwise change another prompt or extraction process. Meta-prompt is used to distinguish between (i) the prompts generated/used by the prompt generation system 200 to generate the keywords, the extraction prompt, and the ranking prompt and (ii) the output prompts (e.g., the extraction prompt and the ranking prompt). For example, a meta-prompt can be used to refer to a prompt that generates keywords for retrieval, generates instructions for ranking retrieved chunks, and/or generates instructions for an extraction prompt.

Referring to FIG. 4B, in the exemplary embodiment, the data flow 700 is used to generate keywords that satisfy a coverage criterion (e.g., such that the keywords retrieve the ground truth chunks 622 in a threshold fraction of submissions such as 98% of submissions or 100% of submissions). In the exemplary embodiment, the keyword generator 242 prompts the one or more language models using the keyword meta-prompt 702 to identify an initial set of keywords 710. The keyword meta-prompt 702 includes the ground truth chunks 622 (e.g., from multiple submissions 610 selected at random or all of the submissions 610 in the training data 228) and a request to identify keywords correlated to the metadata of the data entity 612 that appear in the ground truth chunks 622. The keyword meta-prompt 702 is generated, for example, by filling in a template prompt with the metadata of the data entity 612 and the ground truth chunks 622. The keyword meta-prompt 702 can then be communicated to the one or more language models. The request of the prompt thereby causes the one or more language models to return the initial set of keywords 710.

In the exemplary embodiment, the initial set of keywords 710 is used by the retrieval manager 244 to retrieve chunks from each of the submissions 610. The retrieved chunks can be provided to the retrieval validator 246 where the ground truth chunks 622 are thereby divided into identified chunks 720 and unidentified chunks 730. The identified chunks 720 being those chunks of the ground truth chunks 622 that were also retrieved using the initial set of keywords 710 by the retrieval manager 244 and the unidentified chunks 730 being those chunks of the ground truth chunks 622 that were not retrieved using the initial set of keywords 710.

In the exemplary embodiment, the unidentified chunks 730 are used to further refine the initial set of keywords 710. The unidentified chunks 730 are provided to the keyword optimizer 248 and used to identify additional keywords to increase the coverage (e.g., increase the fraction of ground truth chunks 622 retrieved by the retrieval manager 244). The keyword optimizer 248 prompts the one or more language models with a keyword optimization meta-prompt 704 that includes the unidentified chunks 730, the initial set of keywords 710, and a request to identify additional keywords correlated to the value of the data entity in the unidentified chunks 730. The initial set of keywords 710 is combined with the additional keywords received from the one or more language models to form intermediate keywords 740.

The keyword optimizer 248 is also configured to generate the coverage ratio and evaluate a stopping criterion 708 to determine whether additional keywords should be generated. In the exemplary embodiment, the stopping criterion is satisfied if the coverage (e.g., the fraction of ground truth chunks 622 retrieved by the retrieval manager 244 using the current set of keywords) exceeds a threshold coverage (e.g., 98%, 100%, etc.) or an keyword iteration limit is reached (e.g., the process of executing the retrieval manager 244 with current keywords, the unidentified chunks 730 are determined by the retrieval validator 246, the keyword optimization meta-prompt 704 is executed a maximum number of times)

In the exemplary embodiment, the intermediate keywords 740 are provided to the retrieval manager 244 where retrieval is performed with the new set of keywords (e.g., the intermediate keywords 740). The retrieved chunks are validated and divided into updated versions of the identified chunks 720 and the unidentified chunks 730. Coverage is calculated, and the steps of prompting the one or more language models to generate additional keywords for the unidentified chunks 730 with the keyword optimization meta-prompt 704 are continued until the stopping criterion 708 is satisfied. In the exemplary embodiment, the data flow 700 ends when the stopping criterion 708 is satisfied resulting in outputting the current keywords as the optimized keywords 750.

After each new set of keywords is generated (e.g., by augmenting the current keywords with additional keywords) a different set of submissions (and their respective ground truth value 614 and chunks 616) can be provided to the retrieval manager 244 and used to validate the keyword coverage. Providing partial sets of the submissions is advantageous where the number of submissions is high and processing all the submissions at once would be impractical. For example, the one or more language models may not be capable of excepting all the submissions.

Referring to FIG. 4C the data flow 800 is shown to generate a ranking prompt that when executed by a language model will cause the language model to rank chunks retrieved via keywords according to the likelihood that they are a ground truth chunk 622 according to the exemplary embodiment. The optimized keywords 750 are used by the retrieval manager 244 to generate retrieved chunks for each of the submissions 610 in the training data 228. The initial ranking prompt generator 262 uses a predefined set of initial ranking instructions. For example, the initial ranking instructions 810 are generated from a template including instructions to order the retrieved chunks according to a likelihood that a chunk includes the corresponding ground truth value 614 for that submission 610 and that is filled in with the metadata for the data entity 612. Alternatively, as described below, the initial ranking prompt generator 262 can generate a ranking meta-prompt 802 using a one-shot or multi-shot approach to cause the one or more language models to generate the initial ranking instructions 810.

Although the data flow 800 is shown to operate on retrieved chunks for a submission, for example, those chunks identified by the optimized keywords 750 using the retrieval manager 244, alternatively, any batch (e.g., set, grouping, etc.) of chunks from a submission can be used. However, in the exemplary embodiment, each batch of chunks should include at least one chunk having the ground truth value. In addition, if the retrieved chunks from the retrieval manager 244 are used, they can be validated to ensure that a ground truth chunks 622 is retrieved for each batch. By using all chunks or validating that a ground truth chunks 622 is included in each batch, the data flow 800 can reduce propagation of errors caused by the selected keywords into the determination and optimization of the ranking prompt.

In the exemplary embodiment, the initial ranking instructions 810 are used by the ranking executor 264 to order the retrieved chunks from each of the submissions 610. The ordered chunks 820 can be provided to the ranking validator 266. The ranking validator 266 determines whether a ground truth chunk 622 for the submission satisfies an order criterion. In the exemplary embodiment, the order criterion is satisfied if the ground truth chunk 622 is ranked within the top N chunks (e.g., top 3 chunks, top 5 chunks, etc.) most likely to include the ground truth chunk as identified by the ranking executor 264. The submissions 610 are thereby divided into submissions that failed ranking 830 and submissions that passed ranking. The submission passing ranking being those submissions for which the ground truth chunks 622 satisfies the order criterion and the submissions that failed ranking 830 being those submissions for which the ground truth chunk 622 did not satisfy the order criterion.

In the exemplary embodiment, the submissions that failed ranking 830 are used to further refine the initial ranking instructions 810. Each of the submissions that failed ranking 830 is provided to the failed ranking root cause analyzer 268 and used in a ranking root cause analysis meta-prompt 804. The failed ranking root cause analyzer 268 generates the ranking root cause analysis meta-prompt 804 from a template that is filled in with the retrieved chunks, the current ranking instructions, a request to identify one or more reasons the ranking failed (e.g., why the ground truth chunks 622 were not ranked higher), and a request to identify additional instructions to improve ranking for the submission. In response to the ranking root cause analysis meta-prompt 804, the one or more language models return a root cause analysis 840 including suggested improvements (e.g., additions) to the instructions. The root cause analysis 840 for each of the submissions that failed ranking 830 is saved and provided to the ranking prompt optimizer 270.

In the exemplary embodiment, the ranking prompt optimizer 270 prompts the one or more language models with a ranking optimization meta-prompt 806. The ranking optimization meta-prompt 806 includes a request to summarize the root cause analyzes 840 from each of the submissions that failed ranking 830 and the additional instructions to improve the ranking for that submission. The ranking optimization meta-prompt 806 also includes a request to combine the summarized instructions with the previously used ranking instructions. By requesting the language model to summarize the summarize the root cause analyzes 840 from each of the submissions that failed ranking 830 and the additional instructions, the language model identifies similar root causes and associated instructions that occur frequently in the submissions that failed ranking 830 (e.g., by clustering semantic meaning of the root cause analysis and instructions).

In the exemplary embodiment, the ranking prompt optimizer 270 generates a number of ranking optimization meta-prompt 806. The ranking optimization meta-prompt 806 provides a request that walks the language model though a step-by-step process (e.g., a chain-of-thoughts) that results in integrating the additional instructions for ranking with the ones that were used by the ranking executor 264. The ranking optimization meta-prompt 806 includes a request to group the submissions that failed ranking 830 according to the root cause. For example, the language model may group root causes that have similar semantic meaning into one or more clusters (e.g., groups). The clusters are ranked according to the number (e.g., quantity) of the submissions that failed ranking 830 included in the cluster and the language model can summarize the instructions using language that encompasses the additional instructions for each of the submission that failed ranking 830 in the cluster. The ranking optimization meta-prompt 806 can include a request to integrate summarized instructions from a number of clusters, for example, having a threshold number of submissions that failed ranking 830 or the N clusters with the highest population of submissions that failed ranking 830. Advantageously, summarizing the instructions causes the language model to make incremental changes to the instructions similar to how an optimization algorithm or network training algorithm makes incremental changes to parameters at each iteration of the algorithm.

The ranking prompt optimizer 270 is also configured to evaluate a stopping criterion 808 to determine whether additional iterations should be performed to further improve the ranking prompt. In the exemplary embodiment, the stopping criterion 808 is satisfied if the fraction of submissions that satisfy the order criterion exceeds a ranking threshold (e.g., 90%, 100%, etc.) or an ranking iteration limit is reached (e.g., the process of executing the ranking executor 264 with current ranking instructions, determining submissions that failed ranking 830, and ranking optimization meta-prompt 806 is executed a maximum number of times)

In the exemplary embodiment, the current ranking instructions 850 are provided to the ranking executor 264 where ranking is performed with the ranking instructions that were recently updated by the ranking prompt optimizer 270. The rankings of the submissions are validated and divided into updated versions of submissions that failed ranking 830 and submissions that passed ranking. A ranking metric is calculated (e.g., the fraction of submissions that satisfy the order criterion) and compared to a ranking threshold. The steps of prompting the one or more language models to perform the root cause analysis with the ranking root cause analysis meta-prompt 804 and the aggregation of instructions with the ranking optimization meta-prompt 806 are continued until the stopping criterion 808 is satisfied. In the exemplary embodiment, the data flow 800 ends when the stopping criterion 808 is satisfied, resulting in the outputting of the current ranking instructions 850 in the optimized ranking prompt 860.

After each new set of instructions is generated (e.g., by augmenting current ranking instructions 850 with the additional instructions in the ranking optimization meta-prompt 806) a different set of submissions (and their respective ground truth value 614 and retrieved chunks) can be provided (e.g., at random) to the ranking executor 264 and used to determine a fraction of submissions that satisfy the order criterion. Providing partial sets of the submissions is advantageous where the number of submissions is high and processing all the submissions at once would be impractical. For example, the one or more language models may not be capable of excepting all the submissions.

Referring to FIG. 4D, in the exemplary embodiment, the data flow 900 is used to generate an extraction prompt that when executed by a language model will cause the language model to extract the ground truth value from a number of relevant chunks (e.g., chunks that are ranked within the top N chunks most likely to include the value for the data entity). In the exemplary embodiment, the optimized keywords 750 are used by the retrieval manager 244 to generate retrieved chunks for each of the submissions 610 in the training data 228 and the optimized ranking prompt 860 is used by the ranking executor 264 to generate the relevant chunks 910. The seed prompt generator 282 generates a create seed meta-prompt 902 in a one-shot, or multi-shot learning configuration. The create seed meta-prompt 902 includes one or more pairs of a ground truth chunk 622 and a corresponding ground truth value 614 and a request to generate instructions that can be used by the one or more language models to extract the ground truth value 614 from the ground truth chunks 622 in the same pair. As used with relation to the create seed meta-prompt 902, the one-shot or multi-shot learning configuration of the meta-prompt refers to the number of example pairs of a ground truth value 614 and a ground truth chunk 622 having the ground truth value 614. The instructions received from the one or more language models in response are included in the seed extraction prompt 920.

Although the data flow 900 is shown to operate on retrieved chunks for a submission, for example, those chunks identified by the optimized keywords 750 using the retrieval manager 244 and the relevant chunks 910 determined by the ranking executor 264, alternatively, any batch (e.g., set, grouping, etc.) of chunks from a submission can be used. However, in the exemplary embodiment, each batch of chunks should include at least one chunk having the ground truth value. In addition, if the retrieved chunks from the retrieval manager 244 are used, they can be validated to ensure that a ground truth chunks 622 is retrieved for each batch. By using all chunks or validating that a ground truth chunks 622 is included in each batch, the data flow 800 can reduce propagation of errors caused by the selected keywords and the ranking prompt into the determination and optimization of the extraction prompt. In addition, modularity of the data flow 700 for generating keywords, the data flow 800 for generating a ranking prompt, and the data flow 900 for generating the extraction prompt is thereby provided. For example, the data flow 900 may be used to generate any extraction prompt even if the keywords have not been optimized or a ranking prompt has not been optimized or is not used. For example, all chunks may be provided for the extraction prompt for a submission in scenarios where the submissions are small and/or the context window of the one or more language models can accurately process all chunks for extraction of a value for the data entity.

The data flow 900 continues in FIG. 4E. In the exemplary embodiment, the initial extraction prompt 920 is used by the extraction executor 284 to extract values for the data entity from the relevant chunks 910. The extracted value for each of the submissions 610 are combined to form the extracted values 930. The extracted values 930 are provided to the extraction validator 286 with the corresponding ground truth value 614 for the submission for comparison. The extraction validator 286 compares each of the extracted values 930 with the corresponding ground truth value 614 to determine whether extraction was successful for the submission 610. The submissions 610 are thereby divided into submissions that failed extraction 940 and submissions that passed extraction. The submission passing ranking being those submissions for which the extracted value for the submission matches the corresponding ground truth value 614 and the submissions that failed extraction 940 being those submissions for which the extracted value for the submission does not match the corresponding ground truth value 614.

In the exemplary embodiment, the submissions that failed extraction 940 are used to further refine the extraction prompt by generating additional extraction instructions that can be added to the extraction instructions of the initial extraction prompt 920. Each of the submissions failing extraction 940 is provided to the failed extraction root cause analyzer 288 and used in an extraction root cause analysis prompt 904. The failed extraction root cause analyzer 288 generates the extraction root cause analysis prompt 904 from a template that is filled in with the relevant chunks, the current extraction instructions, a request to identify one or more reasons the extraction failed (e.g., why the correct value was not extracted from the chunks), and a request to identify additional instructions to improve extraction for each of the submissions failing extraction 940. In response to the extraction root cause analysis prompt 904, the one or more language models return an extraction root cause analysis 950 including suggested improvements to the extraction instructions. The root cause analysis 950 including the suggested instruction improvements for each of the submissions that failed extraction 940 is saved and provided to the extraction prompt optimizer 290.

In the exemplary embodiment, the extraction prompt optimizer 290 prompts the one or more language models with an extraction optimization meta-prompt 906. The extraction optimization meta-prompt 906 includes a request to summarize the extraction root cause analyzes 950 from each of the submissions that failed extraction 940 and the additional instructions to improve the extraction for that submission. The extraction optimization meta-prompt 906 also includes a request to combine the summarized instructions with the previously used extraction instructions. By requesting the language model to summarize the extraction root cause analyzes 950 and the additional instructions from each of the submissions that failed extraction 940, the language model identifies similar root causes and associated instructions that occur frequently in the submissions that failed extraction 940 (e.g., by clustering semantic meaning of the root cause analysis and instructions).

In the exemplary embodiment, the extraction prompt optimizer 290 generates a number of extraction optimization meta-prompts 906. The extraction optimization meta-prompts 906 provides a request that walks the language model though a step-by-step process (e.g., a chain-of-thoughts) that results in integrating the additional instructions for extraction with the ones that were used by the extraction executor 284. extraction optimization meta-prompts 906 includes a request to group the submissions that failed extraction 940 according to the root cause. For example, the language model may group root causes that have similar semantic meaning into one or more clusters (e.g., groups). The clusters are ranked according to the number (e.g., quantity) of the submissions that failed extraction 940 included in the cluster and the language model can summarize the instructions using language that encompasses the additional instructions for each of the submission that failed extraction 940 in the cluster. The extraction optimization meta-prompt 906 can include a request to integrate summarized instructions from a number of clusters, for example, having a threshold number of submissions that extraction 940 or the N clusters with the highest population of submissions that extraction 940. Advantageously, summarizing the instructions causes the language model to make incremental changes to the instructions similar to how an optimization algorithm or network training algorithm makes incremental changes to parameters at each iteration of the algorithm.

The extraction prompt optimizer 290 is also configured to evaluate a stopping criterion 908 to additional iterations should be performed to further improve the extraction prompt. In the exemplary embodiment, the stopping criterion 908 is satisfied if the fraction of submissions that for which the ground truth value was accurately extracted exceeds an accuracy threshold (e.g., 90%, 100%, etc.) or an extraction iteration limit is reached (e.g., the process of executing the extraction executor 284 with current extraction instructions, determining submissions that failed extraction 940, and extraction optimization meta-prompt 906 is executed a maximum number of times)

In the exemplary embodiment, the current extraction instructions 960 are provided to the extraction executor 284 where extraction is performed with the extraction instructions that were recently updated by the extraction prompt optimizer 290. The values are reextracted using a prompt including the current extraction instructions 960, are validated, and divided into updated versions of submissions that failed extraction 940 and submissions that passed extraction. An accuracy metric is calculated (e.g., the fraction of submissions that passed extraction) and compared to an accuracy threshold. The steps of prompting the one or more language models to perform the root cause analysis with the extraction root cause analysis meta-prompt 904 and the aggregation of instructions with the extraction optimization meta-prompt 906 are continued until the stopping criterion 908 is satisfied (e.g., the accuracy metric exceeding the accuracy threshold, a maximum number of iterations, etc.). In the exemplary embodiment, the data flow 900 ends when the stopping criterion 908 is satisfied resulting in outputting the most recently updated extraction instructions within the optimized extraction prompt 970.

After each new set of instructions is generated (e.g., by augmenting current extraction instructions 960 with the additional instructions in the extraction optimization meta-prompt 906) a different set of submissions (and their respective ground truth value 614 and retrieved chunks) can be provided (e.g., at random) to the extraction executor 284 and used to determine the accuracy. Providing partial sets of the submissions is advantageous where the number of submissions is high and processing all the submissions at once would be impractical. For example, the one or more language models may not be capable of excepting all the submissions.

Referring again to FIGS. 4A-E and the data flows 600-900 additional features are described for the components of the prompt generation system 200. These features may be used in addition to or as alternatives to those described as used in the exemplary embodiment. It should be understood that any feature may be substituted and some features may be repeated below for clarity.

With reference to FIG. 4A, data flow 600 for labeling chunks that include a ground truth value for a data entity is shown according to some embodiments. In some embodiments, data flow 600 includes utilizing a meta-prompt to instruct the one or more LLMs 108 to identify a passage (e.g., a chunk) of text that includes the ground truth entity value according to some embodiments. The data flow 600 may be performed by the training data manager 220, for example, using the chunk labeler 224. As shown, the data flow 600 may be performed for each chunk and for each data entity of a submission type (e.g., type of business, type of customer, grouping of data entity extraction types, etc.). For example, the chunk labeler 224 may be executed N times for an entity (where N is the number of chunks). The N executions may then be repeated for each of the data entities for which the chunks are to be labeled.

Each submission 610 may represent a group of chunks that may be generated from content submitted with the submission 610 of the submission type. The submission 610 may include metadata for the data entity 612 that are to be extracted for the submission 610, corresponding ground truth values 614 for the one or more data entities, and the chunks 616. In some embodiments, the data flow 600 includes providing a chunk of the chunks 616, metadata for the data entity 612 (e.g., the name and/or description of the data entity), and the corresponding ground truth value 614 for the data entity to the chunk labeler 224. The chunk labeler 224 may generate a labeling meta-prompt 602 that includes a request for the one or more LLMs 108 to determine whether the chunk (e.g., or its identifier) that included the corresponding ground truth value 614 for the data entity. In some embodiments, all chunks are provided to the chunk labeler 224 with the data entity and the corresponding ground truth value 614 and the labeling meta-prompt 602 may include a request that the one or more LLMs 108 identify all chunks that include the ground truth value. For example, all chunks may be provided if the context window of the one or more LLMs 108 supports such a prompt. In some embodiments, the data flow 600 also includes requesting the one or more LLMs 108 to provide an explanation as to how it found the value and adhered to any constraints from the constraint manager 216, for example, to ensure that the constraint manager 216 is followed.

In some embodiments, the labeling meta-prompt 602 may be a series of multiple prompts (e.g., a chain-of-thoughts prompt, etc.). In some embodiments, the labeling meta-prompt 602 may be designed to operate on one chunk or document at a time. For example, the labeling meta-prompt 602 may request the one or more LLMs 108 to return a binary true/false response indicating whether a particular chunk includes the ground truth value (and adheres to the constraints). The response from the one or more LLMs 108 to the labeling meta-prompt 602 and the output (e.g., result, etc.) of the data flow 600 includes a chunk listing 620 indicating which chunks include the corresponding ground truth values 614 of each of the one or more data entities 612. The chunk listing 620 can be used to provide the ground truth chunks 622 having the data entity in subsequent extractor generation operations (e.g., functions, etc.).

With reference to FIG. 4B, data flow 700 for generating keywords for retrieval of chunks related to data entity is shown according to some embodiments. In some embodiments, the data flow 700 includes generating two prompts to be executed by the language models (e.g., the one or more LLMs 108). For example, the data flow 700 may include generating a prompt to cause a language model to generate an initial set of keywords to retrieve chunks that may include the ground truth value of a particular data entity. The keywords may be refined, for example, by a second prompt and/or based on statistics indicating the ability of the keywords or any subset thereof to retrieve relevant chunks for data extraction. The data flow 700 may be performed by the keyword identifier 240.

The data flow 700 is split between a first iteration and subsequent iterations. In the first iteration, a set of submissions (e.g., batches) having the ground truth value 614 for the data entity for which the keywords are to be generated is selected (e.g., randomly, etc.). One or more ground truth chunks 622 (e.g., chunks known to include the ground truth value for the data entity) are retrieved from the training data 228 and provided to the keyword generator 242. The keyword generator 242 may generate a keyword meta-prompt 702 to cause the one or more LLMs 108 to generate an initial set of keywords 710 for chunk retrieval associated with the data entity 612. For example, the keyword meta-prompt 702 may be generated to include the entity name, the entity description (e.g., the metadata of the data entity 612) and/or business rules along with a request to identify keywords in the passages that most relate to the entity, relate to the entity description, and conform to the business requirements. The one or more LLMs 108 may return the initial set of keywords 710. Subsequent iterations of the data flow 700 can use a current set of keywords and the keyword generator 242 and/or the keyword meta-prompt 702 may not be executed.

After the one or more keywords are received from the LLM in response to the keyword meta-prompt 702, chunks may be retrieved using the one or more keywords. To determine certain statistics (e.g., properties, performance metrics) for the keywords, all chunks (e.g., chunks 616) may be provided to the retrieval manager 244 with the initial set of keywords 710. The retrieval manager 244 may perform chunk retrieval using the keywords. For example, the retrieval manager 244 may use the keyword search algorithm (e.g., function, etc.) used by the data extraction manager system 114 during retrieval augmented extraction or may request the data extraction manager system 114 to perform the extraction. The retrieval manager 244 may indicate the chunks that were identified by keywords and provide a listing of the identified chunks to the retrieval validator 246. The retrieval validator 246 may split (e.g., divide) the ground truth chunks 622 into a first group that was retrieved using the keywords (e.g., the identified chunks 720) and a second group that was not retrieved using the keywords (e.g., the unidentified chunks 730). The unidentified chunks 730 may be provided to the keyword optimizer 248 to improve the set of keywords, thereby improving the retrieval accuracy.

The keyword optimizer 248 may generate a keyword optimization meta-prompt 704 that includes the unidentified chunks 730 and a request to generate additional keywords associated with the ground truth values in the unidentified chunks 730. The initial keyword list may also be provided in the keyword optimization meta-prompt 704 with a request that the one or more LLMs 108 generate alternative keywords (e.g., additional keywords that were not part of the initial set of keywords 710). In some embodiments, the keyword optimization meta-prompt 704 includes a request to review the initial keyword list, the chunks not identified, and design instructions to optimize the list (e.g., keywords to add and/or remove from the set). The one or more LLMs 108 may either apply the instructions to the keywords or provide the instructions to the prompt generation system 200 for example, to be applied by the keyword optimizer 248.

In some embodiments, the keyword optimizer 248 may also generate statistics and/or metrics for the keywords as part of the data flow 700. Statistics may be used by the keyword optimizer 248 to determine keywords that can be removed from the set of keywords. The coverage and/or effectiveness ratio as described previously may be generated for a keyword or set thereof. For example, the coverage ratio and effectiveness ratio may be calculated as:

$$coverage = \frac{quantity\ of\ ground\ truth\ chunks\ identified}{quantity\ of\ ground\ truth\ chunks}$$

$$effectiveness\ ratio = \frac{quantity\ of\ chunks\ identified}{quantity\ of\ ground\ truth\ chunks\ identified}$$

The statistics and/or metrics may be used to further optimize and/or prune the keywords. In some embodiments, the statistics and/or metrics are provided to the one or more LLMs 108 (e.g., with a description of the statistic or metric)

so that the one or more LLMs 108 can use the statistics and/or metrics when generating the instructions to optimize the keywords.

The coverage and effectiveness ratio may be calculated for each word/phrase individually. For example, the retrieval function may be executed using an individual keyword. The coverage ratio for a keyword may be calculated as the count of chunks retrieved using the individual keyword that have the data entity (e.g., are part of the ground truth chunks 622) divided by the total number of batches or quantity of the ground truth chunks 622 (e.g., if the batch includes multiple chunks having the data entity). The keyword effectiveness may be calculated as the count of chunks retrieved using the individual keyword divided by the count of chunks retrieved using the individual keyword that have the data entity (e.g., are part of the ground truth chunks 622). The keywords may be ranked based on a weighted sum of their coverage and effectiveness ratio. In some embodiments, the highest-ranking keywords are selected until the coverage of the set of keywords already selected reaches a threshold value (e.g., 99%, 100%, etc.). In some embodiments, after a number of keywords (e.g., a group of keywords) have been selected the coverage is calculated based on the chunks that were not covered by the currently selected group of keywords. In some embodiments, the coverage and effectiveness ratio are calculated for a number of sets of keywords and an optimization procedure is performed to find a set that maximizes coverage (e.g., meets a threshold coverage level) and minimizes the keyword effectiveness. For example, an exhaustive search procedure and/or a greedy search procedure may be performed.

The keyword optimizer 248 may evaluate stopping criterion 708, to determine whether to perform another iteration of retrieval and keyword optimization. If the stopping criterion is met, the current set of keywords is output as the optimized keywords 750. If the stopping criterion is not met, the current set of keywords may be considered intermediate keywords 740 and fed back to the retrieval manager 244 to begin another iteration. In some embodiments, the stopping criterion 708 includes thresholds for both the coverage and the effectiveness. In some embodiments, the stopping criterion 708 includes thresholds based on the change in effectiveness ratio and/or coverage. In some embodiments, the stopping criterion includes determining whether the keywords change in subsequent iterations. In some embodiments, the stopping criterion includes determining whether a threshold number of iterations have already been performed (e.g., repeated executions of the retrieval manager 244, retrieval validator 246, and the keyword optimization meta-prompt 704). The stopping criterion 708 may include multiple of the above-mentioned criteria (e.g., combined with 'AND' and/or 'OR' operators).

On subsequent iterations, a set of keywords already exists, and data flow may return to the retrieval manager 244 (e.g., skipping the keyword generator 242). In some embodiments, the subsequent iterations of the data flow 700 include consideration of only the chunks that failed to be retrieved in the previous operation. Alternatively, all chunks or a set of randomly selected chunks may be considered during each of the iterations of the data flow 700.

With reference to FIG. 4C, data flow 800 for generating ranking prompts is shown according to some embodiments. The data flow 800 may be performed within the chunk ranker 260, for example, to generate one or more prompts that can be used by the prompt generation system 200 to sort chunks retrieved by the keyword search according to those most likely to include the ground truth value for a data entity.

The input to the data flow 800 includes a set of batches for a data entity (e.g., including chunks 616 and the ground truth chunks 622) and the optimized keywords 750 for the data entity. The chunks 616 may be provided to the retrieval manager 244 with the optimized keywords 750 in order to determine the chunks that would be retrieved and provided to a language model with the ranking prompt (e.g., the identified chunks 720). After determining the chunks that would be retrieved, an initial (e.g., seed) ranking prompt may generated. For example, the initial ranking prompt may be generated by the initial ranking prompt generator 262 as described herein. The identified chunks 720 are provided to the initial ranking prompt generator 262. In some embodiments, the initial ranking prompt is generated from a template. For example, initial ranking instructions 810 may be generated by filling in the description for a prompt of the form "Rank the chunks in descending order starting with the chunk most likely to include [data entity description]."

In some embodiments, the initial ranking instructions 810 are generated using a ranking meta-prompt 802. The ranking meta-prompt 802 may be executed by a language model in order to generate the initial ranking instructions 810 and may be a single-shot or multi-shot learning prompt. The ranking meta-prompt 802 may include ranking information for one or more batches. For example, the ranking meta-prompt 802 may include ranking information such as the identified chunks 720, ground truth chunks 622, and a request to generate instructions (e.g., a prompt) for instructing a language model on how to rank the identified chunks 720 (e.g., based on their probability, likelihood, etc. of having the ground truth value for the data entity of the batch).

The initial ranking instructions 810 may be provided to the ranking executor 264, where the ranking prompt is executed for each batch. For example, the initial ranking instructions 810 are provided to the one or more LLMs 108 with the identified chunks 720 for the batch and the one or more LLMs 108 may respond with ordered chunks 820 (e.g., ordered according to the initial ranking instructions 810). The ordered chunks 820 for each batch may be provided to the ranking validator 266 to determine whether the batch satisfies a successful ordering criterion. The ranking of the chunks in each batch may be evaluated on a pass/fail basis. For example, if the chunk having the data entity satisfies an ordering criterion, the batch may be considered passing. The ordering criterion may be based on how high the chunk having the data entity was ranked. For example, if the chunk having the data entity is ranked in the top three, the top five, the top 5%, etc. the batch may be considered passing.

In some embodiments, batches that failed ranking 830 are provided to the failed ranking root cause analyzer 268. The data flow 800 may continue by generating the ranking root cause analysis meta-prompt 804 for the one or more LLMs 108. The ranking root cause analysis meta-prompt 804 may include a batch that failed processing (e.g., the chunks thereof) with a request to determine a root cause and generate a report for the ranking failure of the batch provided. In some embodiments, the ranking root cause analysis meta-prompt 804 also includes a request to determine instructions to improve the ranking prompt for the failed batch. The ranking root cause analysis meta-prompt 804 may be communicated to the one or more LLMs 108 for each of the batches that failed ranking, and the root cause analysis reports resulting therefrom may be stored (e.g., saved, collected, etc.).

In some embodiments, the ranking prompt optimizer 270 generates a request (e.g., a prompt) to summarize the stored root cause analysis reports and/or the instructions to improve the ranking prompt (e.g., that may be added to the ranking prompt) as part of the ranking optimization meta-prompts 806. Summarizing the stored root cause analysis may be similar to performing dimensionality reduction, advantageously reducing the amount of instructions (e.g., and therefore the total tokens processed) in the ranking prompt, while maintaining the majority of the instructive content for the language model. The root cause analysis 840, the improvement instructions, and the summaries thereof can be used to the ranking prompt optimizer 270 to update the ranking prompt.

To perform summarization, the ranking optimization meta-prompts 806 may include a request to group the root cause analysis reports and the instructions to improve the ranking prompt according to the root cause of the batch that failed ranking 830. For example, the root cause analyses 840 may be grouped according to the semantic meaning of the identified root cause. Alternatively, the ranking prompt optimizer 270 may group the root cause analyses 840 according to the semantic meaning without prompting a language model. For example, the ranking prompt optimizer 270 may use the text embedder 112 to generate text embeddings for each of root cause analyses 840 and use a clustering algorithm to determine the groups (e.g., clustered basted on a distance metric between embeddings such as the cosine distance). In some embodiments, specific reasons for failure may be enumerated and also used as a basis for clustering. For example, formatting errors, unit errors, etc. may be found prior to root cause analysis by the language model and used to form one or more clusters.

The ranking optimization meta-prompts 806 may include a request to summarize the root cause analysis reports and/or additional instructions within each cluster. The summaries of the additional instructions may be integrated with the initial or currently used ranking instructions. In some embodiments, the summaries of only a number of groups are requested and used (e.g., to prevent large changes in the ranking instructions during each iteration). For example, the summaries from the groups having the largest quantity of batches that failed ranking 830 (e.g., 3 or 5 most populous groups) and/or the summaries of the groups having at least N batches that failed ranking 830 (e.g., 2 or 3 batches) may be used.

The ranking prompt optimizer 270 uses the root cause analysis 840, the improvement instructions, and the summaries thereof as input to update the ranking prompt. For example, the ranking prompt optimizer 270 generates a ranking optimization meta-prompt 806 with the root cause analysis 840, the improvement instructions, and/or the summaries thereof and a request to combine the improvement instructions with the current ranking prompt instructions. The ranking prompt optimizer 270 may adjust the ranking prompt based on the summarized instructions. For example, the ranking prompt optimizer 270 may include language similar to a step-size or a learning rate in the ranking optimization meta-prompt 806 that causes the language model to make minor adjustments to the ranking prompt in response to the ranking optimization meta-prompt 806 and avoid large changes that could fail to converge. For example, the request to adjust the ranking optimization meta-prompt 806 may include language similar to "make a small adjustment to the ranking prompt to improve the root causes identified" or "refine the ranking prompt slightly to improve the root causes identified."

The data flow 800 may be repeated until a stopping criterion 808 is met. The ranking prompt optimizer 270 may evaluate stopping criterion 808 to determine whether to perform another iteration of ranking optimization. If the stopping criterion 808 is met, the current ranking instructions are output as the optimized ranking prompt 860. If the stopping criterion is not met, the current ranking instructions 850 may be fed back to the ranking executor 264 to begin another iteration. In some embodiments, the stopping criterion 808 includes a threshold for an accuracy score (e.g., the percent of batches passing the ranking validator 266). In some embodiments, the stopping criterion 808 includes thresholds for the change in the accuracy score. In some embodiments, evaluating the stopping criterion 808 includes determining whether the instructions are changed in subsequent iterations. In some embodiments, the stopping criterion includes determining whether a threshold number of iterations have already been performed (e.g., repeated executions of the ranking executor 264, the ranking validator 266, and the ranking optimization meta-prompt 806). The stopping criterion 808 may include multiple of the above-mentioned criteria (e.g., combined with 'AND' and/or 'OR' operators).

The data flow 800 may include subsequent iterations until the ranking prompt converges. Advantageously, by requesting a summary of the instructions and using the summary to adjust the ranking prompt, stability (e.g., convergence) may be added to the ranking prompt optimization process. The summary may cause the language model to focus the adjustment on the more relevant instructions and/or root causes. For example, in the summary generated by the failed ranking root cause analyzer 268 may provide the instructions corresponding to the most common reasons (e.g., root causes) of extraction failures.

With reference to FIGS. 4D and 4E, data flow 900 for generating extraction prompts is shown according to some embodiments. The data flow 900 may be executed within the prompt generator 280, for example, to generate one or more prompts that can be used by the prompt generation system 200 to extract information from one or more relevant chunks. The data flow 900 is similar to the data flow 800 in some embodiments, as data flows may use a form of instruction based memory for their respective prompt and may perform an optimization similar to gradient descent to improve the prompt.

The input to the data flow 900 includes a set of batches for a data entity (e.g., including chunks 616 and the ground truth chunks 622), the optimized keywords 750, and the optimized ranking prompt 860 for the data entity. The chunks 616 may be provided to the retrieval manager 244 with the optimized keywords 750 in order to determine the chunks that would be retrieved based on a keyword search. The chunks identified by the retrieval manager 244 may be provided to the ranking executor 264 with the ranking prompt to determine the relevant chunks 910 for each batch (e.g., representative) of the relevant chunks that would be generated for a new (e.g., not training) batch.

The data flow 900 may include providing the relevant chunks 910 to the seed prompt generator 282 to generate the initial (e.g., seed) extraction prompt. The initial extraction prompt may be generated from a template. For example, the initial extraction prompt 920 may be generated by filling in the description for a prompt of the form "determine the value for [data entity name]. For example, [data entity description]." In some embodiments, the initial extraction prompt 920 is generated using a create seed meta-prompt 902. The create seed meta-prompt 902 may be executed by a language model in order to generate the initial extraction prompt 920. In some embodiments, the create seed meta-prompt 902 is a single-shot or multi-shot learning prompt. For example, the create seed meta-prompt 902 may include the ground truth chunks 622 for a number of example batches, the corresponding ground truth values 614, (e.g., two examples, five examples, etc.), and a request to generate instructions (e.g., a prompt) for instructing a language model how to extract (e.g., identify, etc.) the ground truth value for the example batches.

After the initial extraction prompt 920 is generated, the additional functions of the data flow 900 may be performed for the set of all batches. The initial extraction prompt 920 may be provided with the relevant chunks 910 (e.g., retrieved according to the optimized keywords 750 and the optimized ranking prompt 860) to the extraction executor 284. For example, the extraction executor 284 may apply the initial extraction prompt 920 to the one or more LLMs 108 to obtain extracted values 930 corresponding to each batch. The extraction validator 286 validates the extracted values 930 according to the ground truth for each batch. Batches (e.g., submissions) that fail extraction 940 (e.g., a value other than the ground truth is extracted) are provided to the failed extraction root cause analyzer 288.

The data flow 900 may continue with the failed extraction root cause analyzer 288 where an extraction root cause analysis meta-prompt 904 is generated. The extraction root cause analysis meta-prompt 904 may include the batches (e.g., including the chunks thereof), a request to identify a reason why extraction failed (e.g., a root cause), and a request to generate instructions to improve extraction. The one or more LLMs 108 may respond to the extraction root cause analysis meta-prompt 904 with an extraction root cause analysis report 950 and/or improvement instructions. The root cause analysis reports 950 from multiple failed batches (e.g., each failed batch for the current iteration of the data flow 900), the additional instructions to improve extraction, and the summaries thereof may be used by the extraction prompt optimizer 290 to improve the extraction prompt.

To perform summarization, the extraction optimization meta-prompt 906 may include a request to group the root cause analysis reports and the instructions to improve the extraction prompt according to the root cause of the batch that failed extraction 940. For example, the root cause analyses 950 may be grouped according to the semantic meaning of the identified root cause. Alternatively, the extraction prompt optimizer 290 may group the root cause analyses 950 according to the semantic meaning without prompting a language model. For example, the extraction prompt optimizer 290 may use the text embedder 112 to generate text embeddings for each of root cause analyses 950 and use a clustering algorithm to determine the groups (e.g., clustered basted on a distance metric between embeddings such as the cosine distance). In some embodiments, specific reasons for failure may be enumerated and also used as a basis for clustering. For example, formatting errors, unit errors, etc. may be found prior to root cause analysis by the language model and used to form one or more clusters.

The extraction optimization meta-prompt 906 may include a request to summarize the root cause analysis reports and/or additional instructions to improve extraction within each cluster. The summaries of the additional instructions may be integrated with the initial or currently used extraction instructions. In some embodiments, the summaries of only a number of groups are requested and used (e.g., to prevent large changes in the extraction instructions during each iteration). For example, the summaries from the groups having the largest quantity of batches that failed extraction 940 (e.g., 3 or 5 most populous groups) and/or the summaries of the groups having at least N batches that failed extraction 940 (e.g., 2 or 3 batches) may be used.

The extraction prompt optimizer 290 uses the root cause analysis 950, the improvement instructions, and the summaries thereof as input to update the extraction prompt. For example, the extraction prompt optimizer 290 generates an extraction optimization meta-prompt 906 with the root cause analysis 950, the improvement instructions, and/or the summaries thereof and a request to combine the improvement instructions with the current extraction prompt instructions. The extraction prompt optimizer 290 may adjust the extraction prompt based on the summarized instructions. For example, the extraction prompt optimizer 290 may include language similar to a step-size or a learning rate in the extraction optimization meta-prompt 906 that causes the language model to make minor adjustments to the extraction prompt in response to the extraction optimization meta-prompt 906 and avoid large changes that could fail to converge. For example, the request to adjust the extraction optimization meta-prompt 906 may include language similar to "make a small adjustment to the extraction prompt to improve the root causes identified" or "refine the extraction prompt slightly to improve the root causes identified."

The data flow 900 may be repeated until a stopping criterion 908 is met. The extraction prompt optimizer 290 may evaluate stopping criterion 908 to determine whether to perform another iteration of extraction optimization. If the stopping criterion is met, the current extraction instructions are output as the optimized extraction prompt 970. If the stopping criterion is not met, the current extraction instructions 960 may be fed back to the extraction executor 284 to begin another iteration. In some embodiments, the stopping criterion 908 includes a threshold for an accuracy score (e.g., the percent of batches passing the extraction validator 286). In some embodiments, the stopping criterion 908 includes thresholds on the change in the accuracy score. In some embodiments, evaluating the stopping criterion 908 includes determining whether the extraction instructions are changed in subsequent iterations. In some embodiments, the stopping criterion includes determining whether a threshold number of iterations have already been performed (e.g., repeated executions of the extraction executor 284, the extraction validator 286, and the extraction optimization meta-prompt 906). The stopping criterion 908 may include multiple of the above-mentioned criteria (e.g., combined with 'AND' and/or 'OR' operators).

As illustrated by the data flow 800 and the data flow 900, the general flow of data and operations performed to generate a ranking prompt and an extraction prompt is similar. More specifically, the instructions of the prompt may share a type of text-based memory. The text-based memory stores the instructions for the prompts and allows the prompts to be improved using a method similar to gradient descent. The text-based memory may be used for any type of prompt.

To initiate the memory (e.g., the prompt) an initial prompt may be generated. The initial prompt can come from a variety of sources. For example, the initial prompt may be generated using single-shot or multi-shot learning examples within a prompt to a language model (e.g., as in the initial ranking prompt generator 262 and/or the seed prompt generator 282). Alternatively, the initial prompt may be hardcoded or generated using a template.

The initial prompt is executed across a batch of training data. Training data for which the prompt is successful may be set aside, whereas training data for which the prompt is not successful may be used to improve the prompt instructions. The definition of a successful prompt may depend on the purpose (e.g., task, etc.) of the prompt. Any appropriate evaluation method may be used. For example, in some embodiments, the failed ranking root cause analyzer 268 bases success on whether the chunk having the ground truth was in a top ranked chunk.

Training data for which the initial prompt failed may be used to generate additional instructions. For example, each training data sample for which the prompt failed may be provided with the initial prompt and a request to generate additional instructions for the prompt that would improve the performance of the prompt on the training data sample. In some embodiments, additional requests are made (e.g., asking for a root cause analysis report, etc.), for example, to provide a chain-of-thoughts type prompt and to provide the optimizer (e.g., the next step) additional context.

The additional instructions for each of the failed training data samples may be summarized to generate a single set of instructions for the current iteration. A language model may be used to combine the summarized instructions with the current extraction prompt (e.g., via an adjustment prompt). In some embodiments, the adjustment prompt requests a small adjustment or addition to the instructions. Summarizing the additional instructions and requesting a small adjustment or addition may act to stabilize the iterative process and lead to a convergence (e.g., similar to a step-size parameter in gradient descent). The extraction prompt that is updated based on the additional instructions may be applied to the batch of training data restarting the iterations.

The text-based memory may be used to update prompts based on user feedback. For example, each time a user indicates a prompt was incorrect (and provides a corrected result), a meta-prompt may be executed to generate additional (e.g., improved) instructions and/or a root cause analysis report. The feedback from the user may then be used to adjust the prompt (e.g., the ranking prompt and/or the extraction prompt). For example, the feedback may be used as additional failed batches in either the data flow 800 to adjust the ranking prompt and/or the data flow 900 to adjust the extraction prompt. In some embodiments, the feedback manager 226 is configured to determine whether to update the ranking prompt, the extraction prompt, or both.

Although using the text-based memory to adjust a prompt in response to feedback is described with respect to the ranking prompt and/or the extraction prompt, it is understood that a similar procedure may be used to adjust any prompt in general, for example, by determining that an action performed by a user indicates the prompt was not successful, collecting information related to the unsuccessful prompt, using a meta-prompt to request additional instructions that would enhance the prompt and render it successful in the scenario indicated as unsuccessful, and then combining the instructions with the original prompt.

With reference to FIG. 5, the text-based memory used to generate instructions within a prompt and processes for updating the memory performed within the prompt generation system 200 are shown according to some embodiments. The data flow diagram 1000 indicating memory usage in FIG. 5 is illustrative of the procedure during initial training (e.g., the data flow 800 by the ranking prompt optimizer 270 and/or the data flow 900 by the extraction prompt optimizer 290) and during prompt adaptation (e.g., updating, adjustments, etc.) in response to user feedback.

The top row of the data flow diagram 1000 may represent a current state of memory when the ranking prompt optimizer 270 and/or extraction prompt optimizer 290 is executed. For example, the memory may include a prior prompt 1010 (e.g., representing the prompt that was used prior to starting the prompt adjustment procedure and the prompt that caused the current failures that are to be processed), prior instructions 1008 (e.g., representing the stored summaries of instructions from previous adjustments), and the prior root cause analysis reports 1006.

The memory may have also stored (e.g., collected, saved, etc.) one or more current root cause analysis reports 1002 and one or more current improvement instructions 1004. The current root cause analysis reports 1002 and the current improvement instructions 1004 may have been collected during a training iteration of the data flow 800 and the data flow 900. Alternatively, the current root cause analysis reports 1002 and the current improvement instructions 1004 may have been collected over a period of time (e.g., a week, a month, etc.) after which the prompt (e.g., the optimized ranking prompt 860 and/or the optimized extraction prompt 970) is scheduled to be updated.

The current root cause analysis reports 1002 and the current improvement instructions 1004 are summarized in step 1012. Summarization at step 1012 may eliminate duplicate failure modes, or if there are many current failures, may help the optimization focus on the more common failure modes. In addition, summarization can combine failure modes that are similar to help generate robust instructions that can improve results for other similar scenarios that have not yet been encountered. In some embodiments, the summarization step 1012 behaves similarly to a dimensionality reduction technique in numeric or vector-based optimization, for example, by eliminating failure modes that do not provide additional independent information.

In some embodiments, the meta-prompt to summarize the current root cause analysis reports 1002 and the current improvement instructions 1004 is a chain-of-thoughts prompt (e.g., a prompt or prompts including a step-by-step procedure to help guide the language model through the summarization and integration processes). The meta-prompt may include a request to generate a critical failure report and/or to focus on patterns of behavior in the instructions that caused the prompt failure. In some embodiments, the meta-prompt may include a request to tag the areas identified as critical. In some embodiments, the meta-prompt includes a request to group similar root cause analysis reports 1002 and similar current improvement instructions 1004 and determine how many instructions fit into each group. The meta-prompt may include a request to create a set of steps for improving the current instructions based on each group (e.g., concise and actionable steps). In some embodiments, the meta-prompt requests only groups with more than a threshold number of instructions to be included in the output summary.

In some embodiments, the summaries of the current root cause analysis reports 1002 and the current improvement instructions 1004 are combined with the prior root cause analysis reports 1006 and the prior instructions 1008 in step 1014. During combination, the optimizer (e.g., the ranking prompt optimizer 270 or the extraction prompt optimizer 290) may identify and incorporate unique aspects identified in the summaries of the current root cause analysis reports 1002 and the current improvement instructions 1004. For example, the meta-prompt for performing the combination may include a request to identify the differences between the summaries of the current root cause analysis reports 1002 and the current improvement instructions 1004 and the prior root cause analysis reports 1006 and the prior instructions 1008. In some embodiments, the combination process can also resolve conflicts (e.g., reports or instructions in the summaries that are contradictory to the prior versions of the reports or instructions). During the step 1014 the conflicts may be resolved, for example, by consulting a language model and/or selecting the more recent or more common information. In addition, during the combination step 1014, reports and/or instructions that are older than a threshold amount of time (e.g., six months, one year, etc.) may be dropped from the combination to ensure, that the root cause analysis reports and the improvement instructions adapt over time.

At the step 1016, the combined root cause analysis reports and the improvement instructions are used to improve the prompt. For example, the prior prompt 1010 may be provided with the combined root cause analysis reports and the improvement instructions to a large language model with a request to improve the prompt according to the combined root cause analysis reports and the improvement instructions. In some embodiments, the request to improve the prompt indicates the language model should make small adjustments. For example, the meta-prompt for improving the prompt may request small and/or targeted enhancements to the current prompt be performed (e.g., to focus the language model on incremental refinement).

FIGS. 6A and 6B show flows of operations that may be performed by the data extraction and population system 100 and/or the prompt generation system 200 to automatically generate and/or adapt extractors for data entities in content received by the prompt generation system 200. The extractors may include, for example, keywords for content retrieval, a ranking prompt to determine the relevance of retrieved content, and an extraction prompt to extract a value for the data entity from the relevant content. The flow of operations shown in FIGS. 6A and 6B are exemplary and are not intended to be limiting. In some embodiments, the flows may be executed in a different order, with one or more steps omitted, and/or with additional steps added.

FIG. 6A shows a flow of operations 500 for generating keywords for retrieval augmentation for a particular data entity to be extracted, a ranking function (e.g., parameters for a ranking function and/or a ranking prompt for an language model to perform the ranking function), and an extraction prompt including instructions indicating how to extract a value for the data entity from within one or more chunks provided to the one or more LLMs 108 with the language model. The flow of operations, for example, may be performed by prompt generation system 200 of the data extraction and population system 100.

The flow of operations 500 may include obtaining a plurality of training chunks, where the plurality of training chunks are members of batches and each batch of the plurality of batches has at least one training chunk having a data entity for extraction in operation 502. In some embodiments, the operation 502 may include receiving the training chunks already in the correct format. For example, the training chunks may already be in batch form (e.g., the chunks of each batch related to a common characteristic such as a common customer, etc.) with a chunk of each batch labeled as having the data entity for which the extraction prompt is being generated. Alternatively, the operation 502 may include manipulating the training chunks into the proper form. For example, the operation 502 may include querying the database of training chunks using a filter set to a unique value for the common characteristic to generate the batch. Additionally or alternatively, the operation 502 may include determining the chunk in each batch that includes the value for the data entity for which the extractor is being generated. In some embodiments, the operation 502 is performed by the training data manager 220 and may include any operations described herein as performed by the training data manager 220 (e.g., including the batch creator 222 and/or the chunk labeler 224).

The flow of operations 500 may include identifying keywords in chunks that include a ground truth value for the data entity, where the keywords are related to the data entity in operation 504. In some embodiments, the operation 504 includes retrieving the chunks from each batch that include the value for the data entity. The operation 504 may include generating a meta-prompt for the one or more LLMs 108 including the chunks that include the data entities and a request to identify keywords related to the data entity. For example, the keyword identifier 240 may perform the operation 504 to determine an initial set of keywords based on the chunks retrieved having the value for the data entity.

The flow of operations 500 may include identifying a subset of the plurality of training chunks including a ground truth value for the data entity that were not retrieved using the keywords in operation 506. The operation 506 may include performing retrieval using the current set of keywords (e.g., initial or augmented/adjusted based on the current iteration of the operations 506 and 508). The operation 506 may include comparing the chunks retrieved using the current set of keywords to the full list of chunks having the data entity and identifying the chunks that are part of the full list but were not retrieved using the current set of keywords.

The flow of operations 500 may include updating the keywords based upon the subset of the plurality of training chunks in the operation 508. In some embodiments, the operation 508 may include analyzing the chunks that were not retrieved to identify additional keywords. The additional keywords may be generated using the one or more LLMs 108 and/or using traditional keyword search ranking techniques such as term frequency-inverse document frequency (TF-IDF). For example, the operation 508 may include generating a meta-prompt for the one or more LLMs 108 including the chunks having the data entity that were not retrieved, the current list of keywords, and/or a request to generate additional keywords to help retrieval of the chunks not retrieved using the previous set of keywords.

In some embodiments, the operation 508 also includes generating statistics and/or metrics for the keywords. For example, as keywords are added other keywords having poor metrics may be removed from the list. The flow of operations 500 may include an iterative loop whereby the keywords are adjusted until a stopping condition is met. For example, the operations 506 and 508 may be repeated until the keywords retrieve all chunks having the data entity, a different threshold value of coverage is satisfied, or the current keywords no longer change after a full iteration. In some embodiments, the operations 504-508 are performed by the keyword identifier 240. These operations may include any of the operations described as being performed by the keyword identifier 240 and/or the keyword generator 242, the keyword optimizer 248, the retrieval manager 244, and/or the retrieval validator 246.

In some embodiments, the statistics and/or metrics for the keywords are only calculated after the final iteration of the data flow 700. The iterations may be performed until no chunks having the data entity fail to be retrieved. Thus, the set of keywords used to calculate statistics and/or metrics will have 100% coverage as a whole. The keywords can be pruned (e.g., further optimized) to a desired level of coverage and effectiveness ratio from the keywords output from the data flow 700 based on the statistics and/or metrics.

The flow of operations 500 may include generating a ranking prompt configured to cause a language model to rank the chunks retrieved based on the probability (e.g., likelihood, chance, etc.) that the chunk includes the data entity. The language model may use a phrase related to the data entity (e.g., a description of the data entity) included in the ranking prompt to provide semantic context while ranking the chunks. The flow of operations 500 may include ranking, for each batch, the chunks retrieved using the keywords based on the likelihood that the chunk includes the ground truth value for the data entity in operation 510. After the operation 510 has been performed, the flow of operations 500 may proceed to updating the ranking function used to rank the chunks based on the batches for which a chunk having the ground truth value failed to satisfy a ranking threshold. For example, the operation 512 may include executing the ranking function against the chunks retrieved using the keywords for each batch and evaluating whether or not the ranking threshold is satisfied. For example, the ranking threshold may be satisfied if the chunk including the ground truth value for the data entity is ranked in the top 3 chunks retrieved, the top 5 chunks retrieved, the top 10% of chunks retrieved, etc.

The operations 510 and 512 may be performed until a stopping criterion is met. For example, the operations 510 and 512 may continue until the ranking function is no longer updated in the operation 512 or until the updates in the operation 512 are considered insignificant. In some embodiments, the operations 510 and 512 are performed by the chunk ranker 260. These operations may include any of the operations described as being performed by the chunk ranker 260 and/or the failed ranking root cause analyzer 268, the ranking prompt optimizer 270, and/or the ranking validator 266.

The flow of operations 500 may include generating a seed prompt to extract the information from relevant chunks in the operation 514. In some embodiments, the operation 514 includes obtaining (e.g., receiving, retrieving, etc.) a set of chunks (e.g., with 1 member, 3 members, 5 members, etc.) known to have a value for the data entity for which the prompt is being generated. The chunks may be retrieved at random. Each chunk of the set of chunks is paired with the ground truth value for the data entity (e.g., in a data structure, etc.). The operation 514 may include generating a meta-prompt including the pairs of a chunk and a corresponding ground truth value and request the one or more LLMs 108 to generate instructions (e.g., that may be used as an extraction prompt) for the data entity using the provided data structures (e.g., example pairs of the ground truth value and the corresponding chunk). In some embodiments, the operation 514 is performed by the seed prompt generator 282 and any operations described as being performed by the seed prompt generator 282 may be included in the operation 514.

The operations 500 may include testing by executing the seed prompt for each of the batches in the operation 516. The operation 516 may include performing the same extraction process that will be performed by the data extraction manager system 114 during retrieval augmented extraction. Alternatively, the operation 516 may trigger execution of the seed prompt directly within the data extraction manager system 114.

The flow of operations 500 may include generating, for any batch for which extraction failed, a root cause analysis to determine one or more reasons for the failed extraction in operation 518. The operation 518 may include evaluating the extraction of the data entity for each batch. For example, the extraction may be evaluated by comparing the value obtained by executing the extraction prompt in the operation 516 to the ground truth value for that batch. If the values do not match, the batch may be considered to have failed extraction. The batches that failed extraction may be used as part of a meta-prompt for the one or more LLMs 108 with the current extraction prompt and a request to perform a root cause analysis (e.g., generate text, a report, etc.) for each failed batch. In some embodiments, the operation 518 is performed by the failed extraction root cause analyzer 288 and/or the extraction validator 286 any operations described as being performed by the failed extraction root cause analyzer 288 and/or the extraction validator 286 may be included in the operation 518.

The flow of operations 500 may include adjusting the extraction prompt based on the root cause analyses in the operation 520. The operation 520 may include generating a meta-prompt for the one or more LLMs 108 that includes the root cause analysis, the current extraction prompt, and a request to adjust the extraction prompt. In some embodiments, the request to adjust the extraction prompt may include language similar to a step-size or a learning rate (e.g., indicating an extent of an adjustment) that instructs the one or more LLMs 108 to make minor adjustments to the extraction prompt while avoiding large changes that would fail to converge. For example, the request to adjust the extraction prompt may include language similar to "make a small adjustment to the provided prompt to improve the root causes for batches that failed extraction identified" or "refine the provided extraction prompt slightly to improve the root causes identified for batches that failed extraction." In some embodiments, the meta-prompt may also include language related to a stopping criterion. For example, the meta-prompt may include language similar to "provide an indication if you believe no improvements are possible." The operations 516-520 may be repeated until the stopping criterion is received or when fewer than a threshold amount of batches fail extraction.

FIG. 6B shows a flow of operations 550 for adjusting a prompt (e.g., the ranking prompt or the extraction prompt) based on feedback from a user according to some embodiments. The flow of operations 550 may be performed by the prompt generation system 200. For example, the flow of operations 550 may be performed in conjunction with the interface manager 214, the feedback manager 226, the ranking prompt optimizer 270, and/or the prompt generator 280.

The flow of operations 550 may begin by generating a user interface including an element for displaying values for data entities extracted using an extractor (e.g., keywords, a ranking prompt, and an extraction prompt) in operation 552. The operation 552 may be performed using the interface manager 214 to generate a user interface on a device of the one or more UI clients 102. The user interface may include an element where the user can adjust the extracted value or otherwise indicate that a value was incorrectly extracted. In operation 554, the prompt generation system 200 may receive an indication that a value for a data entity was extracted incorrectly (e.g., from the device of the one or more UI clients 102). For example, the user may have adjusted the extracted value in the UI.

The flow of operations 550 may include identifying a correct value for the data entity in operation 556 and storing the correct value, the value extracted incorrectly, and chunks associated with the extraction as a new training sample in the operation 558. For example, the interface manager 214 may provide to the feedback manager 226 information related to the user interaction (e.g., the original value indicated as incorrect and the user entered value). The information may be processed and stored for future data analysis.

The operation 560 may include generating a root cause analysis report and prompt improvement instructions for the new training sample. For example, the operation 560 may include triggering both the failed ranking root cause analyzer 268 and the failed extraction root cause analyzer 288 to generate a root cause analysis and/or prompt improvement instructions. The flow of operations 550 may include determining whether to update a ranking prompt, an extraction prompt, or both based on a number of new training samples for a same data entity in step 562. For example, the several new training samples may be stored over a period of time. The new training samples may be generated by execution of operations 554-560 each time the user indicates an incorrect extraction. In some scenarios, the root cause analysis reports (e.g., from the failed ranking root cause analyzer 268 and/or the failed extraction root cause analyzer 288) indicate that more than a threshold amount (e.g., number, ratio, etc.) of failures are due to the ranking prompt and therefore the ranking prompt is updated. Alternatively, if a threshold amount of failures are due to the extraction prompt, only the extraction prompt may be updated. In some embodiments, both the ranking prompt and the extraction prompt are updated (e.g., if the threshold amount is not satisfied by either prompt).

Operations 564-568 may be performed in the flow of operations 550 to update the current prompt (e.g., the ranking prompt or the extraction prompt). The operations 564-568 include summarizing a number of root cause analysis reports and prompt improvement instructions corresponding to the new training samples, combining the root cause analysis reports and the prompt improvement instructions with previously stored root cause analysis reports and previously stored prompt improvement instructions corresponding to the same data entity, and updating the ranking prompt or the extraction prompt based on the combined root cause analysis reports and the combined prompt improvement instructions. These operations may be performed by the ranking prompt optimizer 270 and/or extraction prompt optimizer 290 and have been described in detail above (e.g., with reference to FIGS. 4C-E and FIG. 5).

In some embodiments, the flow of operations 550 includes testing the updated prompt. For example, an updated training set may be generated by incorporating the new training samples with a current training set during the operation 570. In some embodiments, the updated training set is used to ensure that the updated prompt addresses the root causes of the failures and does not introduce additional issues for extraction batches that functioned correctly with the previous prompt. The flow of operations 550 may include generating an accuracy score for the updated training set by executing the updated ranking prompt or the updated extraction prompt against the updated training set in operation 572. The accuracy score may include a ratio of the training samples (e.g., batches) for which extraction is successful using the new prompt. The operation 572 may include comparing the accuracy score of the new prompt to a threshold (e.g., a static threshold such as 95% or a variable threshold such as the accuracy score of the previous prompt) or other acceptance criterion. In some embodiments, the operation 572 evaluates an acceptance criterion that includes evaluating whether the updated prompt satisfies the constraints set forth by the constraint manager 216. If the accuracy score satisfies an acceptance threshold, the updated prompt may be provided to the data extraction manager system 114 for use in future extraction requests for the same data entity in operation 574. For example, operation 574 may include extracting the same data entity using the updated ranking prompt or the updated extraction prompt for a next extraction request (e.g., submission) that is received by the data extraction manager system 114.

Exemplary Embodiments

An embodiment of the present disclosure relates to a system for generating an extractor for a target data entity, the system includes one or more processing circuits configured to prompt one or more language models to extract the target data entity from each batch of a plurality of batches of chunks using extraction instructions in an extraction prompt, each batch of the plurality of batches including chunks generated from content of a submission of a plurality of submissions and one or more chunks having a ground truth value for the target data entity in the submission. The one or more processing circuits are also configured to divide the plurality of batches into a first set of batches for which the ground truth value was extracted and a second set of batches failing to extract the ground truth value. The one or more processing circuits are also configured to prompt the one or more language models with a first metaprompt using each failing batch in the second set of batches, the first metaprompt including the failing batch, and a request to (i) identify root cause causing the failing batch to fail extraction and (ii) identify additional extraction instructions to improve the extraction for the failing batch. The one or more processing circuits are also configured to prompt the one or more language models with one or more second metaprompts including the extraction instructions, the root cause for each failing batch in the second set of batches, the additional extraction instructions for each failing batch, and a request to integrate the additional extraction instructions into the extraction instructions. The one or more processing circuits are also configured to repeat dividing the plurality of batches into the first set of batches for which the ground truth value was extracted and the second set of batches failing to extract the ground truth value using the integrated extraction instructions, prompting the one or more language models with the first metaprompt, and prompting the one or more language models with the one or more second metaprompts until at least one of the first set of batches satisfy an extraction accuracy criterion or a maximum iterations criterion is satisfied. The one or more processing circuits are also configured to provide the integrated extraction instructions in the extraction prompt to extract a value for the target data entity from another submission.

In some embodiments, the one or more processing circuits are also configured to prompt the one or more language models with a seed extraction metaprompt including one or more pairs, each pair having (i) a second batch of chunks and (ii) the ground truth value for the target data entity in the submission corresponding to the second batch of chunks; and a request to generate initial extraction instructions for the extraction prompt to extract the ground truth value for the target data entity from the second batch of chunks for each of the one or more pairs.

In some embodiments, the one or more processing circuits are also configured to extract the value for the target data entity from another submission by prompting the one or more language models with the extraction prompt including the integrated extraction instructions.

In some embodiments, the one or more second metaprompts include a request to generate one or more groups of batches from the second set of batches according to the root cause.

In some embodiments, the one or more second metaprompts include a request to summarize the additional extraction instructions for each failing batch within each of the one or more groups of batches.

In some embodiments, the one or more second metaprompts include a request to integrate the summarized instructions within each of the one or more groups of batches.

In some embodiments, the one or more second metaprompts include a request to rank the one or more groups of batches according to a quantity of the second set of batches in each group and a request to integrate the summarized instructions for a fraction of highest ranked batches.

In some embodiments, the one or more processing circuits are also configured to prompt the one or more language models with a first keyword metaprompt including the one or more chunks having the ground truth value for the target data entity from each submission and a request to identify keywords correlated to the target data entity. The one or more processing circuits are also configured to divide the one or more chunks having the ground truth value into identified chunks and unidentified chunks, wherein the identified chunks are identified by performing a keyword search across a plurality of chunks for each submission of the plurality of submissions using the keywords. The one or more processing circuits are also configured to prompt the one or more language models with a second keyword metaprompt including the unidentified chunks, the keywords, and a request to identify additional keywords correlated to the ground truth values in the unidentified chunks. The one or more processing circuits are also configured to append the additional keywords to the keywords and repeat the second keyword metaprompt using the appended keywords and append the additional keywords until at least one (i) the identified chunks satisfy of a coverage criterion or (ii) a second maximum iterations criterion is satisfied, wherein the appended keywords are used to determine one or more relevant chunks from which the value for the target data entity is extracted.

In some embodiments, evaluating the coverage criterion includes determining whether the identified chunks include all of the one or more chunks having the ground truth value.

In some embodiments, the plurality of batches of chunks is a plurality of first batches of chunks and the one or more processing circuits are configured to prompt the one or more language models with a request to rank a plurality of second batches of chunks according to ranking instructions of a ranking prompt. The one or more processing circuits are also configured divide the plurality of second batches of chunks into a first set of second batches passing ranking and a second set of second batches failing the ranking, wherein the first set of second batches passing the ranking are identified by (i) executing the ranking prompt upon each second batch of the plurality of second batches and (ii) responsive to the one or more chunks having the ground truth value in the second batch satisfying an order criterion, adding second batch to the first set of second batches passing the ranking. The one or more processing circuits are also configured prompt the one or more language models with a ranking analysis metaprompt using each failed batch in the second set of second batches failing the ranking, the ranking analysis metaprompt including the failed batch, the ranking instructions from the ranking prompt, and a request to (i) identify a root cause that caused the failed batch to fail the ranking and (ii) identify additional ranking instructions to improve the ranking for the failed batch. The one or more processing circuits are also configured prompt the one or more language models with one or more ranking optimization metaprompts including the ranking instructions, the root cause for each failed batch, the additional ranking instructions for each failed batch, and a request to integrate the additional ranking instructions into the ranking instructions. The one or more processing circuits are also configured repeat dividing the plurality of second batches of chunks into the first set of second batches passing the ranking and the second set of second batches failing the ranking, prompting the one or more language models with the ranking analysis metaprompt, and prompting the one or more language models with the one or more ranking optimization metaprompts until at least one of the first set of second batches satisfy a rank accuracy criterion or a second maximum iterations criterion is satisfied, wherein the first set of second batches passing the ranking are identified using the ranking prompt after the additional ranking instructions have been integrated and the integrated ranking instructions are used to determine one or more relevant chunks from which the value for the target data entity is extracted.

In some embodiments, evaluating the order criterion includes determining whether a least one of the one or more chunks having the ground truth value are ranked above a threshold ranking.

Another embodiment relates to a method for generating an extractor for a target data entity. The method includes prompting one or more language models to extract the target data entity from each batch of a plurality of batches of chunks using extraction instructions in an extraction prompt, each batch of the plurality of batches including chunks generated from content of a submission of a plurality of submissions and one or more chunks having a ground truth value for the target data entity in the submission. The method also includes dividing the plurality of batches into a first set of batches for which the ground truth value was extracted and a second set of batches failing to extract the ground truth value. The method also includes prompting the one or more language models with a first metaprompt using each failing batch in the second set of batches, the first metaprompt including the failing batch, and a request to (i) identify root cause causing the failing batch to fail extraction and (ii) identify additional extraction instructions to improve the extraction for the failing batch. The method also includes prompting the one or more language models with one or more second metaprompts including the extraction instructions, the root cause for each failing batch in the second set of batches, the additional extraction instructions for each failing batch, and a request to integrate the additional extraction instructions into the extraction instructions. The method also includes repeating dividing the plurality of batches into the first set of batches for which the ground truth value was extracted and the second set of batches failing to extract the ground truth value using the integrated extraction instructions, prompting the one or more language models with the first metaprompt, and prompting the one or more language models with the one or more second metaprompts until at least one of the first set of batches satisfy an extraction accuracy criterion or a maximum iterations criterion is satisfied. The method also includes providing the integrated extraction instructions in the extraction prompt to extract a value for the target data entity from another submission.

In some embodiments, the method also includes prompting the one or more language models with a seed extraction metaprompt including one or more pairs, each pair including (i) a second batch of chunks and (ii) the ground truth value for the target data entity in the submission corresponding to the second batch of chunks and a request to generate initial extraction instructions for the extraction prompt to extract the ground truth value for the target data entity from the second batch of chunks for each of the one or more pairs.

In some embodiments, the method also includes extracting the value for the target data entity from another submission by prompting the one or more language models with the extraction prompt including the integrated extraction instructions.

In some embodiments, the one or more second metaprompts include a request to generate one or more groups of batches from the second set of batches according to the root cause.

In some embodiments, the one or more second metaprompts include a request to summarize the additional extraction instructions for each failing batch within each of the one or more groups of batches.

In some embodiments, the one or more second metaprompts include a request to rank the one or more groups of batches according to a quantity of the second set of batches in each group and a request to integrate the summarized instructions for a fraction of highest ranked batches.

In some embodiments, the method also includes prompting the one or more language models with a first keyword metaprompt including the one or more chunks having the ground truth value for the target data entity from each submission and a request to identify keywords correlated to the target data entity. The method also includes dividing the one or more chunks having the ground truth value into identified chunks and unidentified chunks, wherein the identified chunks are identified by performing a keyword search across a plurality of chunks for each submission of the plurality of submissions using the keywords. The method also includes prompting the one or more language models with a second keyword metaprompt including the unidentified chunks, the keywords, and a request to identify additional keywords correlated to the ground truth values in the unidentified chunks. The method also includes appending the additional keywords to the keywords and repeating the second keyword metaprompt using the appended keywords and append the additional keywords until at least one (i) the identified chunks satisfy of a coverage criterion or (ii) a second maximum iterations criterion is satisfied, wherein the appended keywords are used to determine one or more relevant chunks from which the value for the target data entity is extracted.

In some embodiments, the plurality of batches of chunks is a plurality of first batches of chunks and the method also includes prompting the one or more language models with a request to rank a plurality of second batches of chunks according to ranking instructions of a ranking prompt. The method also includes dividing the plurality of second batches of chunks into a first set of second batches passing ranking and a second set of second batches failing the ranking, wherein the first set of second batches passing the ranking are identified by (i) executing the ranking prompt upon each second batch of the plurality of second batches and (ii) responsive to the one or more chunks having the ground truth value in the second batch satisfying an order criterion, adding second batch to the first set of second batches passing the ranking. The method also includes prompting the one or more language models with a ranking analysis metaprompt using each failed batch in the second set of second batches failing the ranking, the ranking analysis metaprompt including the failed batch, the ranking instructions from the ranking prompt, and a request to (i) identify a root cause that caused the failed batch to fail the ranking and (ii) identify additional ranking instructions to improve the ranking for the failed batch. The method also includes prompting the one or more language models with one or more ranking optimization metaprompts including the ranking instructions, the root cause for each failed batch, the additional ranking instructions for each failed batch, and a request to integrate the additional ranking instructions into the ranking instructions. The method also includes repeating dividing the plurality of second batches of chunks into the first set of second batches passing the ranking and the second set of second batches failing the ranking, prompting the one or more language models with the ranking analysis metaprompt, and prompting the one or more language models with the one or more ranking optimization metaprompts until at least one of the first set of second batches satisfy a rank accuracy criterion or a second maximum iterations criterion is satisfied, wherein the first set of second batches passing the ranking are identified using the ranking prompt after the additional ranking instructions have been integrated and the integrated ranking instructions are used to determine one or more relevant chunks from which the value for the target data entity is extracted.

Another embodiment relates to a system for automatic generation of an extractor for a target data entity. The system includes one or more processing circuits configured to receive prompt training data including a plurality of submissions, each submission including a plurality of chunks related to submission documents, one or more chunks having a ground truth value for the target data entity and a subset of the plurality of chunks not having the ground truth value. The one or more processing circuits are also configured to prompt one or more language models with the ground truth value for each submission and a request to identify the one or more chunks having the ground truth value associated with the submission. The one or more processing circuits are also configured to prompt the one or more language models with a first keyword metaprompt including the one or more chunks having the ground truth value from each submission and a request to identify keywords correlated to the target data entity. The one or more processing circuits are also configured to divide the one or more chunks having the ground truth value into identified chunks and unidentified chunks, wherein the identified chunks are identified by performing a keyword search across the plurality of chunks for each submission of the plurality of submissions using the keywords. The one or more processing circuits are also configured to prompt the one or more language models with a second keyword metaprompt including the unidentified chunks, the keywords, and a request to identify additional keywords correlated to the ground truth values in the unidentified chunks. The one or more processing circuits are also configured to append the additional keywords to the keywords and repeat the first keyword metaprompt or the second keyword metaprompt using the appended keywords and append the additional keywords until at least one the identified chunks satisfy of a coverage criterion or a first maximum iterations criterion is satisfied. The one or more processing circuits are also configured to prompt the one or more language models with a request to rank a plurality of first batches of chunks according to ranking instructions of a ranking prompt, each first batch of the plurality of first batches including one or more chunks from a submission. The one or more processing circuits are also configured to divide the plurality of first batches of chunks into a first set of first batches passing ranking and a second set of first batches failing the ranking, wherein the first set of first batches passing the ranking are identified by (i) executing the ranking prompt upon each first batch of the plurality of first batches and (ii) responsive to the one or more chunks having the ground truth value in the first batch satisfying an order criterion, adding to the first set of batches passing the ranking the first batch. The one or more processing circuits are also configured to prompt the one or more language models with a ranking analysis metaprompt using each failed batch in the second set of first batches failing the ranking, the ranking analysis metaprompt including the failed batch, the ranking instructions from the ranking prompt, and a request to (i) identify a root cause that caused the failed batch to fail the ranking and (ii) identify additional ranking instructions to improve the ranking for the failed batch. The one or more processing circuits are also configured to prompt the one or more language models with one or more ranking optimization metaprompts including the ranking instructions, the root cause for each failed batch, the additional ranking instructions for each failed batch, a request to summarize the root causes from each failed batch, a request to group the root causes from each failed batch according to a reason for failure, a request to provide a count of the root causes within each group, and a request to integrate the additional ranking instructions into the ranking instructions. The one or more processing circuits are also configured to repeat dividing the plurality of first batches of chunks into the first set of first batches passing the ranking and the second set of first batches failing the ranking, prompting the one or more language models with the ranking analysis metaprompt and prompting the one or more language models with the one or more ranking optimization metaprompts until at least one of the first set of first batches satisfy a rank accuracy criterion or a second maximum iterations criterion is satisfied, wherein the first set of first batches passing the ranking are identified using the ranking prompt after the additional ranking instructions have been integrated. The one or more processing circuits are also configured to prompt the one or more language models with a seed extraction metaprompt including one or more pairs, each pair including (i) a second batch of chunks and (ii) the ground truth value corresponding to the second batch, at least one chunk of the second batch having the ground truth value corresponding to the second batch and a request to generate an extraction prompt to extract the ground truth value for the target data entity from the second batch of chunks for the pair. The one or more processing circuits are also configured to prompt the one or more language models to extract a value from a third batch of chunks, each third batch including chunks from one submission, using the extraction prompt. The one or more processing circuits are also configured to divide a plurality of third batches of chunks into a first set of third batches for which the ground truth value was extracted and a second set of third batches failing to extract the ground truth value. The one or more processing circuits are also configured to prompt the one or more language models with a extraction analysis metaprompt using each batch failing extraction in the second set of third batches failing to extract the ground truth value, the extraction analysis metaprompt including the batch failing extraction, extraction instructions from the extraction prompt, and a request to (i) identify an extraction root cause that caused the batch failing extraction to fail extraction and (ii) identify additional extraction instructions to improve the extraction for the batch failing extraction. The one or more processing circuits are also configured to prompt the one or more language models with one or more extraction optimization metaprompts including the extraction instructions, the extraction root cause for each batch failing extraction, the additional extraction instructions for each batch failing extraction, a request to summarize the extraction root cause from each batch failing extraction, a request to group the extraction root causes from each batch failing extraction according to a reason for failure, a request to provide a count of the extraction root causes within each group of the extraction root causes, and a request to integrate the additional extraction instructions into the extraction instructions. The one or more processing circuits are also configured to repeat dividing the plurality of third batches of chunks into the first set of third batches for which the ground truth value was extracted and the second set of third batches failing to extract the ground truth value, prompting the one or more language models with the extraction analysis metaprompt, and prompting the one or more language models with the extraction optimization metaprompt until at least one of the first set of third batches satisfy an extraction accuracy criterion or a third maximum iterations criterion is satisfied, where in the first set of third batches for which the ground truth value was extracted are identified using the extraction prompt after the additional extraction instructions have been integrated and extract a value for the target data entity from another submission using the keywords, the ranking prompt and the extraction prompt.

These embodiments are illustrative only and should not be considered limiting.

What is claimed is:

1. A system for generating an extractor for a target data entity, the system comprising:

one or more processing circuits configured to:

prompt one or more language models to extract the target data entity from each batch of a plurality of batches of chunks using extraction instructions in an extraction prompt, each batch of the plurality of batches including chunks generated from content of a submission of a plurality of submissions and one or more chunks having a ground truth value for the target data entity in the submission;

divide the plurality of batches into a first set of batches for which the ground truth value was extracted and a second set of batches failing to extract the ground truth value;

prompt the one or more language models with a first metaprompt using each failing batch in the second set of batches, the first metaprompt comprising the failing batch, and a request to (i) identify root cause causing the failing batch to fail extraction and (ii) identify additional extraction instructions to improve the extraction for the failing batch;

prompt the one or more language models with one or more second metaprompts comprising the extraction instructions, the root cause for each failing batch in the second set of batches, the additional extraction instructions for each failing batch, and a request to integrate the additional extraction instructions into the extraction instructions;

repeat dividing the plurality of batches into the first set of batches for which the ground truth value was extracted and the second set of batches failing to extract the ground truth value using the integrated extraction instructions, prompting the one or more language models with the first metaprompt, and prompting the one or more language models with the one or more second metaprompts until at least one of:

the first set of batches satisfy an extraction accuracy criterion; or a maximum iterations criterion is satisfied; and provide the integrated extraction instructions in the extraction prompt to extract a value for the target data entity from another submission.

2. The system of claim 1, wherein the one or more processing circuits are configured to:

prompt the one or more language models with a seed extraction metaprompt comprising:

one or more pairs, each pair comprising (i) a second batch of chunks and (ii) the ground truth value for the target data entity in the submission corresponding to the second batch of chunks; and a request to generate initial extraction instructions for the extraction prompt to extract the ground truth value for the target data entity from the second batch of chunks for each of the one or more pairs.

3. The system of claim 1, wherein the one or more processing circuits are configured to extract the value for the target data entity from another submission by prompting the one or more language models with the extraction prompt including the integrated extraction instructions.

4. The system of claim 1, wherein the one or more second metaprompts comprise a request to generate one or more groups of batches from the second set of batches according to the root cause.

5. The system of claim 4, wherein the one or more second metaprompts comprise a request to summarize the additional extraction instructions for each failing batch within each of the one or more groups of batches.

6. The system of claim 5, wherein the one or more second metaprompts include a request to integrate the summarized instructions within each of the one or more groups of batches.

7. The system of claim 5, wherein the one or more second metaprompts include a request to rank the one or more groups of batches according to a quantity of the second set of batches in each group and a request to integrate the summarized instructions for a fraction of highest ranked batches.

8. The system of claim 1, wherein the one or more processing circuits are configured to:

prompt the one or more language models with a first keyword metaprompt comprising the one or more chunks having the ground truth value for the target data entity from each submission and a request to identify keywords correlated to the target data entity;

divide the one or more chunks having the ground truth value into identified chunks and unidentified chunks, wherein the identified chunks are identified by performing a keyword search across a plurality of chunks for each submission of the plurality of submissions using the keywords;

prompt the one or more language models with a second keyword metaprompt comprising the unidentified chunks, the keywords, and a request to identify additional keywords correlated to the ground truth values in the unidentified chunks;

append the additional keywords to the keywords; and repeat the second keyword metaprompt using the appended keywords and append the additional keywords until at least one (i) the identified chunks satisfy of a coverage criterion or (ii) a second maximum iterations criterion is satisfied, wherein the appended keywords are used to determine one or more relevant chunks from which the value for the target data entity is extracted.

9. The system of claim 8, wherein evaluating the coverage criterion comprises determining whether the identified chunks comprise all of the one or more chunks having the ground truth value.

10. The system of claim 1, wherein the plurality of batches of chunks is a plurality of first batches of chunks and the one or more processing circuits are configured to:

prompt the one or more language models with a request to rank a plurality of second batches of chunks according to ranking instructions of a ranking prompt;

divide the plurality of second batches of chunks into a first set of second batches passing ranking and a second set of second batches failing the ranking, wherein the first set of second batches passing the ranking are identified by (i) executing the ranking prompt upon each second batch of the plurality of second batches and (ii) responsive to the one or more chunks having the ground truth value in the second batch satisfying an order criterion, adding second batch to the first set of second batches passing the ranking;

prompt the one or more language models with a ranking analysis metaprompt using each failed batch in the second set of second batches failing the ranking, the ranking analysis metaprompt comprising the failed batch, the ranking instructions from the ranking prompt, and a request to (i) identify a root cause that caused the failed batch to fail the ranking and (ii) identify additional ranking instructions to improve the ranking for the failed batch;

prompt the one or more language models with one or more ranking optimization metaprompts comprising the ranking instructions, the root cause for each failed batch, the additional ranking instructions for each failed batch, and a request to integrate the additional ranking instructions into the ranking instructions; and repeat dividing the plurality of second batches of chunks into the first set of second batches passing the ranking and the second set of second batches failing the ranking, prompting the one or more language models with the ranking analysis metaprompt, and prompting the one or more language models with the one or more ranking optimization metaprompts until at least one of the first set of second batches satisfy a rank accuracy criterion or a second maximum iterations criterion is satisfied, wherein the first set of second batches passing the ranking are identified using the ranking prompt after the additional ranking instructions have been integrated and the integrated ranking instructions are used to determine one or more relevant chunks from which the value for the target data entity is extracted.

11. The system of claim 10, wherein evaluating the order criterion comprises determining whether a least one of the one or more chunks having the ground truth value are ranked above a threshold ranking.

12. A method for generating an extractor for a target data entity comprising:

prompting one or more language models to extract the target data entity from each batch of a plurality of batches of chunks using extraction instructions in an extraction prompt, each batch of the plurality of batches including chunks generated from content of a submission of a plurality of submissions and one or more chunks having a ground truth value for the target data entity in the submission;

dividing the plurality of batches into a first set of batches for which the ground truth value was extracted and a second set of batches failing to extract the ground truth value;

prompting the one or more language models with a first metaprompt using each failing batch in the second set of batches, the first metaprompt comprising the failing batch, and a request to (i) identify root cause causing the failing batch to fail extraction and (ii) identify additional extraction instructions to improve the extraction for the failing batch;

prompting the one or more language models with one or more second metaprompts comprising the extraction instructions, the root cause for each failing batch in the second set of batches, the additional extraction instructions for each failing batch, and a request to integrate the additional extraction instructions into the extraction instructions;

repeating dividing the plurality of batches into the first set of batches for which the ground truth value was extracted and the second set of batches failing to extract the ground truth value using the integrated extraction instructions, prompting the one or more language models with the first metaprompt, and prompting the one or more language models with the one or more second metaprompts until at least one of:

the first set of batches satisfy an extraction accuracy criterion; or a maximum iterations criterion is satisfied; and providing the integrated extraction instructions in the extraction prompt to extract a value for the target data entity from another submission.

13. The method of claim 12, further comprising:

prompting the one or more language models with a seed extraction metaprompt comprising:

one or more pairs, each pair comprising (i) a second batch of chunks and (ii) the ground truth value for the target data entity in the submission corresponding to the second batch of chunks; and a request to generate initial extraction instructions for the extraction prompt to extract the ground truth value for the target data entity from the second batch of chunks for each of the one or more pairs.

14. The method of claim 12, further comprising extracting the value for the target data entity from another submission by prompting the one or more language models with the extraction prompt including the integrated extraction instructions.

15. The method of claim 12, wherein the one or more second metaprompts comprise a request to generate one or more groups of batches from the second set of batches according to the root cause.

16. The method of claim 15, wherein the one or more second metaprompts comprise a request to summarize the additional extraction instructions for each failing batch within each of the one or more groups of batches.

17. The method of claim 16, wherein the one or more second metaprompts include a request to rank the one or more groups of batches according to a quantity of the second set of batches in each group and a request to integrate the summarized instructions for a fraction of highest ranked batches.

18. The method of claim 12, further comprising:

prompting the one or more language models with a first keyword metaprompt comprising the one or more chunks having the ground truth value for the target data entity from each submission and a request to identify keywords correlated to the target data entity;

dividing the one or more chunks having the ground truth value into identified chunks and unidentified chunks, wherein the identified chunks are identified by performing a keyword search across a plurality of chunks for each submission of the plurality of submissions using the keywords;

prompting the one or more language models with a second keyword metaprompt comprising the unidentified chunks, the keywords, and a request to identify additional keywords correlated to the ground truth values in the unidentified chunks;

appending the additional keywords to the keywords; and repeating the second keyword metaprompt using the appended keywords and append the additional keywords until at least one (i) the identified chunks satisfy of a coverage criterion or (ii) a second maximum iterations criterion is satisfied, wherein the appended keywords are used to determine one or more relevant chunks from which the value for the target data entity is extracted.

19. The method of claim 12, wherein the plurality of batches of chunks is a plurality of first batches of chunks and method further comprises:

prompting the one or more language models with a request to rank a plurality of second batches of chunks according to ranking instructions of a ranking prompt;

dividing the plurality of second batches of chunks into a first set of second batches passing ranking and a second set of second batches failing the ranking, wherein the first set of second batches passing the ranking are identified by (i) executing the ranking prompt upon each second batch of the plurality of second batches and (ii) responsive to the one or more chunks having the ground truth value in the second batch satisfying an order criterion, adding second batch to the first set of second batches passing the ranking;

prompting the one or more language models with a ranking analysis metaprompt using each failed batch in the second set of second batches failing the ranking, the ranking analysis metaprompt comprising the failed batch, the ranking instructions from the ranking prompt, and a request to (i) identify a root cause that caused the failed batch to fail the ranking and (ii) identify additional ranking instructions to improve the ranking for the failed batch;

prompting the one or more language models with one or more ranking optimization metaprompts comprising the ranking instructions, the root cause for each failed batch, the additional ranking instructions for each failed batch, and a request to integrate the additional ranking instructions into the ranking instructions; and repeating dividing the plurality of second batches of chunks into the first set of second batches passing the ranking and the second set of second batches failing the ranking, prompting the one or more language models with the ranking analysis metaprompt, and prompting the one or more language models with the one or more ranking optimization metaprompts until at least one of the first set of second batches satisfy a rank accuracy criterion or a second maximum iterations criterion is satisfied, wherein the first set of second batches passing the ranking are identified using the ranking prompt after the additional ranking instructions have been integrated and the integrated ranking instructions are used to determine one or more relevant chunks from which the value for the target data entity is extracted.

20. A system for automatic generation of an extractor for a target data entity, the system comprising:

one or more processing circuits configured to:

receive prompt training data comprising a plurality of submissions, each submission comprising a plurality of chunks related to submission documents, one or more chunks having a ground truth value for the target data entity and a subset of the plurality of chunks not having the ground truth value;

prompt one or more language models with the ground truth value for each submission and a request to identify the one or more chunks having the ground truth value associated with the submission;

prompt the one or more language models with a first keyword metaprompt comprising the one or more chunks having the ground truth value from each submission and a request to identify keywords correlated to the target data entity;

divide the one or more chunks having the ground truth value into identified chunks and unidentified chunks, wherein the identified chunks are identified by performing a keyword search across the plurality of chunks for each submission of the plurality of submissions using the keywords;

prompt the one or more language models with a second keyword metaprompt comprising the unidentified chunks, the keywords, and a request to identify additional keywords correlated to the ground truth values in the unidentified chunks;

append the additional keywords to the keywords;

repeat the first keyword metaprompt or the second keyword metaprompt using the appended keywords and append the additional keywords until at least one the identified chunks satisfy of a coverage criterion or a first maximum iterations criterion is satisfied;

prompt the one or more language models with a request to rank a plurality of first batches of chunks according to ranking instructions of a ranking prompt, each first batch of the plurality of first batches comprising one or more chunks from a submission;

divide the plurality of first batches of chunks into a first set of first batches passing ranking and a second set of first batches failing the ranking, wherein the first set of first batches passing the ranking are identified by (i) executing the ranking prompt upon each first batch of the plurality of first batches and (ii) responsive to the one or more chunks having the ground truth value in the first batch satisfying an order criterion, adding to the first set of batches passing the ranking the first batch;

prompt the one or more language models with a ranking analysis metaprompt using each failed batch in the second set of first batches failing the ranking, the ranking analysis metaprompt comprising the failed batch, the ranking instructions from the ranking prompt, and a request to (i) identify a root cause that caused the failed batch to fail the ranking and (ii) identify additional ranking instructions to improve the ranking for the failed batch;

prompt the one or more language models with one or more ranking optimization metaprompts comprising the ranking instructions, the root cause for each failed batch, the additional ranking instructions for each failed batch, a request to summarize the root causes from each failed batch, a request to group the root causes from each failed batch according to a reason for failure, a request to provide a count of the root causes within each group, and a request to integrate the additional ranking instructions into the ranking instructions;

repeat dividing the plurality of first batches of chunks into the first set of first batches passing the ranking and the second set of first batches failing the ranking, prompting the one or more language models with the ranking analysis metaprompt and prompting the one or more language models with the one or more ranking optimization metaprompts until at least one of the first set of first batches satisfy a rank accuracy criterion or a second maximum iterations criterion is satisfied, wherein the first set of first batches passing the ranking are identified using the ranking prompt after the additional ranking instructions have been integrated;

prompt the one or more language models with a seed extraction metaprompt comprising:

one or more pairs, each pair comprising (i) a second batch of chunks and (ii) the ground truth value corresponding to the second batch, at least one chunk of the second batch having the ground truth value corresponding to the second batch; and a request to generate an extraction prompt to extract the ground truth value for the target data entity from the second batch of chunks for the pair;

prompt the one or more language models to extract a value from a third batch of chunks, each third batch including chunks from one submission, using the extraction prompt;

divide a plurality of third batches of chunks into a first set of third batches for which the ground truth value was extracted and a second set of third batches failing to extract the ground truth value;

prompt the one or more language models with a extraction analysis metaprompt using each batch failing extraction in the second set of third batches failing to extract the ground truth value, the extraction analysis metaprompt comprising the batch failing extraction, extraction instructions from the extraction prompt, and a request to (i) identify an extraction root cause that caused the batch failing extraction to fail extraction and (ii) identify additional extraction instructions to improve the extraction for the batch failing extraction;

prompt the one or more language models with one or more extraction optimization metaprompts comprising the extraction instructions, the extraction root cause for each batch failing extraction, the additional extraction instructions for each batch failing extraction, a request to summarize the extraction root cause from each batch failing extraction, a request to group the extraction root causes from each batch failing extraction according to a reason for failure, a request to provide a count of the extraction root causes within each group of the extraction root causes, and a request to integrate the additional extraction instructions into the extraction instructions;

repeat dividing the plurality of third batches of chunks into the first set of third batches for which the ground truth value was extracted and the second set of third batches failing to extract the ground truth value, prompting the one or more language models with the extraction analysis metaprompt, and prompting the one or more language models with the extraction optimization metaprompt until at least one of the first set of third batches satisfy an extraction accuracy criterion or a third maximum iterations criterion is satisfied, where in the first set of third batches for which the ground truth value was extracted are identified using the extraction prompt after the additional extraction instructions have been integrated; and extract a value for the target data entity from another submission using the keywords, the ranking prompt and the extraction prompt.

* * * * *